United States Patent
Onuma et al.

(10) Patent No.: US 11,081,709 B2
(45) Date of Patent: Aug. 3, 2021

(54) FUEL CELL SYSTEM

(71) Applicants: PANASONIC CORPORATION, Osaka (JP); MORIMURA SOFC TECHNOLOGY CO., LTD., Aichi (JP)

(72) Inventors: Shigenori Onuma, Kyoto (JP); Kunihiro Ukai, Nara (JP); Hiroshi Shirahama, Fukuoka (JP); Takeshi Saito, Fukuoka (JP); Yosuke Akagi, Fukuoka (JP); Taiichiro Sakamoto, Fukuoka (JP); Toshiharu Ooe, Fukuoka (JP); Toshiharu Otsuka, Fukuoka (JP)

(73) Assignees: PANASONIC CORPORATION, Osaka (JP); MORIMURA SOFC TECHNOLOGY CO., LTD., Aichi (JP)

(*) Notice: Subject to any disclaimer, the term of this patent is extended or adjusted under 35 U.S.C. 154(b) by 0 days.

(21) Appl. No.: 16/913,011

(22) Filed: Jun. 26, 2020

(65) Prior Publication Data

US 2020/0328436 A1 Oct. 15, 2020

Related U.S. Application Data

(62) Division of application No. 15/521,819, filed as application No. PCT/JP2015/005858 on Nov. 25, 2015, now Pat. No. 10,741,858.

(30) Foreign Application Priority Data

Nov. 27, 2014 (JP) .............................. JP2014-240328
Nov. 27, 2014 (JP) .............................. JP2014-240329

(51) Int. Cl.
*H01M 8/04228* (2016.01)
*H01M 8/04303* (2016.01)
(Continued)

(52) U.S. Cl.
CPC ... *H01M 8/04228* (2016.02); *H01M 8/04022* (2013.01); *H01M 8/0432* (2013.01);
(Continued)

(58) Field of Classification Search
CPC ..... H01M 2008/1293; H01M 8/04022; H01M 8/04089; H01M 8/04201; H01M 8/04228;
(Continued)

(56) References Cited

U.S. PATENT DOCUMENTS

2010/0047636 A1 2/2010 Tamura et al.
2010/0304247 A1 12/2010 Tamura et al.
(Continued)

FOREIGN PATENT DOCUMENTS

JP 2007-193980 A 8/2007
JP 2007-290942 A 11/2007
(Continued)

OTHER PUBLICATIONS

International Search Report and Written Opinion issued in International Patent Application No. PCT/JP2015/005858, dated Mar. 1, 2016; with partial English translation.
(Continued)

*Primary Examiner* — Lingwen R Zeng
(74) *Attorney, Agent, or Firm* — McDermott Will and Emery LLP

(57) ABSTRACT

A fuel cell system includes: a fuel cell; a reformer to generate a hydrogen-containing gas; an electric power generation raw material supply unit; a reforming material supply unit configured to supply at least one of reforming water and reforming air, to the reformer; an oxidizing gas supply unit to supply an oxidizing gas to a cathode of the fuel cell; a combustor to ignite an exhaust gas discharged from the fuel cell; and a controller. In an operation stop process of the fuel cell system, the controller causes the oxidizing gas
(Continued)

supply unit to supply the oxidizing gas, causes the electric power generation raw material supply unit and the reforming material supply unit to intermittently supply the electric power generation raw material and at least one of the water and the air to the reformer, and causes the ignitor to perform an ignition operation.

3 Claims, 25 Drawing Sheets

(51) Int. Cl.
| | |
|---|---|
| *H01M 8/04082* | (2016.01) |
| *H01M 8/04089* | (2016.01) |
| *H01M 8/0432* | (2016.01) |
| *H01M 8/04746* | (2016.01) |
| *H01M 8/04014* | (2016.01) |
| *H01M 8/04537* | (2016.01) |
| *H01M 8/0612* | (2016.01) |
| *H01M 8/0662* | (2016.01) |
| *H01M 8/0438* | (2016.01) |
| *H01M 8/124* | (2016.01) |

(52) U.S. Cl.
CPC ... *H01M 8/04089* (2013.01); *H01M 8/04201* (2013.01); *H01M 8/04303* (2016.02); *H01M 8/04373* (2013.01); *H01M 8/04388* (2013.01); *H01M 8/04552* (2013.01); *H01M 8/04753* (2013.01); *H01M 8/0618* (2013.01); *H01M 8/0675* (2013.01); *H01M 2008/1293* (2013.01)

(58) Field of Classification Search
CPC .......... H01M 8/04303; H01M 8/0432; H01M 8/04373; H01M 8/04388; H01M 8/04552; H01M 8/04753; H01M 8/0618; H01M 8/0675; Y02E 60/50

See application file for complete search history.

(56) References Cited

U.S. PATENT DOCUMENTS

| | | | |
|---|---|---|---|
| 2010/0323257 A1 | 12/2010 | Fujihara et al. | |
| 2011/0269038 A1* | 11/2011 | Yukimasa | H01M 8/0618 |
| | | | 429/423 |
| 2016/0149247 A1 | 5/2016 | Kita et al. | |

FOREIGN PATENT DOCUMENTS

| | | |
|---|---|---|
| JP | 2010-067539 A | 3/2010 |
| JP | 2010-150134 A | 7/2010 |
| JP | 2013-186945 A | 9/2013 |
| JP | 2013-211166 A | 10/2013 |
| JP | 2014-107187 A | 6/2014 |

OTHER PUBLICATIONS

Extended Search Report dated Dec. 21, 2017, issued in corresponding European Patent Application No. 15863406.3.
Extended Search Report dated Oct. 16, 2017, issued in corresponding European Patent Application No. 15863406.3.
Non-Final Office Action issued in U.S. Appl. No. 15/521,819, dated Oct. 31, 2019.
Notice of Allowance issued in U.S. Appl. No. 15/521,819, dated Apr. 13, 2020.

* cited by examiner

FUEL CELL SYSTEM

CROSS-REFERENCE OF RELATED APPLICATIONS

This application is a Divisional application of U.S. patent application Ser. No. 15/521,819, filed on Apr. 25, 2017, which is the U.S. National Phase under 35 U.S.C. § 371 of International Patent Application No. PCT/JP2015/005858, filed on Nov. 25, 2015, which in turn claims the benefit of Japanese Application No. 2014-240328, filed on Nov. 27, 2014 and Japanese Application No. 2014-240329, filed on Nov. 27, 2014, the entire disclosures of which Applications are incorporated by reference herein.

TECHNICAL FIELD

The present invention relates to an operation stop process of a fuel cell system.

BACKGROUND ART

Generally, a solid-oxide fuel cell system is a system that generates electric power in such a manner that: a hydrogen-containing gas and air are supplied to a fuel cell that is a main body of an electric power generating portion; and chemical energy generated by an electrochemical reaction between hydrogen and oxygen in the air is taken out as electric energy. During a steady operation of the solid-oxide fuel cell system, a solid-oxide fuel cell operates at a high temperature of 500 to 900° C.

The solid-oxide fuel cell system includes a hydrogen generator configured to generate the hydrogen-containing gas (reformed gas). As a raw material (electric power generation raw material) for generating the hydrogen-containing gas, the hydrogen generator uses a fossil material, such as a city gas or LPG which contains a natural gas as a major component. The hydrogen generator includes a reformer, and the reformer generates the hydrogen-containing gas by a reaction (reforming reaction) between the electric power generation raw material and steam at a high temperature around 600° C. by using, for example, a Ru catalyst or a Ni catalyst. During the steady operation of the solid-oxide fuel cell system, the reformer is maintained at a high temperature of 400 to 700° C. and is continuously supplied with the electric power generation raw material and water or the like to generate the hydrogen-containing gas by the reforming reaction using the catalyst.

The solid-oxide fuel cell system includes an evaporator that generates steam from water supplied from outside, the steam being necessary in the reforming reaction in the reformer. During the steady operation of the solid-oxide fuel cell system, the evaporator is maintained at a high temperature of 100 to 300° C.

In an operation stop process executed when stopping the operation of the solid-oxide fuel cell system, the fuel cell, the reformer, the evaporator, and the like which are operating at high temperatures need to be cooled to predetermined temperatures, and the hydrogen-containing gas remaining in the reformer, the fuel cell, and channels through which the hydrogen-containing gas flows needs to be purged. The reasons for this are as below. The remaining hydrogen-containing gas contains steam. Therefore, when the temperature of the hydrogen-containing gas becomes a dew point or lower in a cooling process, the steam condenses into water. At this time, air intrudes from outside by pressure decrease. Therefore, an anode material is oxidized by the air. On this account, by repeating start-up and stop, the oxidation and reduction of the anode material are repeated. This becomes a cause of significantly deteriorating durability of the anode material. Further, the condensed water becomes a cause of significantly deteriorating durability of the catalyst filled in the reformer or a desulfurizer in addition to the anode. It should be noted that a process which is executed when stopping the operation of the solid-oxide fuel cell system and includes a plurality of processing steps such as the purge is referred to as the operation stop process. The operation stop process is a process from when an electric power generation stop instruction is received until when the supply of the hydrogen-containing gas and the supply of an oxidizing gas are stopped. The supply stop of the hydrogen-containing gas and the supply stop of the oxidizing gas may be performed when, for example, the temperature of a stack of the solid-oxide fuel cell or the temperature of the reformer reaches a predetermined temperature (100° C., for example).

Conventionally known is a solid-oxide fuel cell system in which in the operation stop process, the purge of the hydrogen-containing gas is performed by forming a reduction atmosphere using an inactive gas such as nitrogen. However, when the purge is performed using the inactive gas, channels dedicated for the purge need to be provided, and this causes a problem in which the solid-oxide fuel cell system increases in size. Therefore, proposed is a fuel cell system in which the purge of the hydrogen-containing gas is performed by using a raw material gas (PTL 1, for example).

CITATION LIST

Patent Literature

PTL 1: Japanese Laid-Open Patent Application Publication No. 2013-186945

SUMMARY OF INVENTION

Technical Problem

The present invention provides a fuel cell system capable of safely stopping its operation while preventing its durability from deteriorating.

Solution to Problem

To solve the above problem, a fuel cell system according to the present invention includes: a solid-oxide fuel cell; a reformer operative to reform an electric power generation raw material to generate a hydrogen-containing gas and supply the hydrogen-containing gas to an anode of the solid-oxide fuel cell; an electric power generation raw material supply unit operative to supply the electric power generation raw material to the reformer; a reforming material supply unit operative to supply at least one of reforming water and reforming air, utilized in a reforming reaction, to the reformer; an oxidizing gas supply unit operative to supply an oxidizing gas to a cathode of the solid-oxide fuel cell; a combustor including an ignitor operative to ignite an exhaust gas discharged from the solid-oxide fuel cell; and a controller, wherein in an operation stop process of the fuel cell system, the controller causes the oxidizing gas supply unit to supply the oxidizing gas to the cathode of the solid-oxide fuel cell, causes the electric power generation raw material supply unit and the reforming material supply unit to intermittently supply the electric power generation raw material and the at least one of the water and the air to the reformer, and causes the ignitor of the combustor to perform an ignition operation.

Further, to solve the above problem, a fuel cell system according to the present invention includes: a solid-oxide fuel cell; a reformer operative to reform an electric power generation raw material to generate a hydrogen-containing gas and supply the hydrogen-containing gas to the solid-oxide fuel cell; an electric power generation raw material supply unit operative to supply the electric power generation raw material to the reformer; a reforming water supply unit operative to supply water to the reformer, the water being utilized in a reforming reaction in the reformer; an evaporator operative to evaporate the water supplied from the reforming water supply unit to the reformer; a heater operative to heat the evaporator; an oxidizing gas supply unit operative to supply an oxidizing gas to the solid-oxide fuel cell; a combustible gas channel through which the electric power generation raw material or the hydrogen-containing gas flows as a combustible gas and which is a channel extending from the electric power generation raw material supply unit to the solid-oxide fuel cell; an oxidizing gas channel through which the oxidizing gas flows and which is a channel extending from the oxidizing gas supply unit to the solid-oxide fuel cell; and a temperature detecting portion operative to detect at least one of temperatures of the evaporator, the reformer, and the solid-oxide fuel cell, the temperatures changing in conjunction with one another; and a controller, wherein in an operation stop process of the solid-oxide fuel cell, the controller causes the electric power generation raw material supply unit and the reforming water supply unit to supply the electric power generation raw material and the water to the combustible gas channel and causes the oxidizing gas supply unit to supply the oxidizing gas to the oxidizing gas channel, and when the controller determines based on a detection result of the temperature detecting portion that an operating temperature of the evaporator is a lower limit or less, the controller causes the heater to heat the evaporator.

Advantageous Effects of Invention

The fuel cell system according to the present invention is configured as above and has an effect of being able to safely stop its operation while preventing its durability from deteriorating. Further, since the fuel cell system according to the present invention is configured such that the electric power generation raw material and at least one of the water and the air are intermittently supplied to the reformer, the fuel cell system according to the present invention has an effect of being able to reduce the temperatures of the solid-oxide fuel cell, the reformer, and the like more quickly than a case where the electric power generation raw material and the like are continuously supplied to the reformer.

DESCRIPTION OF EMBODIMENTS

Figure 1:
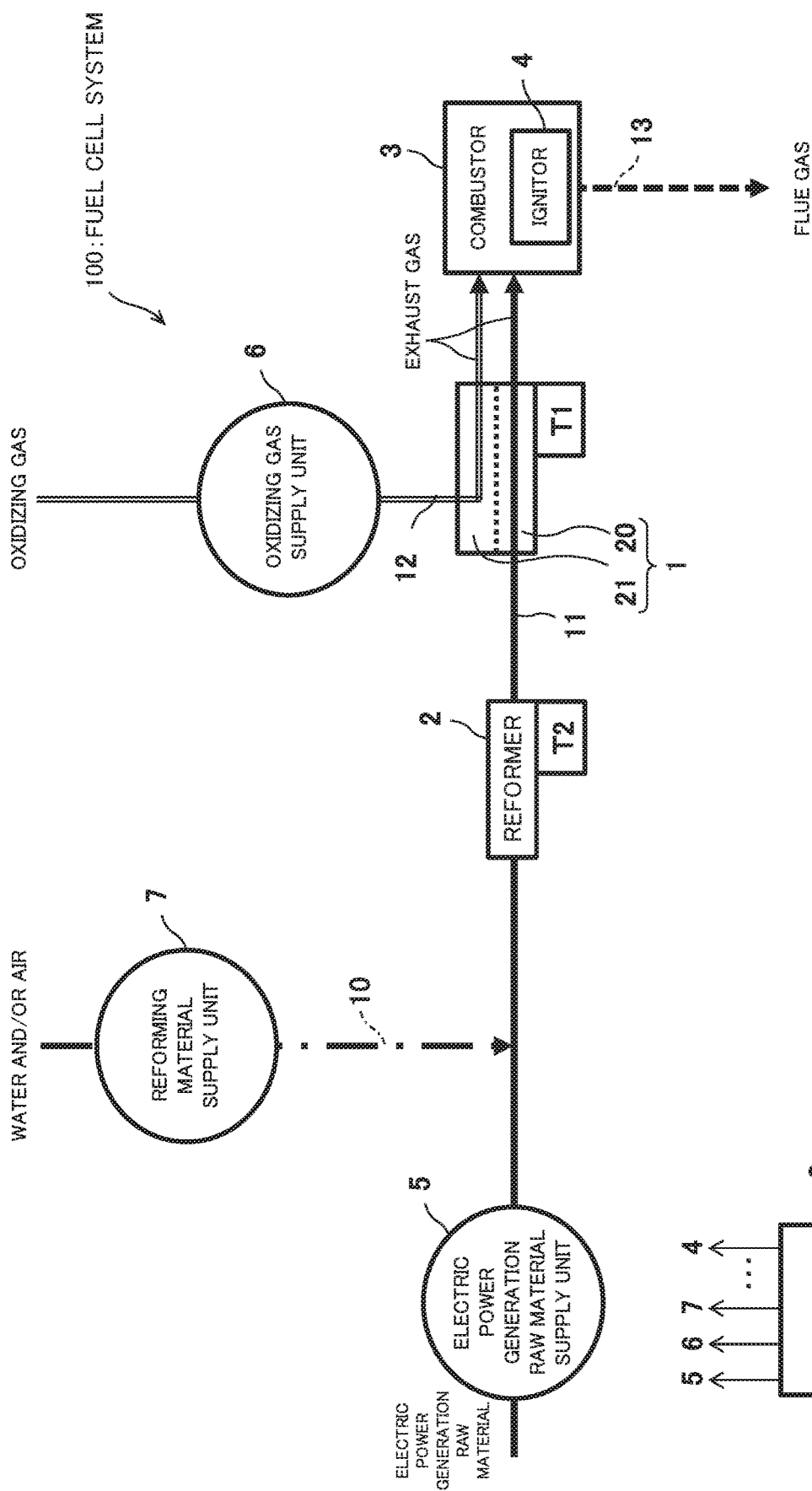
FIG. 1 is a block diagram showing one example of a schematic configuration of a fuel cell system according to Embodiment 1 of the present invention.

Circumstances Under Which One Aspect of Present invention was Made

The present inventors have diligently studied the fuel cell system according to PTL 1 described in "Background Art" and obtained the following findings.

To be specific, the present inventors have noticed that in the case of the fuel cell system in which the purge is performed by using the raw material gas (electric power generation raw material) as in PTL 1, the electric power generation raw material that is a combustible gas is discharged as it is to an outside of the system. Further, the present inventors have found that if the electric power generation raw material is supplied to the reformer or the anode of the fuel cell which are high in temperature after an operation stop, there is a possibility that a hydrocarbon raw material is decomposed in the reformer or the anode to cause carbon deposition, and this damages the reformer or the anode.

Based on the above findings, the present inventors have found that the operation of the fuel cell system can be safely stopped in such a manner that the combustible electric power generation raw material used for the purge is combusted before it is discharged to the outside of the system. Further, the present inventors have found that the carbon deposition in the reformer or the anode of the solid-oxide fuel cell can be prevented in such a manner that the purge is performed by a hydrogen-containing gas (reformed gas) generated by reforming the electric power generation raw material, instead of by the electric power generation raw material. Thus, the present invention was made. Specifically, the present invention provides aspects described later.

Furthermore, the present inventors have diligently studied the fuel cell system according to PTL 1 described in "Background Art" and obtained the following findings.

The present inventors have found out that according to PTL 1, even when the temperature of the stack of the fuel cell is a low temperature such as about 150 to 300° C. in the operation stop process, a purge gas (the electric power generation raw material, for example) needs to be supplied to the anode. This is because if the purge gas is not supplied to the anode, there is a possibility that: air flows into a downstream portion of the anode from outside; a local battery is formed between an upstream portion of the anode and the downstream portion of the anode; and the anode material oxidizes.

Further, in a case where the fuel cell system is configured such that an anode off gas and a cathode off gas are mixed at a downstream side of the fuel cell, and when the supply of the purge gas (the oxidizing gas, for example) to the cathode is stopped and the supply of the purge gas (the electric power generation raw material, for example) to the anode is performed in the operation stop process, there is a possibility that the purge gas supplied to the anode flows into the cathode through a downstream side of the cathode. This is because reforming water remaining in the system after the stop of the fuel cell is evaporated by remaining heat, and pressure in the anode of the fuel cell is higher than pressure in the cathode of the fuel cell. As above, if the purge gas supplied to the anode flows into the cathode, a cathode material may be reduced, and the performance of the fuel cell may deteriorate.

Based on the above findings, the present inventors have found that the oxidation of the anode and the reduction of the cathode can be prevented in such a manner that until the temperature of the stack of the fuel cell decreases to about 150° C., the hydrogen-containing gas (reformed gas) is supplied to the anode, and the oxidizing gas is supplied to the cathode. Further, the present inventors have found that the carbon deposition caused by supplying the electric power generation raw material to the anode can be prevented since the hydrogen-containing gas (reformed gas) generated by reforming the raw material gas is supplied in a predetermined temperature range in which the hydrocarbon raw material is decomposed to cause the carbon deposition. Thus, the present invention was made. Specifically, the present invention provides the aspects described below.

A fuel cell system according to a first aspect of the present invention includes: a solid-oxide fuel cell; a reformer operative to reform an electric power generation raw material to generate a hydrogen-containing gas and supply the hydrogen-containing gas to an anode of the solid-oxide fuel cell; an electric power generation raw material supply unit operative to supply the electric power generation raw material to the reformer; a reforming material supply unit operative to supply at least one of reforming water and reforming air, utilized in a reforming reaction, to the reformer; an oxidizing gas supply unit operative to supply an oxidizing gas to a cathode of the solid-oxide fuel cell; a combustor including an ignitor operative to ignite an exhaust gas discharged from the solid-oxide fuel cell; and a controller, wherein in an operation stop process of the fuel cell system, the controller causes the oxidizing gas supply unit to supply the oxidizing gas to the cathode of the solid-oxide fuel cell, causes the electric power generation raw material supply unit and the reforming material supply unit to intermittently supply the electric power generation raw material and the at least one of the water and the air to the reformer, and causes the ignitor of the combustor to perform an ignition operation.

According to the above configuration, since the controller causes the oxidizing gas supply unit to supply the oxidizing gas to the cathode of the solid-oxide fuel cell, the channel extending from the oxidizing gas supply unit to the cathode of the solid-oxide fuel cell can be purged by the oxidizing gas. Further, the controller causes the electric power generation raw material supply unit and the reforming material supply unit to intermittently supply the electric power generation raw material and at least one of the water and the air to the reformer. To be specific, the hydrogen-containing gas generated by utilizing the electric power generation raw material and at least one of the water and the air in the reforming reaction in the reformer can be intermittently supplied to the anode of the solid-oxide fuel cell. Therefore, the channel extending from the reformer to the anode of the solid-oxide fuel cell can be purged by the hydrogen-containing gas. Further, unlike a hydrocarbon raw material such as the electric power generation raw material, the hydrogen-containing gas utilized in the purge does not cause carbon deposition even if the hydrogen-containing gas is subjected to high temperature. Therefore, the deterioration of the durability of the fuel cell system by the carbon deposition can be prevented.

Although the oxidizing gas and the hydrogen-containing gas supplied to the solid-oxide fuel cell are discharged as the exhaust gas from the solid-oxide fuel cell, the exhaust gas can be combusted by the ignition of the ignitor of the combustor. Therefore, the combustible gas itself can be prevented from being discharged to the outside of the fuel cell system.

Therefore, the fuel cell system according to the first aspect of the present invention has an effect of being able to safely stop its operation while preventing its durability from deteriorating. Further, since the fuel cell system according to the first aspect of the present invention is configured such that the electric power generation raw material and at least one of the water and the air (hereinafter referred to as "the electric power generation raw material and the like") are intermittently supplied to the reformer, the fuel cell system according to the first aspect of the present invention has an effect of being able to reduce the temperatures of the solid-oxide fuel cell, the reformer, and the like more quickly than a case where the electric power generation raw material and the like are continuously supplied to the reformer. For example, in a case where the electric power generation raw material and the like are continuously supplied to the reformer in the operation stop process of the fuel cell system, the supply units configured to supply the electric power generation raw material and the like continuously operate. To be specific, even when the supply of the electric power generation raw material and the like is unnecessary, the supply units supply the electric power generation raw material and the like at minimum flow rates or more, and the exhaust gas discharged from the solid-oxide fuel cell is continuously combusted. On the other hand, the fuel cell system according to the first aspect of the present invention is configured such that the electric power generation raw material and the like are intermittently supplied. Therefore, it is possible to prevent a case where the exhaust gas discharged from the solid-oxide fuel cell is continuously combusted. On this account, the fuel cell system according to the first aspect of the present invention can decrease the temperatures of the solid-oxide fuel cell, the reformer, and the like more quickly than a case where the electric power generation raw material and the like are continuously supplied.

The fuel cell system according to a second aspect of the present invention may be configured such that the fuel cell system according to the first aspect further includes: a purifier provided downstream of the combustor to purify a combustible gas contained in a flue gas discharged from the combustor; and a purifier temperature detecting portion operative to detect a temperature of the purifier as a temperature detecting portion operative to detect a temperature of the fuel cell system, wherein when a detection result of the purifier temperature detecting portion is less than a predetermined temperature, the controller causes the ignitor to perform the ignition operation.

The predetermined temperature is, for example, a lower limit of a temperature at which the purification catalyst of the purifier becomes active.

According to the above configuration, when the purifier temperature is the predetermined temperature or more, the controller does not cause the ignitor to operate but causes the purifier to purify the combustible gas. In contrast, when the purifier temperature is less than the predetermined temperature, the temperature of the purification catalyst is less than the temperature at which the purification catalyst of the purifier becomes active. Therefore, the controller causes the ignitor to combust the combustible gas in the combustor.

On this account, in the fuel cell system, by combining the purifier capable of purifying the combustible gas in a lower temperature range than the combustor and the combustor configured to combust and purify the combustible gas, the purification of the remaining combustible gas can be more surely achieved, and the amount of heat necessary in the combustor can be suppressed. Therefore, the temperature of the fuel cell system can be reduced more surely and efficiently than a case where the purification of the combustible gas is performed only by the combustor. Further, since the amount of heat necessary in the combustor and the supply amount of raw material can be suppressed, the reduction in the consumption energy in the stop manipulation of the fuel cell system and the reduction in the stop time can be realized.

The fuel cell system according to a third aspect of the present invention may be configured such that the fuel cell system according to the first or second aspect further includes a desulfurizer operative to remove a sulfur compound contained in the electric power generation raw material.

According to the above configuration, since the desulfurizer is included, the sulfur compound contained in the electric power generation raw material can be removed. With this, it is possible to prevent a case where the reforming catalyst of the reformer located downstream of the desulfurizer is poisoned by the sulfur compound contained in the electric power generation raw material.

The fuel cell system according to a fourth aspect of the present invention may be configured such that the fuel cell system according to the third aspect further includes a heater portion through which the exhaust gas combusted in the combustor flows and which is operative to heat the desulfurizer by heat of the combusted exhaust gas.

According to the above configuration, since the heater portion is included, the desulfurizer can be heated by efficiently utilizing the heat of the combusted exhaust gas.

The fuel cell system according to a fifth aspect of the present invention may be configured such that in the fuel cell system according to the third or fourth aspect, the desulfuizer is a hydro-desulfurizer operative to utilize hydrogen to remove the sulfur compound from the electric power generation raw material.

The fuel cell system according to a sixth aspect of the present invention may be configured such that in the fuel cell system according to any one of the first to fifth aspects, the controller causes the electric power generation raw material supply unit and the reforming material supply unit to intermittently supply the electric power generation raw material and the at least one of the water and the air to the reformer at predetermined time intervals.

According to the above configuration, the controller can intermittently supply the electric power generation raw material and at least one of the water and the air to the reformer at the predetermined time intervals. Therefore, the channel extending from the reformer to the anode of the solid-oxide fuel cell can be purged by the hydrogen-containing gas while making the consumption of the electric power generation raw material smaller than a case where the electric power generation raw material is supplied at all times.

The fuel cell system according to a seventh aspect of the present invention may be configured such that: in the fuel cell system according to any one of the third to fifth aspects, temperatures of the reformer, the solid-oxide fuel cell, and the desulfurizer change in conjunction with one another; the fuel cell system further includes, as a temperature detecting portion operative to detect a temperature of the fuel cell system, at least one of a reformer temperature detecting portion operative to detect the temperature of the reformer, a fuel cell temperature detecting portion operative to detect the temperature of the solid-oxide fuel cell, and a desulfurizer temperature detecting portion operative to detect the temperature of the desulfurizer; and based on whether or not the temperature detected by the at least one of the reformer temperature detecting portion, the fuel cell temperature detecting portion, and the desulfurizer temperature detecting portion falls within a predetermined temperature range, the controller causes the electric power generation raw material supply unit and the reforming material supply unit to intermittently supply the electric power generation raw material and the at least one of the water and the air to the reformer.

The temperatures of the reformer, the solid-oxide fuel cell, and the desulfurizer change in conjunction with one another. Therefore, when the temperature changes of the respective portions are stored in association with one another, and the temperature change of any of the respective portions is recognized, the temperature changes of the other portions can be recognized.

According to the above configuration, the controller can intermittently supply the electric power generation raw material and at least one of the water and the air to the reformer based on whether or not the temperature detected by at least one of the reformer temperature detecting portion, the fuel cell temperature detecting portion, and the desulfurizer temperature detecting portion falls within the predetermined temperature range. The predetermined temperature range used to determine whether or not the electric power generation raw material and at least one of the water and the air are intermittently supplied to the reformer may be set to a range in which, for example, the temperatures of the reformer, the solid-oxide fuel cell, and the desulfurizer do not excessively increase.

Therefore, in the fuel cell system according to the seventh aspect, the channel extending from the reformer to the anode of the solid-oxide fuel cell can be purged by the hydrogen-containing gas while monitoring the temperatures of the reformer, the solid-oxide fuel cell, and the desulfurizer such that those temperatures do not excessively increase.

The fuel cell system according to an eighth aspect of the present invention may be configured such that in the fuel cell system according to the seventh aspect, based on an increased value or decreased value of the temperature detected by the at least one of the reformer temperature detecting portion, the fuel cell temperature detecting portion, and the desulfurizer temperature detecting portion, the controller causes the electric power generation raw material supply unit and the reforming material supply unit to intermittently supply the electric power generation raw material and the at least one of the water and the air to the reformer.

The fuel cell system according to a ninth aspect of the present invention may be configured such that the fuel cell system according to any one of the first to fifth aspects further includes: a combustible gas channel which is a channel extending from the electric power generation raw material supply unit to the anode of the solid-oxide fuel cell and through which a combustible gas containing the electric power generation raw material flows; and a pressure sensor provided at the combustible gas channel to detect pressure in the combustible gas channel, wherein when the pressure in the combustible gas channel is negative pressure as a detection result of the pressure sensor, the controller causes the electric power generation raw material supply unit and the reforming material supply unit to intermittently supply the electric power generation raw material and the at least one of the water and the air to the reformer at predetermined time intervals.

According to the above configuration, when the pressure in the combustible gas channel becomes the negative pressure, the controller intermittently supplies the electric power generation raw material and at least one of the water and the air to the reformer at the predetermined time intervals. Therefore, monitoring is performed to prevent a case where air flows into the combustible gas channel from outside since the pressure in the combustible gas channel becomes the negative pressure. Even if the pressure in the combustible gas channel becomes the negative pressure, the pressure in the combustible gas channel can be increased by supplying the electric power generation raw material and at least one of the water and the air.

Therefore, in the fuel cell system according to the ninth aspect, the channel extending from the reformer to the anode of the solid-oxide fuel cell can be purged by the hydrogen-containing gas while preventing the air from flowing into the combustible gas channel from outside.

The fuel cell system according to a tenth aspect of the present invention may be configured such that the fuel cell system according to any one of the first to fifth aspects further includes a voltage detector operative to detect a voltage of the solid-oxide fuel cell, wherein each time the voltage detected by the voltage detector becomes a predetermined voltage or less, the controller causes the electric power generation raw material supply unit and the reforming material supply unit to supply the electric power generation raw material and the at least one of the water and the air to the reformer.

The predetermined voltage is a voltage detected from the solid-oxide fuel cell in a case where the air flows into the combustible gas channel from outside since the pressure in the combustible gas channel becomes the negative pressure.

According to the above configuration, each time the voltage of the solid-oxide fuel cell detected by the voltage detector becomes the predetermined voltage or less, the controller can supply the electric power generation raw material and at least one of the water and the air to the reformer. To be specific, whether or not the pressure in the combustible gas channel is the negative pressure can be recognized based on the reduction in the voltage of the solid-oxide fuel cell. More specifically, when the pressure in the combustible gas channel becomes the negative pressure, the air flows into the combustible gas channel from outside, and oxygen partial pressure in the anode becomes high. With this, a potential difference between the cathode and the anode becomes small, and the voltage of the solid-oxide fuel cell becomes low. On this account, that the voltage of the solid-oxide fuel cell is the predetermined voltage or less in a state where the temperature of the solid-oxide fuel cell is not less than a predetermined temperature (120° C., for example) at which the voltage of the solid-oxide fuel cell is detectable means that the air flows into the combustible gas channel from outside since the pressure in the combustible gas channel becomes the negative pressure. Therefore, when the voltage of the solid-oxide fuel cell is the predetermined voltage or less, the electric power generation raw material and at least one of the water and the air are supplied to the combustible gas channel. With this, the pressure in the combustible gas channel can be increased, and the intrusion of the air from outside can be suppressed.

On this account, in the fuel cell system according to the tenth aspect, the channel extending from the reformer to the anode of the solid-oxide fuel cell can be purged by the hydrogen-containing gas while preventing the air from flowing into the combustible gas channel form outside.

The fuel cell system according to an eleventh aspect of the present invention may be configured such that: in the fuel cell system according to the ninth aspect, the reforming material supply unit is a reforming water supply unit operative to supply the reforming water, utilized in the reforming reaction, to the reformer; the fuel cell system further includes an evaporator operative to evaporate the water supplied from the reforming water supply unit to the reformer, a heater operative to heat the evaporator, and an oxidizing gas channel through which the oxidizing gas flows and which is a channel extending from the oxidizing gas supply unit to the solid-oxide fuel cell; temperatures of the evaporator, the reformer, and the solid-oxide fuel cell change in conjunction with one another; the fuel cell system further includes, as a temperature detecting portion operative to detect a temperature of the fuel cell system, at least one of an evaporator temperature detecting portion operative to detect the temperature of the evaporator, a reformer temperature detecting portion operative to detect the temperature of the reformer, and a fuel cell temperature detecting portion operative to detect the temperature of the solid-oxide fuel cell; and in the operation stop process of the fuel cell system, the controller causes the electric power generation raw material supply unit and the reforming water supply unit to supply the electric power generation raw material and the water to the combustible gas channel and causes the oxidizing gas supply unit to supply the oxidizing gas to the oxidizing gas channel, and when the controller determines based on a detection result of the temperature detecting portion that an operating temperature of the evaporator is a lower limit or less, the controller causes the heater to heat the evaporator.

According to the above configuration, when the controller determines that the operating temperature of the evaporator is the lower limit or less, the controller causes the heater to heat the evaporator. Therefore, it is possible to prevent a malfunction in which due to the temperature decrease in the operation stop process of the fuel cell, the evaporator cannot adequately evaporate the water, and therefore, the reforming reaction does not adequately proceed in the reformer. On this account, even in the operation stop process of the fuel cell, the reformer can continuously generate the hydrogen-containing gas, and the combustible gas channel can be purged by the hydrogen-containing gas.

The fuel cell system according to a twelfth aspect of the present invention includes: a fuel cell; a reformer operative to reform an electric power generation raw material to generate a hydrogen-containing gas and supply the hydrogen-containing gas to the fuel cell; an electric power generation raw material supply unit operative to supply the electric power generation raw material to the reformer; a reforming water supply unit operative to supply water to the reformer, the water being utilized in a reforming reaction in the reformer; an evaporator operative to evaporate the water supplied from the reforming water supply unit to the reformer; a heater operative to heat the evaporator; an oxidizing gas supply unit operative to supply an oxidizing gas to the fuel cell; a combustible gas channel through which the electric power generation raw material or the hydrogen-containing gas flows as a combustible gas and which is a channel extending from the electric power generation raw material supply unit to the fuel cell; an oxidizing gas channel through which the oxidizing gas flows and which is a channel extending from the oxidizing gas supply unit to the fuel cell; and a temperature detecting portion operative to detect at least one of temperatures of the evaporator, the reformer, and the fuel cell, the temperatures changing in conjunction with one another; and a controller, wherein in an operation stop process of the fuel cell, the controller causes the electric power generation raw material supply unit and the reforming water supply unit to supply the electric power generation raw material and the water to the combustible gas channel and causes the oxidizing gas supply unit to supply the oxidizing gas to the oxidizing gas channel, and when the controller determines based on a detection result of the temperature detecting portion that an operating temperature of the evaporator is a lower limit or less, the controller causes the heater to heat the evaporator.

The lower limit of the operating temperature of the evaporator is a lower limit of a temperature of the evaporator which temperature is necessary to evaporate the water.

According to the above configuration, in the operation stop process of the fuel cell, the controller causes the electric power generation raw material and the water to flow through the combustible gas channel. Therefore, the electric power generation raw material and the water become the hydrogen-containing gas by the reforming reaction in the reformer, and the combustible gas channel can be purged by the hydrogen-containing gas. Since the combustible gas channel can be purged by the hydrogen-containing gas as above, it is possible to prevent a case where the air flows into the combustible gas channel from outside due to the pressure decrease in the combustible gas channel by the gas contraction in the combustible gas channel by the temperature decrease and the pressure decrease in the combustible gas channel by the condensation of the steam by the temperature decrease. Therefore, in addition to the oxidation of the anode by the air at a downstream side of the anode at a low temperature, the oxidation of the anode by local battery generation at an upstream side of the anode by the intrusion of the air from the downstream side of the anode can also be suppressed.

Further, the combustible gas channel is purged by the hydrogen-containing gas. Therefore, for example, unlike the electric power generation raw material, the hydrogen-containing gas does not cause the carbon deposition on the anode of the fuel cell and the reforming catalyst of the reformer by the decomposition even if the hydrogen-containing gas is high in temperature in the operation stop process. On this account, the anode and the reforming catalyst can be prevented from deteriorating, and the durability can be improved.

Further, the controller causes the oxidizing gas to flow through the oxidizing gas channel. Therefore, the oxidizing gas channel can be purged by the oxidizing gas, so that it is possible to prevent a case where the hydrogen-containing gas flows into the oxidizing gas channel from the combustible gas channel in the operation stop process of the fuel cell.

Further, when the controller determines that the operating temperature of the evaporator is the lower limit or less, the controller causes the heater to heat the evaporator. Therefore, it is possible to prevent a malfunction in which due to the temperature decrease in the operation stop process of the fuel cell, the evaporator cannot adequately evaporate the water, and therefore, the reforming reaction does not adequately proceed in the reformer. On this account, even in the operation stop process of the fuel cell, the reformer can continuously generate the hydrogen-containing gas, and the combustible gas channel can be purged by the hydrogen-containing gas.

Therefore, the fuel cell system according to the present invention has an effect of being able to stop its operation while improving its durability.

The fuel cell system according to a thirteenth aspect of the present invention may be configured such that the fuel cell system according to the twelfth aspect further includes a purifier operative to purify an exhaust gas containing the combustible gas and the oxidizing gas which are discharged from the fuel cell, wherein the temperature detecting portion detects at least one of: the temperatures of the evaporator, the reformer, and the fuel cell; and a temperature of the purifier which temperature changes in conjunction with the temperatures of the evaporator, the reformer, and the fuel cell.

The fuel cell system according to a fourteenth aspect of the present invention may be configured such that the fuel cell system according to the twelfth or thirteenth aspect further includes an auxiliary reformer provided separately from the reformer and operative to reform the electric power generation raw material to supply the reformed electric power generation raw material to the fuel cell, wherein when the controller determines based on the detection result of the temperature detecting portion that the operating temperature of the evaporator is the lower limit or less, the controller causes the heater to heat the evaporator and the auxiliary reformer.

According to the above configuration, the auxiliary reformer is included and is heated by the heater together with the evaporator. Therefore, even in a case where the reforming reaction does not adequately proceed in the reformer due to the temperature decrease of the reformer after the stop of the fuel cell, the auxiliary reformer heated by the heater can promote the reforming reaction instead of the reformer.

Therefore, in the fuel cell system according to the fourteenth aspect of the present invention, the reformer can continuously generate the hydrogen-containing gas in the operation stop process of the fuel cell, and the combustible gas channel can be purged by the hydrogen-containing gas.

Hereinafter, Embodiment 1 of the present invention will be explained in reference to the drawings. In the following explanations and the drawings, the same reference signs are used for the same or corresponding components, and explanations thereof are omitted.

Embodiment 1

Configuration of Fuel Cell System

First, the configuration of a fuel cell system 100 according to Embodiment 1 of the present invention will be explained in reference to FIG. 1. FIG. 1 is a block diagram showing one example of a schematic configuration of the fuel cell system 100 according to Embodiment 1 of the present invention. The following will explain an example in which the fuel cell system 100 includes a solid-oxide fuel cell as a fuel cell 1, but the present embodiment is not limited to this.

As shown in FIG. 1, the fuel cell system 100 includes: the fuel cell 1; a reformer 2; a combustor 3 including an ignitor 4; an electric power generation raw material supply unit 5; an oxidizing gas supply unit 6; a reforming material supply unit 7; and a controller 8. As channels coupling the respective portions to one another, the fuel cell system 100 includes a reforming material channel 10, a combustible gas channel 11, an oxidizing gas channel 12, and a flue gas channel 13.

The electric power generation raw material supply unit 5 supplies the electric power generation raw material to the reformer 2 and may be configured to be able to adjust the flow rate of the electric power generation raw material supplied to the reformer 2. For example, the electric power generation raw material supply unit 5 may be configured to include a booster and a flow rate control valve or may be configured to include only one of a booster and a flow rate control valve. For example, a motor-driven fixed displacement pump is used as the booster, but the booster is not limited to this. The electric power generation raw material is supplied from an electric power generation raw material supply source. Examples of the electric power generation raw material supply source include a gas bomb and a gas infrastructure.

The oxidizing gas supply unit 6 supplies the oxidizing gas to a cathode 21 of the fuel cell 1 and may be configured to be able to adjust the flow rate of the oxidizing gas supplied to the cathode 21 of the fuel cell 1. For example, the oxidizing gas supply unit 6 may be configured to include a booster and a flow rate control valve or may be configured to include only one of a booster and a flow rate control valve. For example, a motor-driven fixed displacement pump is used as the booster, but the booster is not limited to this. One example of the oxidizing gas is air in the atmosphere.

The reforming material supply unit 7 supplies water (steam) or air, used in a reforming reaction, to the reformer 2 and may be configured to be able to adjust the flow rate of the water (steam) or air supplied to the reformer 2. To be specific, in a case where the reformer 2 is configured to generate the hydrogen-containing gas (reformed gas) by a steam-reforming reaction, the reforming material supply unit 7 supplies the water (steam) to the reformer 2. Further, in a case where the reformer 2 is configured to generate the hydrogen-containing gas by a partial oxidation reforming reaction, the reforming material supply unit 7 supplies the air to the reformer 2. Furthermore, in a case where the reformer 2 is configured to generate the hydrogen-containing gas by an autothermal reaction, the reforming material supply unit 7 supplies at least one of the water (steam) and the air to the reformer 2. The reforming material supply unit 7 may be configured to include a booster and a flow rate control valve or may be configured to include only one of a booster and a flow rate control valve. For example, a motor-driven fixed displacement pump is used as the booster, but the booster is not limited to this.

The reforming material channel 10 is a channel extending from the reforming material supply unit 7 to a merging portion (not shown) of the combustible gas channel 11, the merging portion being located upstream of the reformer 2. At least one of the water and the air utilized in the reforming reaction executed in the reformer 2 flows through the reforming material channel 10.

The combustible gas channel 11 is a channel extending from the electric power generation raw material supply unit 5 through the reformer 2 to an anode 20 of the fuel cell 1.

The electric power generation raw material or the hydrogen-containing gas, which is the combustible gas, flows through the combustible gas channel 11. As shown in FIG. 1, the combustible gas channel 11 corresponds to a section from the electric power generation raw material supply unit 5 to a downstream end of the anode 20 of the fuel cell 1. To be specific, the combustible gas channel 11 is a channel constituted by: a channel through which the electric power generation raw material is introduced from the electric power generation raw material supply unit 5 to the reformer 2; and a channel through which the hydrogen-containing gas generated by reforming the electric power generation raw material in the reformer 2 is introduced to the fuel cell 1.

The oxidizing gas channel 12 is a channel extending from the oxidizing gas supply unit 6 to the cathode 21 of the fuel cell 1. The oxidizing gas flows through the oxidizing gas channel 12. As shown in FIG. 1, the oxidizing gas channel 12 corresponds to a section from the oxidizing gas supply unit 6 to a downstream end of the cathode 21 of the fuel cell 1.

The fuel cell 1 is, for example, a solid-oxide fuel cell configured to generate electric power by an electric power generating reaction utilizing the hydrogen-containing gas (reformed gas) supplied from the reformer 2 through the combustible gas channel 11 and the oxidizing gas supplied through the oxidizing gas channel 12. The fuel cell 1 includes a cell stack formed by connecting a plurality of single cells in series, and each of the single cells includes the anode 20 to which the hydrogen-containing gas is supplied and the cathode 21 to which the oxidizing gas is supplied, and is configured to perform the electric power generating reaction between the anode 20 and the cathode 21 to generate electric power. It should be noted that the fuel cell 1 may be configured such that the cell stacks each formed by the serial connection are connected in parallel.

Examples of the single cell constituting the fuel cell 1 include: a solid electrolyte of yttria stabilized zirconia (YSZ); a solid electrolyte of zirconia doped with ytterbium or scandium; or a solid electrolyte of lanthanum gallate. For example, the single cell formed by YSZ performs the electric power generating reaction in a temperature range of about 600 to 900° C. although the temperature range depends on the thickness of the single cell.

The combustor 3 is a region where the hydrogen-containing gas and the oxidizing gas, which are unconsumed in the electric power generation of the fuel cell 1, are subjected to flame combustion. The ignitor 4 is provided in the combustor 3. The hydrogen-containing gas introduced into the combustor 3 is ignited by the ignitor 4 to be subjected to the flame combustion together with the oxidizing gas. By this flame combustion, heat necessary in the fuel cell 1, the reformer 2, and the like is generated, and a flue gas is generated. The generated flue gas is discharged to the outside of the system through the flue gas channel 13.

To be specific, during the electric power generation of the fuel cell 1, the combustor 3 performs the flame combustion of the hydrogen-containing gas discharged from the anode 20 and the oxidizing gas discharged from the cathode 21 to generate a large amount of heat and the flue gas having a high temperature. The heat of the flue gas generated by the flame combustion is used to keep the fuel cell 1 at a temperature suitable for the electric power generating reaction and heat the reformer 2 to a temperature suitable for the reforming reaction. To effectively utilize the heat of the flue gas, the fuel cell 1, the reformer 2, and the combustor 3 may be accommodated in a casing called a hot module covered with a heat insulating member.

On the other hand, the flue gas generated in the combustor 3 is discharged to the outside of the system through the flue gas channel 13. However, to effectively utilize heat energy of the high-temperature flue gas, for example, a heat exchanger is provided at a portion of the flue gas channel 13, and the oxidizing gas to be supplied to the cathode 21 is increased in temperature by heat exchange between the flue gas and the oxidizing gas. With this, the operation with a higher energy utilization efficiency can be realized.

Although details will be described later, the fuel cell system 100 is configured such that in the operation stop process, the combustible gas channel 11 is purged by the hydrogen-containing gas generated by reforming the electric power generation raw material, and the oxidizing gas channel 12 is purged by the oxidizing gas. Therefore, during the purge, the hydrogen-containing gas is introduced from the anode of the fuel cell 1 to the combustor 3. It should be noted that in the present specification, the electric power generation raw material and the hydrogen-containing gas are collectively called the combustible gas. On the other hand, the oxidizing gas is introduced from the cathode 21 of the fuel cell 1 to the combustor 3. In the combustor 3, the combustible gas is ignited by the ignitor 4 to be subjected to the flame combustion together with the oxidizing gas.

The reformer 2 uses the electric power generation raw material and at least one of water for reforming and air for reforming to generate the hydrogen-containing gas by the reforming reaction. As described above, examples of the reforming reaction performed in the reformer 2 include the steam-reforming reaction, the autothermal reaction, and the partial oxidation reaction. The fuel cell system 100 may suitably include devices necessary for the reforming reaction performed in the reformer 2. For example, when the steam-reforming reaction is executed as the reforming reaction, the fuel cell system 100 may include an evaporator configured to generate steam and a water supply unit configured to supply water to the evaporator.

The electric power generation raw material supplied to the fuel cell system 100 contains an organic compound whose constituent elements are at least carbon and hydrogen. Specific examples of the electric power generation raw material include: gases, such as a city gas containing methane as a major component, a natural gas, a LPG, and a LNG, each containing an organic compound constituted by at least carbon and hydrogen; hydrocarbons; and alcohols such as methanol.

The controller 8 controls various operations of the respective portions of the fuel cell system 100. For example, when executing the purge in the operation stop process of the fuel cell system 100, the controller 8 controls the electric power generation raw material supply unit 5, the oxidizing gas supply unit 6, and the reforming material supply unit 7 in accordance with an elapsed time from the operation stop of the fuel cell 1 or in accordance with the temperature of the fuel cell 1, the temperature of the reformer 2, and the like. Then, the controller 8 adjusts the amount of electric power generation raw material supplied to the reformer 2, the amount of water (steam) or air supplied to the reformer 2, and the amount of oxidizing gas supplied to the fuel cell 1.

As a configuration for realizing such control operations, for example, the controller 8 may include a timer unit (not shown) and may be configured so as to control the supply amount of electric power generation raw material and the supply amount of oxidizing gas in accordance with the elapse of a predetermined time. Or, for example, the fuel cell 1 or the reformer 2 may be provided with a temperature sensor (a fuel cell temperature detecting portion T1, a reformer temperature detecting portion T2), and the controller 8 may be configured to control the supply amount of electric power generation raw material and the supply amount of oxidizing gas in accordance with a detection result by the temperature sensor.

The controller 8 is only required to have a control function and includes a calculation processing portion (not shown) and a storage portion (not shown) configured to store control programs. Examples of the calculation processing portion include a MPU and a CPU, and one example of the storage portion is a non-volatile memory.

The controller 8 may be constituted by a single controller that performs centralized control with respect to the respective portions of the fuel cell system 100 or may be constituted by a plurality of controllers that cooperate to perform distributed control.

Operation Stop Process of Fuel Cell System

Figure 2:
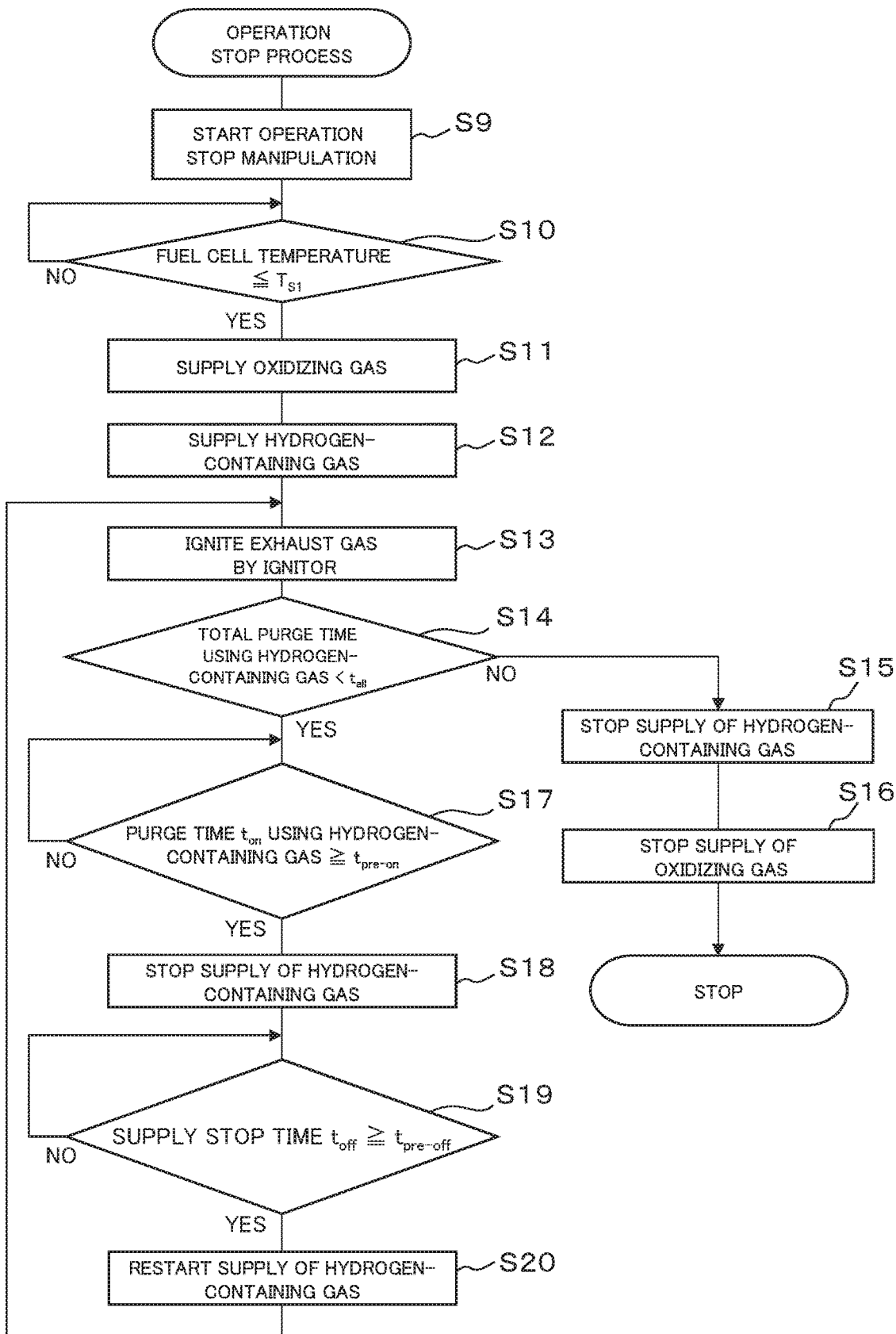
FIG. 2 is a flow chart showing one example of an operation stop process of the fuel cell system according to Embodiment 1 of the present invention.

Next, a specific example of the operation stop process of the fuel cell system 100 according to Embodiment 1 of the present invention will be explained in reference to FIGS. 2 and 3. FIG. 2 is a flow chart showing one example of the operation stop process of the fuel cell system 100 according to Embodiment 1 of the present invention. Operations shown in the flow chart may be realized in such a manner that, for example, the controller 8 reads out and executes the control programs stored in the storage portion (not shown).

Figure 3:
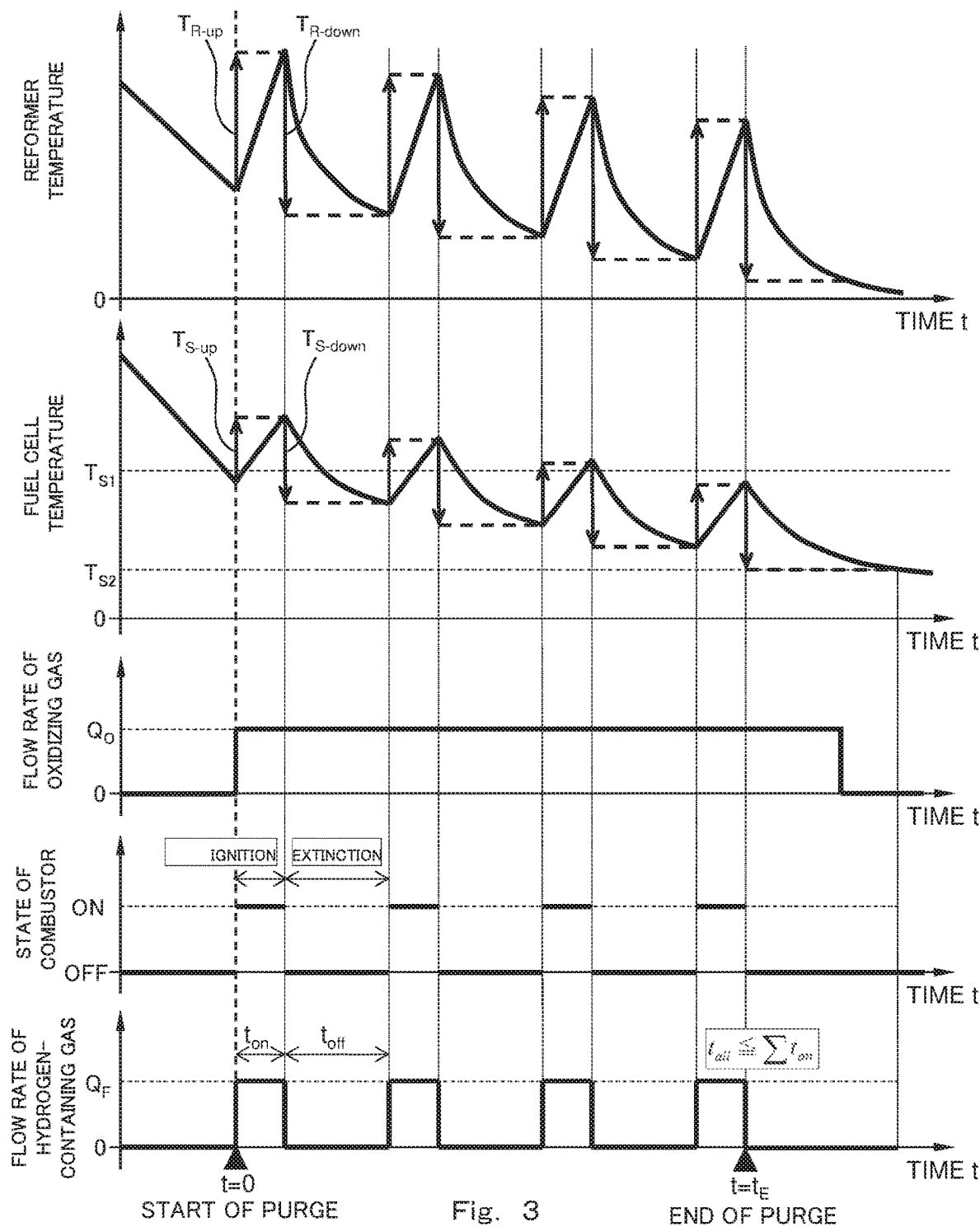
FIG. 3 is a diagram showing one example of time-series changes of respective portions of the fuel cell system in a case where the fuel cell system operates in accordance with the flow chart shown in FIG. 2.

FIG. 3 is a diagram showing one example of time-series changes of the respective portions of the fuel cell system 100 in a case where the fuel cell system 100 operates in accordance with the flow chart shown in FIG. 2. In FIG. 3, a change in the temperature of the reformer 2, a change in the temperature of the fuel cell 1, a change in the flow rate of the oxidizing gas, a change in the flow rate of the hydrogen-containing gas, and a change in a state (ignition or extinction) of the combustor 3 are shown in time series. Further, the graph showing the change in the flow rate of the hydrogen-containing gas shows that: at t=0, the purge of the combustible gas channel 11 by utilizing the hydrogen-containing gas is started; and at $t=t_E$, the purge of the combustible gas channel 11 by utilizing the hydrogen-containing gas is terminated. Furthermore, for convenience of explanation, the flow rate of the hydrogen-containing gas per unit time is a constant flow rate ($Q_F$). In addition, for convenience of explanation, the flow rate of the oxidizing gas per unit time is a constant flow rate ($Q_O$).

First, when the fuel cell system 100 receives a signal that instructs the operation stop (electric power generation stop) or when the fuel cell system 100 determines the operation stop based on a predetermined condition, the controller 8 starts an operation stop manipulation (Step S9). It should be noted that examples of the predetermined condition based on which the controller 8 determines the operation stop include a case where a total operation time of the fuel cell system 100 reaches a predetermined time and a case where a total electric power generation amount of the fuel cell system 100 reaches a predetermined electric power generation amount. When the operation stop manipulation starts, the controller 8 stops the electric power generation of the fuel cell 1. More specifically, the controller 8 causes the electric power generation raw material supply unit 5 and the reforming material supply unit 7 to stop the supply of the electric power generation raw material and the supply of a reforming material (at least one of the water and the air) and also causes the oxidizing gas supply unit 6 to stop the supply of the oxidizing gas. The electric power generation of the fuel cell 1 is stopped as above, and the temperature of the fuel cell 1 decreases as shown in FIG. 3.

For example, the controller 8 receives temperature information of the fuel cell 1 from the fuel cell temperature detecting portion T1 provided to detect the temperature of the fuel cell 1, the temperature information being a detection result of the fuel cell temperature detecting portion T1. Then, the controller 8 determines a magnitude relation between the temperature of the fuel cell 1 and a predetermined temperature $T_{s1}$ (Step S10).

The predetermined temperature $T_{s1}$ is set within a temperature range in which the steam contained in the hydrogen-containing gas does not condense in the fuel cell 1 and is set as a temperature after a predetermined time from the electric power generation stop of the fuel cell 1. The predetermined temperature $T_{s1}$ may be set to, for example, 480° C.

When the controller 8 determines that the temperature of the fuel cell 1 decreases to become the predetermined temperature $T_{s1}$ or less (YES in Step S10), the controller 8 causes the oxidizing gas supply unit 6 to supply the oxidizing gas through the oxidizing gas channel 12 to the fuel cell 1 (Step S11). Next, the controller 8 causes the electric power generation raw material supply unit 5 and the reforming material supply unit 7 to supply the electric power generation raw material and the reforming material (at least one of the water and the air) to the reformer 2. With this, the hydrogen-containing gas is generated in the reformer 2 and is supplied through the combustible gas channel 11 to the anode 20 of the fuel cell 1 (Step S12).

To be specific, the oxidizing gas channel 12 is purged by the oxidizing gas. Then, the oxidizing gas having purged the oxidizing gas channel 12 is introduced to the combustor 3 as an exhaust gas. On the other hand, the combustible gas channel 11 is purged by the combustible gas. Especially, a section of the combustible gas channel 11 which section extends from the reformer 2 to the downstream end of the anode 20 of the fuel cell 1 is purged by the hydrogen-containing gas. Then, the hydrogen-containing gas having purged the combustible gas channel 11 is introduced to the combustor 3 as an exhaust gas.

As above, in the fuel cell system 100, the purge is started when the temperature of the fuel cell 1 becomes the predetermined temperature $T_{s1}$ or less after the electric power generation stop. In the foregoing, Steps S11 and S12 are performed at different timings. However, Step S11 and Step S12 may be performed at the same time.

Next, the controller 8 causes the ignitor 4 of the combustor 3 to ignite the exhaust gas discharged from the fuel cell 1 (Step S13). To be specific, the controller 8 ignites the hydrogen-containing gas discharged from the anode 20 of the fuel cell 1 to perform the flame combustion together with the oxidizing gas discharged from the cathode 21. The fuel cell 1 is heated by the heat of the flame combustion, so that the temperature of the fuel cell 1 gradually increases as shown in FIG. 3 from the temperature having been decreased to around the predetermined temperature $T_{s1}$. Further, the temperature of the reformer 2 also changes as shown in FIG. 3 in conjunction with the change in the temperature of the fuel cell 1, and the decreased temperature of the reformer 2 gradually increases.

As above, the hydrogen-containing gas is discharged from the anode 20 of the fuel cell 1 to the combustor 3 by the purge using the hydrogen-containing gas generated by reforming the electric power generation raw material, and the hydrogen-containing gas is subjected to the flame combustion together with the oxidizing gas discharged from the cathode 21 to the combustor 3. With this, the combustible gas such as the hydrogen-containing gas can be prevented from being discharged as it is to the atmosphere through the flue gas channel 13. Further, since the purge of the combustible gas channel 11 is performed by not the electric power generation raw material itself but the hydrogen-containing gas generated by reforming the electric power generation raw material, it is possible to prevent a case where the electric power generation raw material flows through the reformer 2 and the fuel cell 1 which are high in temperature, and this causes the carbon deposition in the reformer 2 and the fuel cell 1.

Next, the controller 8 determines a magnitude relation between a total purge time measured by the timer unit (not shown) and using the hydrogen-containing gas and a pre-determined necessary purge time $t_{all}$ (Step S14). It should be noted that the necessary purge time $t_{all}$ may denote a time necessary to fill at least a section of the combustible gas channel 11 with the hydrogen-containing gas, the section extending from the reformer 2 to the anode of the fuel cell 1. Further, as shown in FIG. 3, the total purge time denotes a time ($\Sigma t_{on}$) that is a sum of times (purge times $t_{on}$) during which the hydrogen-containing gas is supplied. It should be noted that in the fuel cell system 100 according to Embodiment 1, a supply time of the electric power generation raw material supplied by the electric power generation raw material supply unit 5 may be regarded as a supply time of the hydrogen-containing gas.

To be specific, the fuel cell system 100 according to Embodiment 1 is not configured such that the electric power generation raw material and the reforming material (at least one of the water and the air) are continuously supplied, the hydrogen-containing gas is generated, and the purge is executed by the hydrogen-containing gas during a predetermined time, but is configured such that the electric power generation raw material and the reforming material are intermittently supplied, and the purge is executed by the hydrogen-containing gas. This is because by intermittently supplying the electric power generation raw material, the temperature of the fuel cell 1 is prevented from excessively increasing by the combustion heat of the hydrogen-containing gas in the combustor 3, and the consumption of the electric power generation raw material is suppressed. Therefore, the total purge time is a sum of the purge times of the hydrogen-containing gas supplied plural times.

As a result of the determination in Step S14, the controller 8 determines that the total purge time is the necessary purge time $t_{all}$ or more, that is, the total purge time reaches the necessary purge time (NO in Step S14), the controller 8 determines that the purge of the combustible gas channel 11 is completed. When NO in Step S14, the controller 8 causes the electric power generation raw material supply unit 5 to stop the supply of the electric power generation raw material to the combustible gas channel 11 and also causes the reforming material supply unit 7 to stop the supply of the reforming material (at least one of the water and the air). With this, the supply of the hydrogen-containing gas to the combustible gas channel 11 is stopped (Step S15). Next, the controller 8 causes the oxidizing gas supply unit 6 to stop the supply of the oxidizing gas to the oxidizing gas channel 12 (Step S16). Then, the purge in the fuel cell system 100 is completed, and the operation stop process is terminated.

Since the water remaining in the reforming material supply unit 7 evaporates in the operation stop process, pressure in the anode 20 becomes higher than pressure in the cathode 21. Therefore, the backward flow of the hydrogen-containing gas to the cathode 21 can be prevented by performing the supply stop of the hydrogen-containing gas before performing the supply stop of the oxidizing gas.

Further, the controller 8 may be configured to determine before Steps S15 and S16 whether or not the temperature of the fuel cell 1 is a predetermined temperature $T_{S2}$ or less. The controller 8 may be configured to perform Steps S15 and S16 when the controller 8 determines that the temperature of the fuel cell 1 is the predetermined temperature $T_{S2}$ or less. It should be noted that the predetermined temperature $T_{S2}$ may be set to 150° C. This is because when the temperature of the stack of the fuel cell 1 is 150° C. or more in the operation stop process, and the hydrogen-containing gas is not supplied to the anode, the oxidizing gas may flow backward through the downstream portion of the anode, and the anode may oxidize. Therefore, the controller 8 may be configured to: determine whether or not the temperature of the stack of the fuel cell 1 is less than 150° C.; and stop the supply of the hydrogen-containing gas and the supply of the oxidizing gas when the temperature of the stack of the fuel cell 1 is less than 150° C.

In contrast, as a result of the determination in Step S14, when the controller 8 determines that the total purge time using the hydrogen-containing gas is less than the necessary purge time $t_{all}$ (YES in Step S14), the process proceeds to Step S17. In Step S17, the controller 8 performs a comparison determination between the purge time $t_{on}$ using the hydrogen-containing gas and a predetermined time (purge time $t_{pre-on}$). It should be noted that the purge time $t_{on}$ denotes a supply time of the hydrogen-containing gas supplied once, in other words, a supply time of the electric power generation raw material and the reforming material (at least one of the water and the air) supplied once.

To be specific, based on a time measured by the timer unit (not shown), the controller 8 determines a magnitude relation between the purge time $t_{on}$ using the hydrogen-containing gas and the preset purge time $t_{pre-on}$. When the controller 8 determines that the purge time $t_{on}$ using the hydrogen-containing gas is the preset purge time $t_{pre-on}$ or more (YES in Step S17), the controller 8 stops the supply of the electric power generation raw material and the supply of the reforming material (at least one of the water and the air) to stop the supply of the hydrogen-containing gas (Step S18).

The magnitude relation between the purge time $t_{on}$ using the hydrogen-containing gas and the preset purge time $t_{pre-on}$ is determined because of the following reasons. To be specific, that the purge time $t_{on}$ using the hydrogen-containing gas is the preset purge time $t_{pre-on}$ or more means that a combustion time of the hydrogen-containing gas introduced to the combustor 3 increases. When the combustion time of the combustor 3 increases as above, the temperatures of the fuel cell 1 and the reformer 2 heated by the combustion heat in the combustor 3 excessively increase. When the temperatures of the fuel cell 1 and the reformer 2 excessively increase, and this excessively increases the temperatures of the reforming catalyst and the anode of the fuel cell 1, an operating time of the operation stop process increases, and this causes an excessive consumption of the electric power generation raw material. Therefore, electric power generation/fuel efficiency from the start-up of the fuel cell system 100 until the stop thereof in total deteriorates.

To prevent the temperatures of the fuel cell 1 and the reformer 2 from excessively increasing, the controller 8 monitors the purge time $t_{on}$ using the hydrogen-containing gas, and when the purge time $t_{on}$ using the hydrogen-containing gas reaches the preset purge time $t_{pre-on}$, the controller 8 stops the supply of the hydrogen-containing gas.

After the supply of the hydrogen-containing gas is stopped in Step S18, the controller 8 performs a comparison determination between a supply stop time $T_{off}$ of the hydrogen-containing gas and a predetermined time (preset supply stop time $t_{pre-off}$) (Step S19). To be specific, based on a time measured by the timer unit (not shown), the controller 8 determines a magnitude relation between the supply stop time $T_{off}$ of the hydrogen-containing gas and a preset supply stop time (preset supply stop time $t_{pre-off}$). When the controller 8 determines that the supply stop time $t_{off}$ of the hydrogen-containing gas is the preset supply stop time $t_{pre-off}$ or more (YES in Step S19), the controller 8 restarts the supply of the hydrogen-containing gas (Step S20).

The magnitude relation between the supply stop time $t_{off}$ of the hydrogen-containing gas and the preset supply stop time $t_{pre-off}$ is determined because of the following reasons. To be specific, the fuel cell system 100 is configured such that the flue gas generated in the combustor 3 is discharged through the flue gas channel 13 to the atmosphere. Therefore, when the supply of the hydrogen-containing gas is stopped for a long period of time, the temperatures of the fuel cell 1 and the reformer 2 decrease, and this contracts the gas in the combustible gas channel 11. With this, the outside air flows into the combustible gas channel 11, and the reforming catalyst of the reformer 2 and the anode of the fuel cell 1 oxidize. Especially when the anode oxidizes, the durability of the fuel cell 1 significantly deteriorates. Therefore, to prevent the outside air from flowing into the combustible gas channel 11, the controller 8 monitors the supply stop time $t_{off}$ of the hydrogen-containing gas.

The oxidation of the anode is not only the oxidation of the anode without an electrochemical reaction at an exit side of the combustible gas channel 11 which side is close to the combustor 3 but also the oxidation of the anode by a local battery reaction with the electrochemical reaction caused by exchange between oxide ions and electrons at a position between an anode exit side in a high oxygen concentration state and an anode entrance side in a low oxygen concentration state.

Further, according to the fuel cell system 100, a constant amount of reforming material does not always have to be supplied in the same supply period as the electric power generation raw material. For example, the controller 8 may be configured to control the electric power generation raw material supply unit 5 and the reforming material supply unit 7 such that when each of the temperatures of the fuel cell 1 and the reformer 2 is decreased to a temperature at which the carbon deposition by the decomposition of the electric power generation raw material does not occur, a ratio of the supply amount of electric power generation raw material and the supply amount of reforming water converted into steam by an evaporator (not shown) is changed to reduce a steam/carbon ratio (S/C) of the hydrogen-containing gas generated by the reformer 2. To reduce the S/C to a predetermined value or less, the supply of the reforming water is stopped. Therefore, in the fuel cell system 100, while the electric power generation raw material is supplied, the supply of the reforming water may be intermittently performed.

The controller 8 monitors the supply stop time $t_{off}$ of the hydrogen-containing gas, and when the supply stop time $t_{off}$ the hydrogen-containing gas reaches the preset supply stop time $t_{pre-off}$ or more (YES in Step S19), the controller 8 causes the electric power generation raw material supply unit 5 to restart the supply of the hydrogen-containing gas (Step S20). The controller 8 may be configured to control the electric power generation raw material supply unit 5 and the reforming material supply unit 7 such that if the temperature of the fuel cell 1 or the reformer 2 is the temperature at which the carbon deposition by the decomposition of the electric power generation raw material does not occur and is also a temperature at which the steam does not condense, the ratio of the supply amount of electric power generation raw material and the supply amount of reforming water converted into the steam is changed to reduce the steam/carbon ratio of the hydrogen-containing gas supplied to the combustible gas channel 11.

As above, when the supply of the hydrogen-containing gas is restarted in Step S20, the process returns to Step S13. Then, Steps S13 to S20 are repeatedly performed until the total purge time in which the hydrogen-containing gas is supplied becomes the necessary purge time $t_{all}$ or more in the determination in Step S14.

The foregoing has explained the configuration in which the hydrogen-containing gas is intermittently supplied. However, the oxidizing gas may also be intermittently supplied. In a case where the oxidizing gas is also supplied intermittently, for example, the fuel cell system 100 may be configured as below.

To be specific, after the supply of the hydrogen-containing gas is stopped in Step S18 shown in FIG. 2, the controller 8 instructs the oxidizing gas supply unit 6 to stop the supply of the oxidizing gas. Further, after the supply of the hydrogen-containing gas is restarted in Step S20, the controller 8 instructs the oxidizing gas supply unit 6 to restart the supply of the oxidizing gas. It should be noted that the timings of the supply stop and supply restart of the oxidizing gas may be timings after the supply stop and supply restart of the hydrogen-containing gas as described above or may be the same as the timings of the supply stop and supply restart of the hydrogen-containing gas.

Modified Example 1 of Embodiment 1

Operation Stop Process of Fuel Cell System According to Modified Example 1

Figure 4:
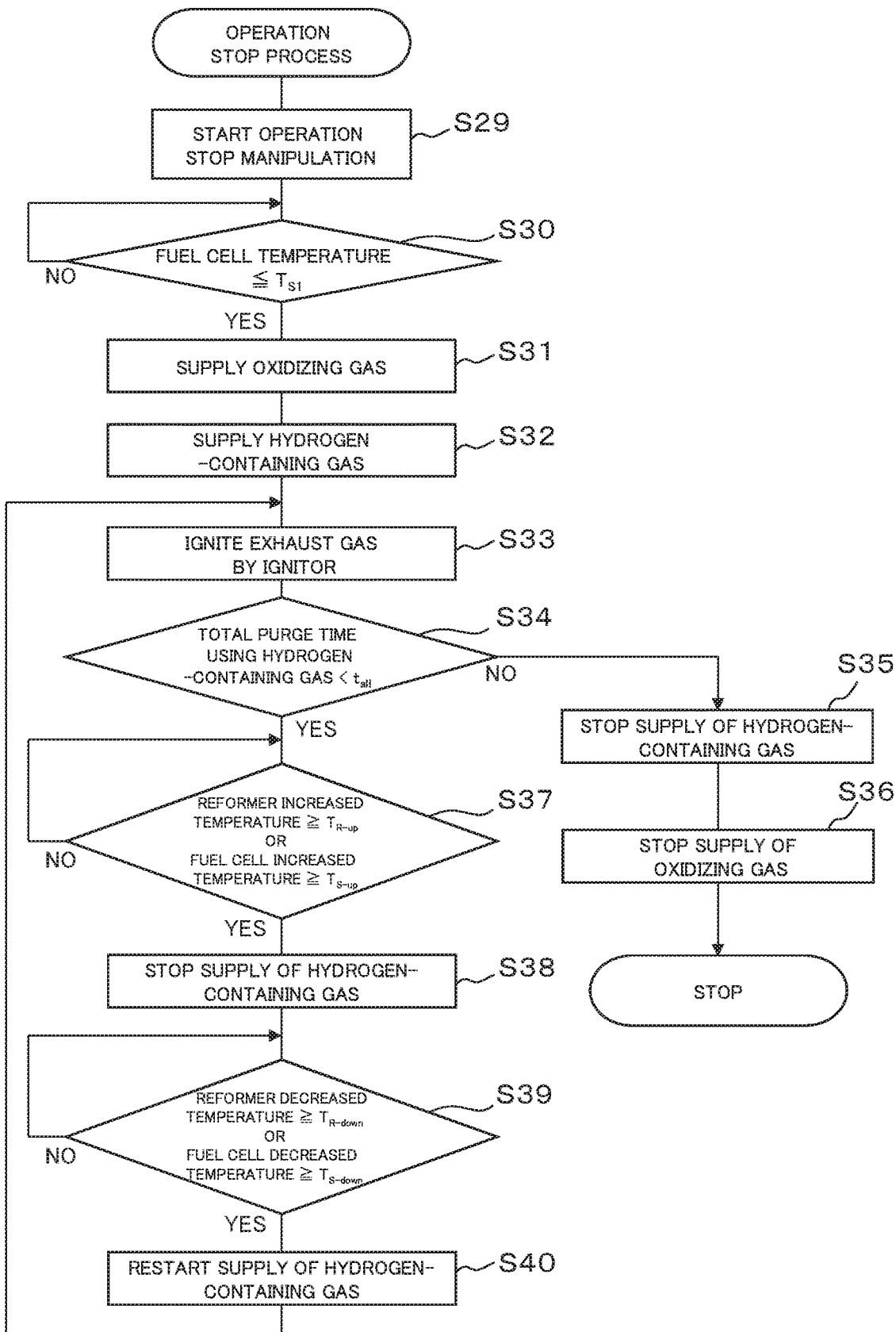
FIG. 4 is a flow chart showing one example of the operation stop process of the fuel cell system according to Modified Example 1 of Embodiment 1 of the present invention.

In the foregoing, the controller 8 monitors the purge time $t_{on}$ using the hydrogen-containing gas and the supply stop time $t_{off}$ to control the supply and stop of the hydrogen-containing gas. However, the present embodiment is not limited to this. For example, as shown in FIG. 4, the controller 8 may be configured to monitor the change in the temperature of the fuel cell 1 or the reformer 2 to control the supply and stop of the hydrogen-containing gas. FIG. 4 is a flow chart showing one example of the operation stop process of the fuel cell system 100 according to Modified Example 1 of Embodiment 1 of the present invention. The operations shown in the flow chart may be realized in such a manner that, for example, the controller 8 reads out and executes the control programs stored in the storage portion (not shown).

The flow chart of the operation stop process shown in FIG. 4 is the same as the flow chart of the operation stop process shown in FIG. 2 except for Steps S37 and S39. Therefore, the following will mainly explain Steps S37 and S39.

As a result of the determination in Step S34, when the controller 8 determines that the total purge time using the hydrogen-containing gas is less than the necessary purge time $t_{all}$ (YES in Step S34), the process proceeds to Step S37. In Step S37, the controller 8 monitors a change in the temperature (reformer temperature) of the reforming catalyst filled in the reformer 2 or a change in a typical temperature (fuel cell temperature) of the fuel cell stack of the fuel cell 1 to determine whether or not the change in the temperature falls within a predetermined temperature range. More specifically, the controller 8 determines whether or not a temperature (reformer increased temperature) by which the temperature of the reformer 2 is increased from the temperature of the reformer 2 when the exhaust gas is ignited in Step S33 is an increased temperature $T_{R\text{-}up}$ or more. Or, the controller 8 determines whether or not a temperature (fuel cell increased temperature) by which the temperature of the fuel cell 1 is increased from the temperature of the fuel cell 1 when the exhaust gas is ignited in Step S33 is an increased temperature $T_{S\text{-}up}$ or more.

To be specific, the controller 8 receives information regarding the temperature (reformer temperature) of the reforming catalyst from the reformer temperature detecting portion T2 provided at the reformer 2 and records a history of the change in the reformer temperature. Then, the controller 8 determines whether or not the reformer temperature when the exhaust gas is ignited is increased by the preset increased temperature $T_{R\text{-}up}$ or more. Or, the controller 8 receives information regarding the fuel cell temperature from the fuel cell temperature detecting portion T1 and records a history of the change in the fuel cell temperature. Then, the controller 8 determines whether or not the fuel cell temperature when the exhaust gas is ignited is increased by the preset increased temperature $T_{S\text{-}up}$ or more.

The fuel cell temperature changes in conjunction with the reformer temperature, so that any of the fuel cell temperature and the reformer temperature may be selected in the determination in Step S37. The responsiveness of the reformer 2 with respect to the temperature change is higher than the responsiveness of the fuel cell 1 with respect to the temperature change. Therefore, the increased temperature $T_{R\text{-}up}$ of the reformer 2 is larger in increase width than the increased temperature $T_{S\text{-}up}$ of the fuel cell 1. Therefore, the increased temperature $T_{R\text{-}up}$ of the reformer 2 may be set to be larger in temperature width than the increased temperature $T_{S\text{-}up}$ of the fuel cell 1.

When the controller 8 determines that the reformer increased temperature is the increased temperature $T_{R\text{-}up}$ or more or that the fuel cell increased temperature is the increased temperature $T_{S\text{-}up}$ or more (YES in Step S37), the controller 8 stops the supply of the electric power generation raw material and the supply of the reforming material (at least one of the water and the air) to stop the supply of the hydrogen-containing gas (Step S38).

The increased temperature $T_{R\text{-}up}$ and the increased temperature $T_{S\text{-}up}$ are set to prevent a case where the reformer temperature and the fuel cell temperature are excessively increased by the combustion heat in the combustor 3.

After the controller 8 stops the supply of the hydrogen-containing gas in Step S38, the controller 8 monitors the change in the temperature (reformer temperature) of the reforming catalyst filled in the reformer 2 or the change in the typical temperature (fuel cell temperature) of the fuel cell stack of the fuel cell 1 to determine whether or not the reformer temperature or the fuel cell temperature falls within a predetermined temperature range. More specifically, the controller 8 determines whether or not a temperature (reformer decreased temperature) by which the temperature of the reformer 2 is decreased from the temperature of the reformer 2 when the supply of the hydrogen-containing gas is stopped in Step S38 is a decreased temperature $T_{R\text{-}down}$ or more. Or, the controller 8 determines whether or not a temperature (fuel cell decreased temperature) by which the temperature of the fuel cell 1 is decreased from the temperature of the fuel cell 1 when the supply of the hydrogen-containing gas is stopped in Step S38 is a decreased temperature $T_{S\text{-}up}$ or more (Step S39).

To be specific, the controller 8 receives information regarding the reformer temperature from the reformer temperature detecting portion T2 provided at the reformer 2 and records a history of the change in the reformer temperature. Then, the controller 8 determines whether or not the reformer temperature is decreased by the preset decreased temperature $T_{R\text{-}down}$ or more. Or, the controller 8 receives information regarding the typical temperature (fuel cell temperature) of the fuel cell stack from the fuel cell temperature detecting portion T1 provided at the fuel cell stack and records a history of the change in the fuel cell temperature. Then, the controller 8 determines whether or not the fuel cell temperature is decreased by the preset decreased temperature $T_{S\text{-}down}$ or more. Further, as described above, the responsiveness of the reformer 2 with respect to the temperature change is higher than the responsiveness of the fuel cell 1 with respect to the temperature change. Therefore, the decreased temperature $T_{R\text{-}down}$ of the reformer 2 is larger in decrease width than the decreased temperature $T_{S\text{-}down}$ of the fuel cell 1. On this account, the decreased temperature $T_{R\text{-}down}$ of the reformer 2 may be set to be larger in temperature width than the decreased temperature $T_{S\text{-}down}$ of the fuel cell 1.

When the controller 8 determines that the reformer decreased temperature is the decreased temperature $T_{R\text{-}down}$ or more or that the fuel cell decreased temperature is the decreased temperature $T_{S\text{-}down}$ or more (YES in Step S39), the controller 8 restarts the supply of the hydrogen-containing gas (Step S40).

In the fuel cell system according to Modified Example 1, each of the increased temperature $T_{R\text{-}up}$ of the reformer 2 and the increased temperature $T_{S\text{-}up}$ of the fuel cell 1 corresponds to an increased value in the present invention. Further, each of the decreased temperature $T_{R\text{-}down}$ of the reformer 2 and the decreased temperature $T_{S\text{-}down}$ of the fuel cell 1 corresponds to a decreased value of the present invention.

As above, in the fuel cell system 100 according to Embodiment 1, when performing the operation stop process, the steps shown in the above flow chart are executed. With this, the combustible gas (hydrogen-containing gas) utilized in the purge of the combustible gas channel 11 can be subjected to the flame combustion in the combustor 3. Therefore, the combustible gas itself can be prevented from being discharged to the atmosphere. Further, since the hydrogen-containing gas generated by reforming the electric power generation raw material is utilized in the purge of the combustible gas channel 11, for example, it is possible to prevent a problem in which the carbon deposition occurs since the fuel cell 1 is high in temperature.

Further, the hydrogen-containing gas is intermittently supplied. With this, the temperatures of the reformer 2 and the fuel cell 1 which are heated by the combustion heat in the combustor 3 can be prevented from excessively increasing. In addition, it is possible to prevent a case where the steam in the combustible gas channel 11 condenses by an excessive temperature decrease. Furthermore, since the hydrogen-containing gas is intermittently supplied, the supply amount of raw material utilized in the purge can be suppressed, so that the reduction in consumption energy in the operation of stopping the fuel cell system can be realized.

In the foregoing, the controller 8 determines the stop of the hydrogen-containing gas by determining whether or not the increased temperature (reformer increased temperature) of the reformer 2 is the increased temperature $T_{R\text{-}up}$ or more or whether or not the increased temperature (fuel cell increased temperature) of the fuel cell 1 is the increased temperature $T_{S\text{-}up}$ or more. Further, the controller 8 determines the restart of the hydrogen-containing gas by determining whether or not the decreased temperature (reformer decreased temperature) of the reformer 2 is the decreased temperature $T_{R\text{-}down}$ or more or whether or not the decreased temperature (fuel cell decreased temperature) of the fuel cell 1 is the decreased temperature $T_{S\text{-}up}$ or more. To be specific, the controller 8 controls the supply or stop of the hydrogen-containing gas in accordance with the temperature width of the increase or decrease of the reformer temperature or the fuel cell temperature.

However, a trigger for controlling the supply and stop of the hydrogen-containing gas is not limited to the temperature width of the increase or decrease of the reformer temperature or the fuel cell temperature. For example, the controller 8 may record a temperature profile of the reformer temperature or the fuel cell temperature and control the supply and stop of the hydrogen-containing gas by using the magnitude of a slope of the temperature change as a trigger.

Modified Example 2 of Embodiment 1

Configuration of Fuel Cell System according to Modified Example 2

The fuel cell system 100 may further include a desulfurizer 9 and may be configured to monitor a change in a temperature (desulfurizer temperature) of a desulfurization catalyst filled in the desulfurizer 9 to control the supply and stop of the hydrogen-containing gas. Hereinafter, a configuration of monitoring the desulfurizer temperature to control the supply and stop of the hydrogen-containing gas in accordance with the temperature width of the increased temperature or decreased temperature of the desulfurizer temperature will be explained as Modified Example 2 of Embodiment 1 in reference to FIG. 5.

Figure 5:
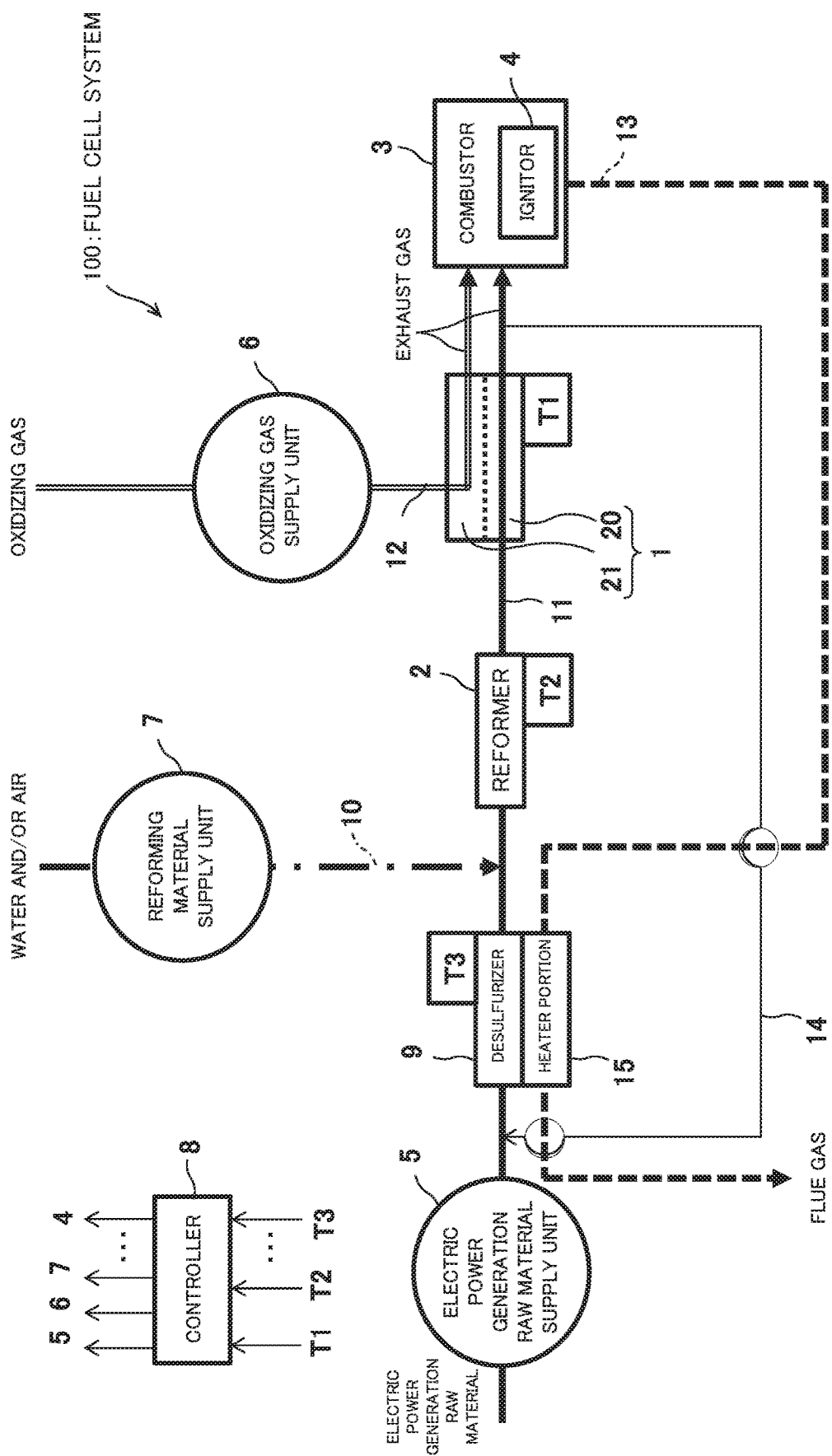
FIG. 5 is a block diagram showing one example of a schematic configuration of the fuel cell system according to Modified Example 2 of Embodiment 1 of the present invention.

FIG. 5 is a block diagram showing one example of a schematic configuration of the fuel cell system 100 according to Modified Example 2 of Embodiment 1 of the present invention.

As shown in FIG. 5, the fuel cell system 100 according to Modified Example 2 is different from the fuel cell system 100 shown in FIG. 1 in that the fuel cell system 100 according to Modified Example 2 includes: the desulfurizer 9; a desulfurizer temperature detecting portion T3 configured to detect the temperature (desulfuizer temperature) of the desulfurization catalyst filled in the desulfurizer 9; and a heater portion 15 configured to heat the desulfurizer 9. Another difference is that the fuel cell system 100 according to Modified Example 2 further includes a recycle channel 14 through which a part of the hydrogen-containing gas discharged from the fuel cell 1 is supplied to the desulfuizer 9. Other than the above, the fuel cell system 100 according to Modified Example 2 is the same in configuration as the fuel cell system 100 of Embodiment 1 shown in FIG. 1. Therefore, the same reference signs are used for the same components, and explanations thereof are omitted.

The desulfurizer 9 removes a sulfur compound in the electric power generation raw material. Examples of the desulfurizer 9 include a hydro-desulfurizer and a normal temperature desulfurizer. The electric power generation raw material desulfurized by the desulfurizer 9 is supplied to the reformer 2. As shown in FIG. 5, the desulfurizer 9 is provided at the combustible gas channel 11 together with the heater portion 15 so as to be located upstream of the reformer 2.

When the desulfurizer 9 is the hydro-desulfurizer, the desulfurizer 9 is configured such that a hydrodesulfurizing agent is filled in a container. Used as the hydrodesulfurizing agent is, for example, a CuZn-based catalyst having both a function of converting the sulfur compound into hydrogen sulfide and a function of adsorbing the hydrogen sulfide. However, the hydrodesulfurizing agent is not limited to this example and may be constituted by: a CoMo-based catalyst that converts the sulfur compound in the raw material gas into the hydrogen sulfide; and a ZnO-based catalyst or CuZn-based catalyst which is a sulfur adsorbent that is provided downstream of the CoMo-based catalyst and adsorbs and removes the hydrogen sulfide.

The hydrodesulfurizing agent may contain nickel (Ni) as a catalyst metal. In this case, there is a possibility that if the raw material and a recycled gas are supplied to the hydrodesulfurizing agent when the hydro-desulfurizer is low in temperature (for example, less than 150° C.) before warming-up, the catalyst deteriorates. To reduce such possibility, the temperature of the hydrodesulfurizing agent in the desulfurizer may be detected by using a temperature detector (not shown) or the like, and only when the temperature of the hydrodesulfurizing agent in the desulfurizer is a predetermined temperature or more, the electric power generation raw material may be supplied to the hydro-desulfurizer. When the hydrodesulfurizing agent contains copper and zinc, an operable temperature range of the desulfurizer is, for example, about 150 to 350° C., preferably about 250 to 320° C. When the desulfurizer is the normal temperature desulfurizer, the sulfur compound in the electric power generation raw material can be removed at normal temperature. The normal temperature herein denotes a temperature closer to a normal temperature range than to a use temperature (for example, around 300° C.) of the hydro-desulfurizer. To be specific, a temperature range in which the normal temperature desulfurizer effectively functions includes a temperature range from the normal temperature range to a temperature range in which the desulfurizing agent effectively functions. One example of the normal temperature desulfurizer is a desulfurizer filled with an adsorption desulfurizing agent using an Ag zeolite based catalyst or the like.

As shown in FIG. 5, in the fuel cell system 100 according to Modified Example 2, the recycle channel 14 is provided so as to branch from a position of the combustible gas channel 11 which position is located downstream of the fuel cell 1 and upstream of the combustor 3 and be coupled to a position of the combustible gas channel 11 which position is located upstream of the desulfurizer 9. Then, as the hydrogen necessary in the hydrodesulfurization, a part of the hydrogen-containing gas generated by the reformer 2 is supplied through the recycle channel 14 to the desulfurizer 9.

In the fuel cell system 100 according to Modified Example 2, a part of the hydrogen-containing gas discharged from the fuel cell 1 is supplied through the recycle channel 14 to the desulfurizer 9. However, the present embodiment is not limited to this. For example, the recycle channel 14 may branch from a position of the combustible gas channel 11 which position is located downstream of the reformer 2 and upstream of the fuel cell 1, and a part of the hydrogen-containing gas discharged from the reformer 2 may be supplied through the recycle channel 14 to the desulfurizer 9.

The heater portion 15 heats the desulfurizer 9 to a temperature suitable for desulfurization by heat of the flue gas flowing through the flue gas channel 13, and a passage through which the flue gas flows is formed inside the heater portion 15. The flue gas which has applied heat to the desulfurizer 9 in the heater portion 15 is discharged through the flue gas channel 13 to the outside of the fuel cell system 100.

Operation Stop Process of Fuel Cell System According to Modified Example 2

Figure 6:
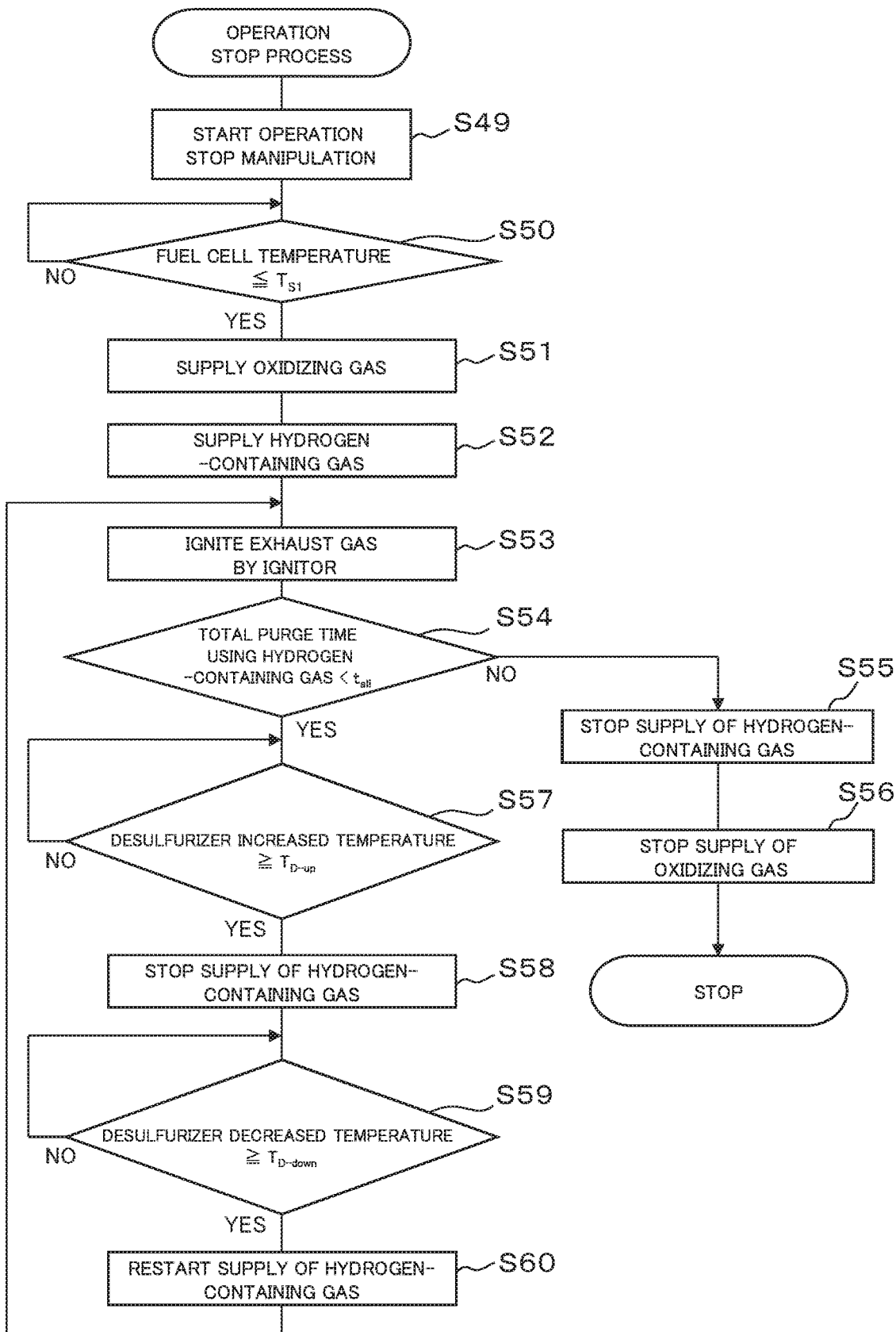
FIG. 6 is a flow chart showing one example of the operation stop process of the fuel cell system according to Modified Example 2 of Embodiment 1 of the present invention.

Next, the operation stop process of the fuel cell system 100 according to Modified Example 2 will be explained in reference to FIGS. 6 and 7. FIG. 6 is a flow chart showing one example of the operation stop process of the fuel cell system 100 according to Modified Example 2 of Embodiment 1 of the present invention. The operations shown in the flow chart may be realized in such a manner that, for example, the controller 8 reads out and executes the control programs stored in the storage portion (not shown).

Figure 7:
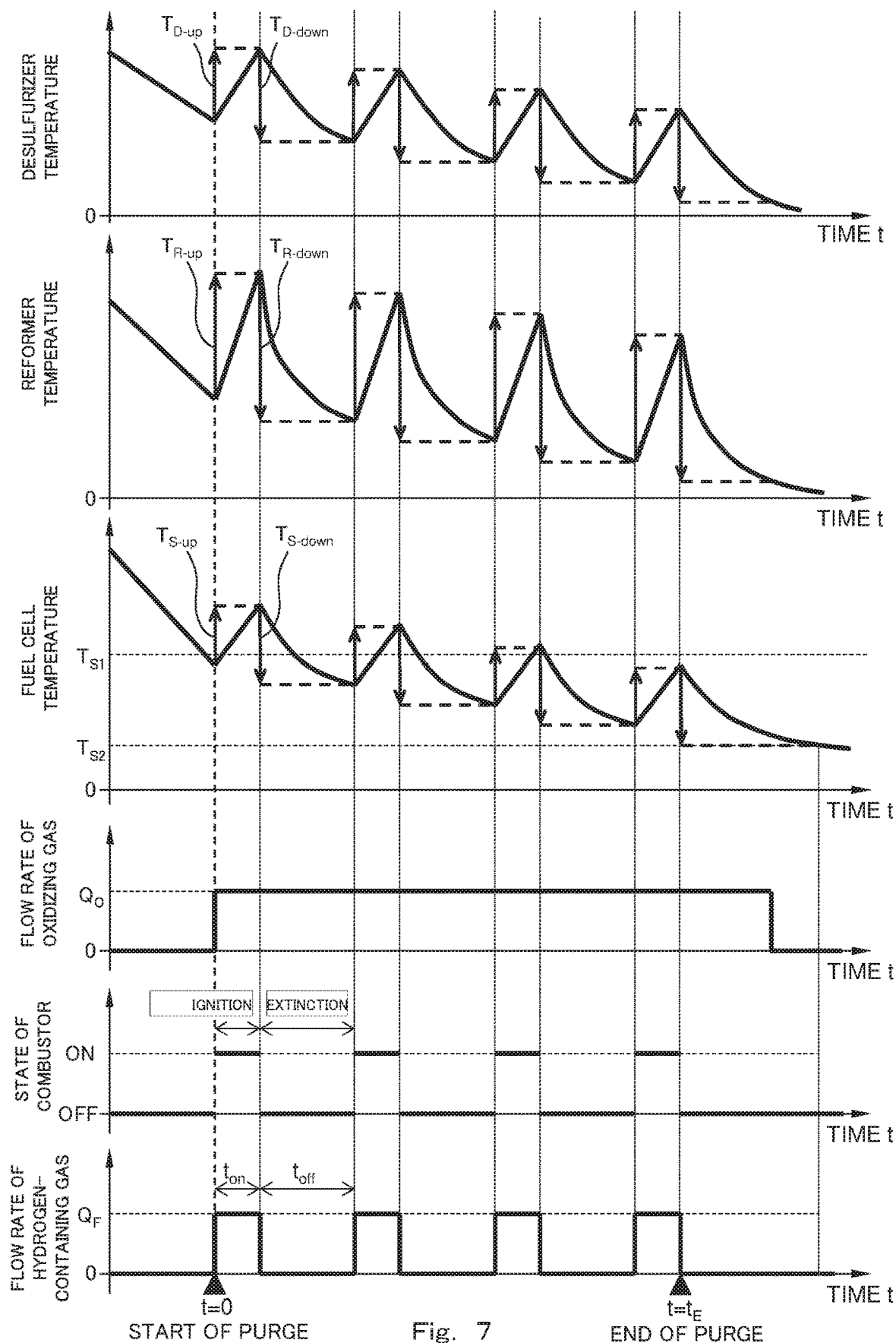
FIG. 7 is a diagram showing one example of time-series changes of the respective portions of the fuel cell system in a case where the fuel cell system operates in accordance with the flow chart shown in FIG. 6.

FIG. 7 is a diagram showing one example of time-series changes of the respective portions of the fuel cell system 100 in a case where the fuel cell system 100 operates in accordance with the flow chart shown in FIG. 6. In FIG. 7, the change in the temperature of the reformer 2, the change in the temperature of the fuel cell 1, the change in the temperature of the desulfurizer 9, the change in the flow rate of the oxidizing gas, the change in the flow rate of the hydrogen-containing gas, and the change in the state (ignition or extinction) of the combustor 3 are shown in time series. Further, the graph showing the change in the flow rate of the hydrogen-containing gas shows that: at t=0, the purge of the combustible gas channel 11 by utilizing the hydrogen-containing gas is started; and at $t=t_E$, the purge of the combustible gas channel 11 by utilizing the hydrogen-containing gas is terminated. Furthermore, for convenience of explanation, the flow rate of the hydrogen-containing gas per unit time is a constant flow rate ($Q_F$).

In the fuel cell system 100 according to Embodiment 1, the controller 8 monitors the purge time $t_{on}$ using the hydrogen-containing gas and the supply stop time $t_{off}$ to control the supply and stop of the hydrogen-containing gas. However, in the fuel cell system according to Modified Example 2, as shown in FIG. 6, the controller 8 may monitor the change in the temperature (desulfurizer temperature) of the desulfurization catalyst filled in the desulfurizer 9 to control the supply and stop of the hydrogen-containing gas.

The flow chart of the operation stop process shown in FIG. 6 is the same as the flow chart of the operation stop process shown in FIG. 2 except for Steps S57 and S59. Therefore, the following will mainly explain Steps S57 and S59.

As a result of the determination in Step S54, when the controller 8 determines that the total purge time using the hydrogen-containing gas is less than the necessary purge time $t_{all}$ (YES in Step S54), the process proceeds to Step S57. In Step S57, the controller 8 monitors the change in the desulfurizer temperature to determine whether or not the change in the desulfurizer temperature falls within a predetermined temperature range. More specifically, the controller 8 determines whether or not the increased temperature (desulfurizer increased temperature) of the desulfurizer 9 is an increased temperature $T_{D-up}$ or more.

To be specific, the controller 8 receives information regarding the desulfurizer temperature detected by the desulfurizer temperature detecting portion T3 provided at the desulfurizer 9 and records a history of the change in the desulfurizer temperature. Then, the controller 8 determines whether or not the desulfurizer temperature is increased by the preset increased temperature $T_{D-up}$ or more. As described above, the desulfurizer 9 is configured to be heated by the heat of the flue gas through the heater portion 15. Therefore, the desulfurizer temperature changes in conjunction with the fuel cell temperature and the reformer temperature.

When the controller 8 determines that the desulfurizer increased temperature is the increased temperature $T_{D-up}$ or more (YES in Step S57), the controller 8 stops the supply of the electric power generation raw material and the supply of the reforming material (at least one of the water and the air) to stop the supply of the hydrogen-containing gas (Step S58).

The increased temperature $T_{D-up}$ of the desulfurizer temperature is set to prevent a case where the desulfurizer temperature excessively increases since the desulfurizer 9 is heated by the heat of the flue gas generated in the combustor 3. Further, the desulfurizer temperature, the fuel cell temperature, and the reformer temperature change in conjunction with one another. Therefore, preventing the desulfurizer temperature from excessively increasing means preventing the temperatures of the fuel cell 1 and the reformer 2 from excessively increasing.

After the controller 8 stops the supply of the hydrogen-containing gas in Step S58, the controller 8 monitors the change in the desulfurizer temperature to determine whether or not the desulfurizer temperature falls within a predetermined temperature range. More specifically, the controller 8 determines whether or not the decreased temperature (desulfurizer decreased temperature) of the desulfurizer 9 is a decreased temperature $T_{D-down}$ or more (Step S59).

To be specific, the controller 8 receives information regarding the desulfurizer temperature from the desulfurizer temperature detecting portion T3 provided at the desulfurizer 9 and records a history of the change in the desulfurizer temperature. Then, the controller 8 determines whether or not the desulfurizer temperature is decreased by the preset decreased temperature $T_{R-down}$ or more. When the controller 8 determines that the desulfurizer decreased temperature is the decreased temperature $T_{D-down}$ or more (YES in Step S59), the controller 8 restarts the supply of the hydrogen-containing gas (Step S60).

The decreased temperature $T_{D-down}$ of the desulfurizer 9 is set in Step S60 to prevent a case where: while the supply of the hydrogen-containing gas is stopped, the temperatures of the desulfuizer 9, the reformer 2, and the fuel cell 1 decrease; the temperature of the steam-containing hydrogen-containing gas remaining in the combustible gas channel 11 becomes a dew point or less; the steam condenses into water; and the durability of the catalysts and electrodes in the desulfurizer 9, the reformer 2, and the fuel cell 1 significantly deteriorate.

In the fuel cell system according to Modified Example 2, the increased temperature $T_{D-up}$ of the desulfurizer 9 and the decreased temperature $T_{D-down}$ of the desulfurizer 9 correspond to an increased value and decreased value of the present invention, respectively.

As above, in the fuel cell system 100 according to Modified Example 2, when performing the operation stop process, the steps shown in the above flow chart are executed. With this, the combustible gas (hydrogen-containing gas) utilized in the purge of the combustible gas channel 11 can be subjected to the flame combustion in the combustor 3. Therefore, the combustible gas itself can be prevented from being discharged to the atmosphere. Further, since the hydrogen-containing gas generated by reforming the electric power generation raw material is utilized in the purge of the combustible gas channel 11, for example, it is possible to prevent a problem in which the carbon deposition occurs since the fuel cell 1 and the reformer 2 are high in temperature.

Further, the hydrogen-containing gas is intermittently supplied. With this, the temperatures of the desulfurizer 9, the reformer 2, and the fuel cell 1 which are heated by the heat of the flame combustion in the combustor 3 can be prevented from excessively increasing. In addition, it is possible to prevent a case where the steam in the combustible gas channel 11 condenses by an excessive temperature decrease. Furthermore, since the hydrogen-containing gas is intermittently supplied, the supply amount of raw material utilized in the purge can be suppressed, so that the reduction in consumption energy in the operation stop process of the fuel cell system 100 can be realized.

In the foregoing, the controller 8 determines the stop of the hydrogen-containing gas by determining whether or not the increased temperature (desulfurizer increased temperature) of the desulfurizer 9 is the increased temperature $T_{D\text{-}up}$ or more. Furthermore, the controller 8 determines the restart of the hydrogen-containing gas by determining whether or not the decreased temperature (desulfurizer decreased temperature) of the desulfurizer 9 is the decreased temperature $T_{D\text{-}down}$ or more. To be specific, the controller 8 controls the supply or stop of the hydrogen-containing gas in accordance with the temperature width of the increase or decrease of the desulfurizer temperature.

However, a trigger for controlling the supply and stop of the hydrogen-containing gas is not limited to the temperature width of the increase or decrease of the desulfurizer temperature. For example, the controller 8 may record a temperature profile of the desulfurizer temperature and control the supply or stop of the hydrogen-containing gas by using the magnitude of the slope of the temperature change as a trigger.

Modified Example 3 of Embodiment 1

Configuration of Fuel Cell System According to Modified Example 3

Figure 8:
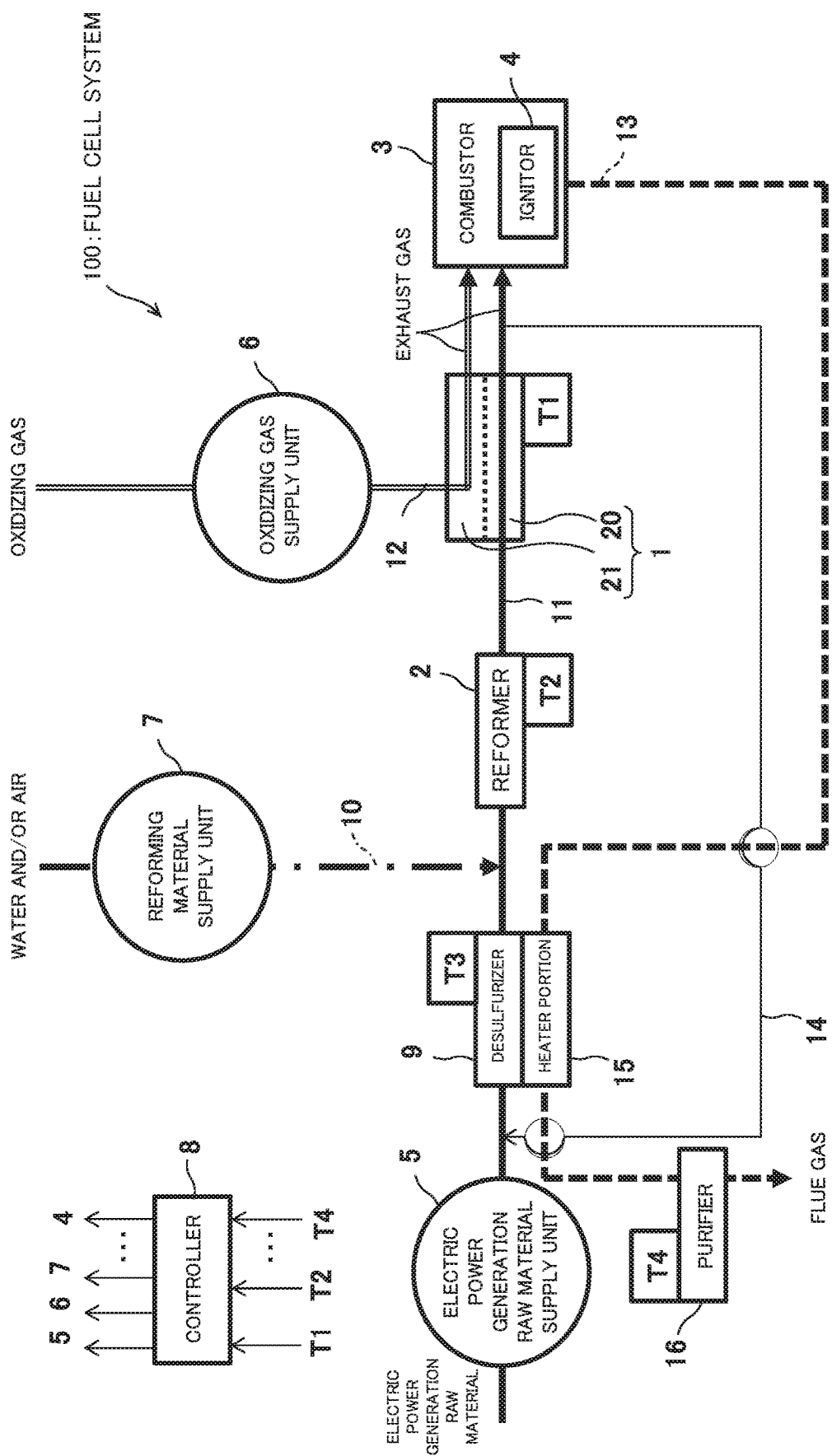
FIG. 8 is a block diagram showing one example of a schematic configuration of the fuel cell system according to Modified Example 3 of Embodiment 1 of the present invention.

Next, the configuration of the fuel cell system 100 according to Modified Example 3 of Embodiment 1 of the present invention will be explained in reference to FIG. 8. FIG. 8 is a block diagram showing one example of a schematic configuration of the fuel cell system 100 according to Modified Example 3 of Embodiment 1 of the present invention.

The fuel cell system 100 according to Modified Example 3 is configured such that the fuel cell system 100 according to Modified Example 2 shown in FIG. 5 further includes a purifier 16 and a purifier temperature detecting portion T4 configured to detect the temperature of the purifier 16. Other than the above, the fuel cell system 100 according to Modified Example 3 is the same in configuration as the fuel cell system 100 according to Modified Example 2 shown in FIG. 5. Therefore, the same reference signs are used for the same components, and explanations thereof are omitted.

The purifier 16 removes the combustible gas contained in the flue gas discharged from the combustor 3. For example, the purifier 16 purifies the flue gas by converting carbon monoxide, nitrogen oxide, and hydrocarbon (such as residual methane) contained in the flue gas into carbon dioxide, nitrogen dioxide, and steam (water). As shown in FIG. 8, the purifier 16 is provided at the flue gas channel 13 so as to be located downstream of the heater portion 15 configured to heat the desulfurizer 9.

For example, the purifier 16 filled with a purification catalyst is configured such that a combustion catalyst and an exhaust gas purification catalyst are filled in a container. Examples of the combustion catalyst and the exhaust gas purification catalyst include an alumina carrier and a metal carrier, each of which is impregnated with at least one of platinum, palladium, and rhodium. It should be noted that the combustion catalyst and the exhaust gas purification catalyst are not limited to these. Each of the combustion catalyst and the exhaust gas purification catalyst is only required to be a catalyst which can promote a combustion reaction or a purification reaction when the temperature of the catalyst is maintained in an optimal temperature range. It should be noted that each of the combustion reaction and the purification reaction denotes a reaction that purifies an unburned combustible gas, such as hydrocarbon, hydrogen, carbon monoxide, and nitrogen oxide, contained in the gas flowing through the flue gas channel 13. In the case of a $Pd$—$Al_2O_3$-based purification catalyst, the purifier 16 removes the combustible gas of the flue gas at a predetermined temperature (130° C., for example) or more. However, if the temperature is too high, the catalytic activity deteriorates by, for example, agglomeration of Pd. Therefore, it is desirable to maintain a predetermined temperature (300° C., for example) or less.

The purifier 16 is configured to be heated by the flue gas which has heated the desulfurizer 9 in the heater portion 15 and therefore lost a part of heat thereof. When the purifier 16 is configured to be heated by the heat of the flue gas, the purifier 16 may be provided at a position close to the desulfurizer 9 to more effectively utilize the heat of the flue gas. It should be noted that the flue gas flowing through the purifier 16 heats the purifier 16 as above to be discharged to the outside of the fuel cell system 100 in a state where the combustible gas has been purified.

Operation Stop Process of Fuel Cell System According to Modified Example 3

Figure 9:
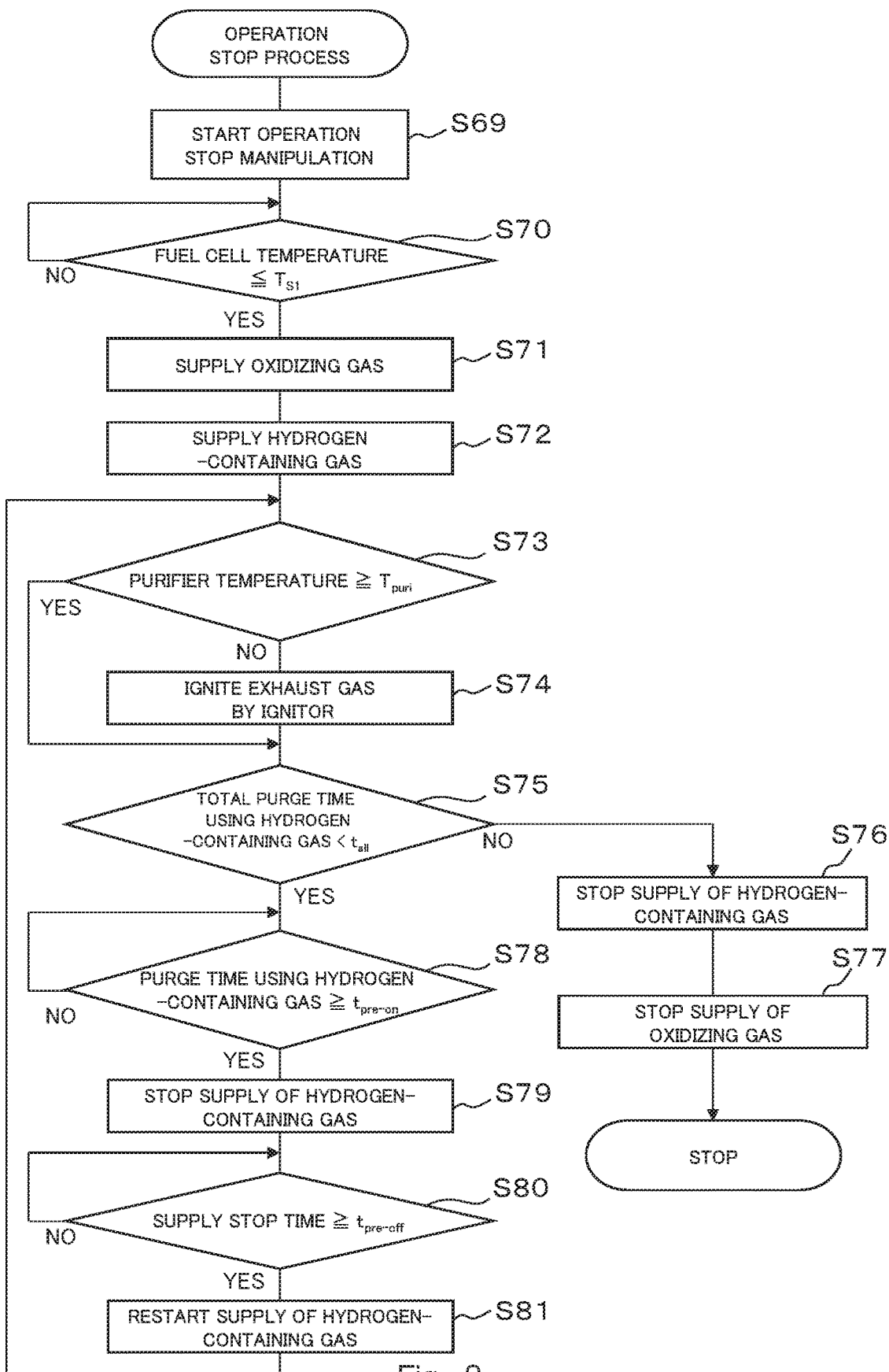
FIG. 9 is a flow chart showing one example of the operation stop process of the fuel cell system according to Modified Example 3 of Embodiment 1 of the present invention.

Next, the operation stop process of the fuel cell system 100 according to Modified Example 3 will be explained in reference to FIG. 9. FIG. 9 is a flow chart showing one example of the operation stop process of the fuel cell system 100 according to Modified Example 3 of Embodiment 1 of the present invention. The operations shown in the flow chart may be realized in such a manner that, for example, the controller 8 reads out and executes the control programs stored in the storage portion (not shown).

As shown in FIG. 2, the fuel cell system 100 according to Embodiment 1 is configured such that after the oxidizing gas is supplied (Step S11), and the hydrogen-containing gas is supplied (Step S12), the exhaust gas discharged from the fuel cell 1 is ignited by the ignitor 4 (Step S13). However, the fuel cell system 100 according to Modified Example 3 is different from the fuel cell system 100 according to Embodiment 1 in that: after the hydrogen-containing gas is supplied, the controller 8 determines whether or not the temperature of the purifier 16 is a predetermined temperature $T_{puri}$ or more; and only when the temperature of the purifier 16 is less than the predetermined temperature $T_{puri}$, the ignitor 4 ignites the exhaust gas. To be specific, only Step S73 in FIG. 9 is newly added, and Steps S70 to S72 and S74 to S81 are the same as Steps S10 to S20 in FIG. 2. Therefore, the following will mainly explain Step S73.

When the oxidizing gas is supplied to the oxidizing gas channel 12 in Step S71, and the hydrogen-containing gas is supplied to the combustible gas channel 11 in Step S72, the controller 8 monitors the change in the temperature of the purifier 16. Specifically, the controller 8 receives information regarding the temperature (purifier temperature) of the purification catalyst filled in the purifier 16, the purifier temperature being detected by the purifier temperature detecting portion T4 provided at the purifier 16, and the controller 8 determines a magnitude relation between the purifier temperature and the predetermined temperature $T_{puri}$ (Step S73). The predetermined temperature $T_{puri}$ is a lower temperature limit in a temperature range in which the purification catalyst becomes active. In the case of the Pd—$Al_2O_3$-based purification catalyst, the predetermined temperature $T_{puri}$ is about 130° C. Therefore, when the controller 8 determines that the purifier temperature is the predetermined temperature $T_{puri}$ or more (YES in Step S73), the purifier 16 is ready to purify the combustible gas contained in the flue gas. In contrast, when the controller 8 determines that the purifier temperature is less than the predetermined temperature $T_{puri}$ (NO in Step S73), the purification catalyst is not active, and the purifier 16 is not ready to purify the combustible gas in the flue gas.

As described above, the purifier 16 is configured to be heated by the heat of the flue gas. Therefore, for example, before the hydrogen-containing gas is combusted by the ignitor 4 in the combustor 3, the purifier temperature is less than the predetermined temperature $T_{puri}$.

When the purifier temperature is less than the predetermined temperature $T_{puri}$ as above, the controller 8 causes the ignitor 4 to ignite the exhaust gas (combustible gas) discharged from the fuel cell 1 (Step S74). In contrast, when the purifier 16 is heated by the heat of the flue gas generated in the combustor 3, and the purifier temperature becomes the predetermined temperature $T_{puri}$ or more, the controller 8 stops the operation of the ignitor 4 and causes the purifier 16 to purify the combustible gas.

As above, in the fuel cell system 100 according to Modified Example 3, while the purifier temperature is less than the predetermined temperature $T_{puri}$, and the purification catalyst is not active, the controller 8 causes the ignitor 4 to perform the ignition operation in the combustor 3 to combust the combustible gas. In contrast, when the purifier 16 is heated, and the purifier temperature becomes the predetermined temperature $T_{puri}$ or more, the controller 8 causes the purifier 16 to purify the combustible gas. Therefore, in the fuel cell system 100 according to Modified Example 3, the purifier 16 can purify the combustible gas in a lower temperature range than the combustor 3.

Therefore, in the fuel cell system 100 according to Modified Example 3, the amount of heat necessary to purify the combustible gas can be suppressed by combining the purifier 16 capable of purifying the combustible gas in the lower temperature range than the combustor 3 and the combustion of the combustible gas by the combustor 3. On this account, the temperature of the fuel cell system 100 can be reduced more efficiently than a case where the purification of the combustible gas is performed only by the combustor 3.

Modified Example 4 of Embodiment 1

The fuel cell system 100 according to Embodiment 1 is configured such that as shown in FIG. 2, based on the purge time of the combustible gas channel 11 by the hydrogen-containing gas, the supply and stop of the hydrogen-containing gas are performed, and the termination of the operation stop process is determined. In addition, when supplying the hydrogen-containing gas, the hydrogen-containing gas discharged from the fuel cell 1 is subjected to the flame combustion in the combustor 3 together with the oxidizing gas supplied to the oxidizing gas channel 12.

In the case of the fuel cell system 100 configured such that the purge of the combustible gas channel 11 is performed while intermittently supplying the hydrogen-containing gas, a time necessary to cool the fuel cell 1 to a predetermined temperature or less, that is, a time necessary to perform the operation stop process becomes longer than that in the case of the fuel cell system configured such that the purge is not performed at all. Therefore, the fuel cell system according to Modified Example 4 of Embodiment 1 is configured such that to reduce the time necessary to perform the operation stop process as much as possible, the fuel cell system 100 configured as shown in FIG. 1 performs the operation stop process described below.

It should be noted that as with the fuel cell system 100 according to Modified Example 2, the fuel cell system 100 according to Modified Example 4 controls the supply and stop of the hydrogen-containing gas in accordance with the temperature width of the increase or decrease of the fuel cell temperature. Therefore, the fuel cell system 100 according to Modified Example 4 may be regarded as one aspect of the fuel cell system 100 according to Modified Example 2. To reduce the time necessary to perform the operation stop process, the fuel cell system 100 according to Modified Example 4 is configured in further consideration of a relation between the increase width of the temperature of the fuel cell 1 based on which width the supply stop of the hydrogen-containing gas is determined and the decrease width of the temperature of the fuel cell 1 based on which width the supply restart of the hydrogen-containing gas is determined.

Operation Stop Process of Fuel Cell System According to Modified Example 4

Figure 10:
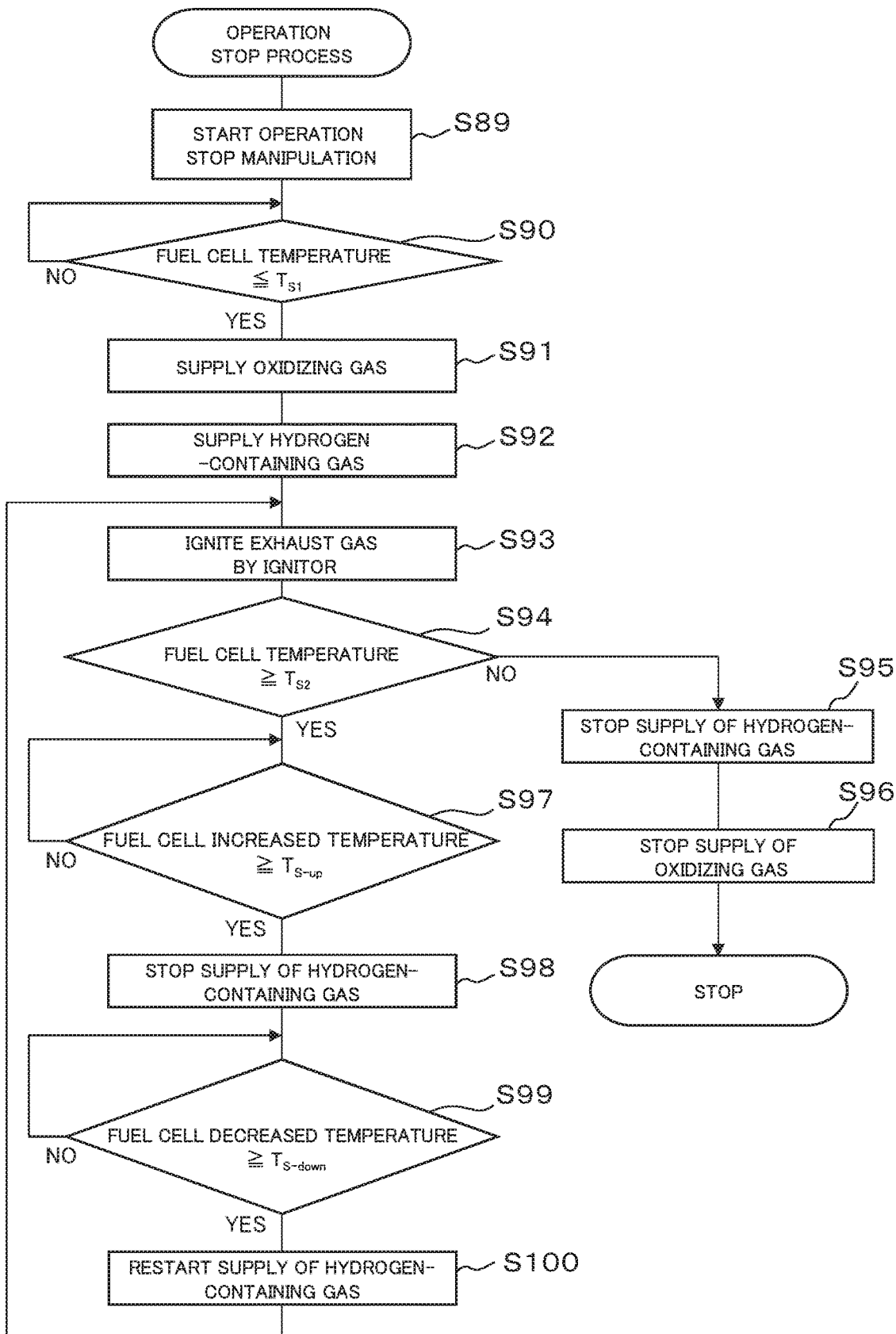
FIG. 10 is a flow chart showing one example of the operation stop process of the fuel cell system according to Modified Example 4 of Embodiment 1 of the present invention.

Hereinafter, the operation stop process of the fuel cell system 100 according to Modified Example 4 will be explained in reference to FIGS. 10 and 11. FIG. 10 is a flow chart showing one example of the operation stop process of the fuel cell system 100 according to Modified Example 4 of Embodiment 1 of the present invention. The operations shown in the flow chart may be realized in such a manner that, for example, the controller 8 reads out and executes the control programs stored in the storage portion (not shown).

Figure 11:
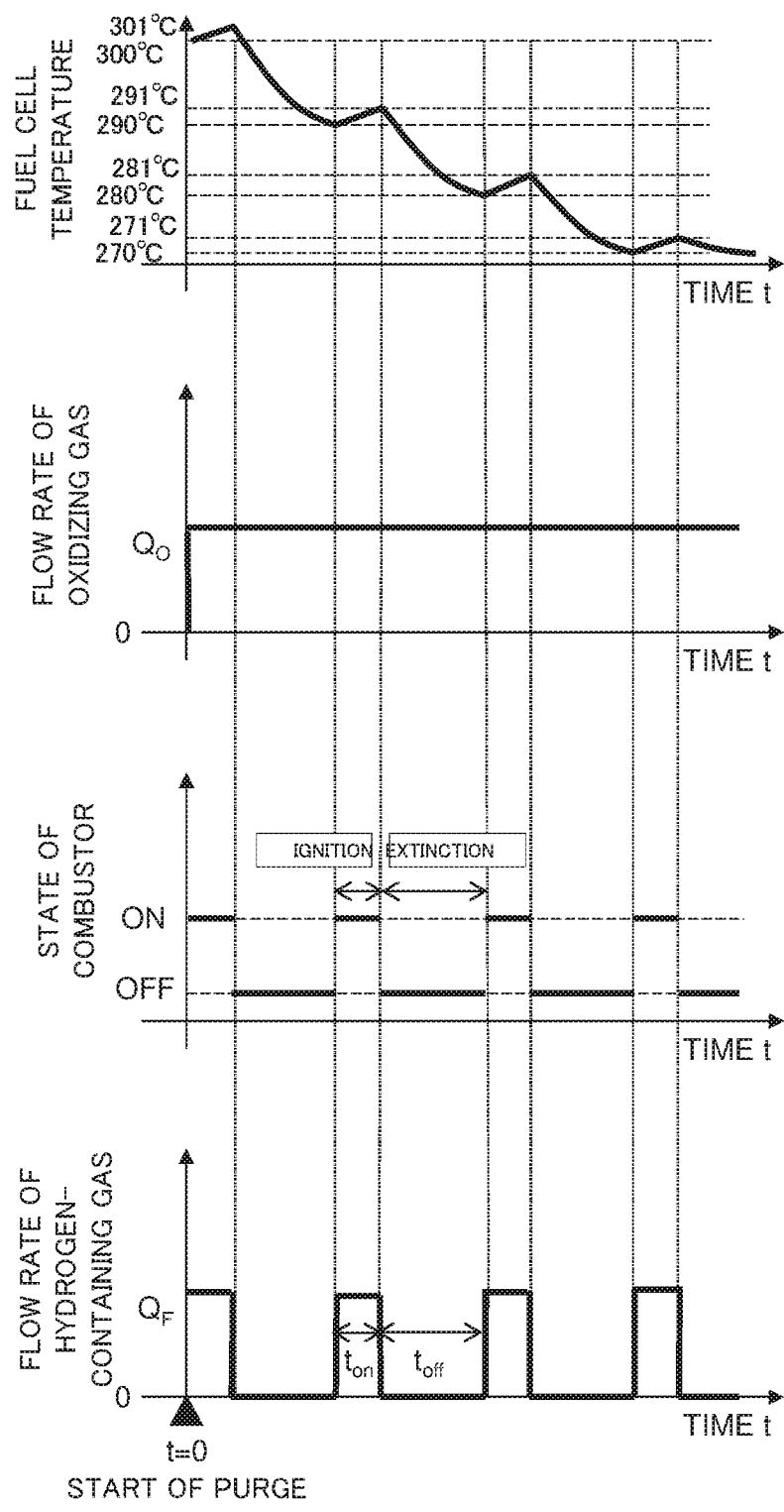
FIG. 11 is a diagram showing one example of time-series changes of the respective portions of the fuel cell system in a case where the fuel cell system operates in accordance with the flow chart shown in FIG. 10.

FIG. 11 is a diagram showing one example of time-series changes of the respective portions of the fuel cell system 100 in a case where the fuel cell system 100 operates in accordance with the flow chart shown in FIG. 10. In FIG. 11, the change in the temperature of the fuel cell 1, the change in the state (ignition or extinction) of the combustor 3, the flow rate of the oxidizing gas supplied, and the flow rate of the hydrogen-containing gas supplied are shown in time series. Further, the graph showing the flow rate of the hydrogen-containing gas shows that at t=0, the purge of the combustible gas channel 11 by utilizing the hydrogen-containing gas is started. Furthermore, for convenience of explanation, the flow rate of the hydrogen-containing gas per unit time is a constant flow rate ($Q_F$). In addition, for convenience of explanation, the flow rate of the oxidizing gas per unit time is a constant flow rate ($Q_O$).

The flow chart of the operation stop process shown in FIG. 10 is the same as the flow chart of the operation stop process shown in FIG. 2 except for Steps S94, S97, and S99. Steps S90 to S93, S95, S96, S98, and S100 shown in FIG. 10 are the same as Steps S10 to S13, S15, S16, S18, and S20 shown in FIG. 2, respectively. Therefore, the following will mainly explain Steps S94, S97, and S99.

When the exhaust gas is ignited by the ignitor 4 in Step S93, the flue gas generated by the combustor 3 flows through the flue gas channel 13, and the fuel cell 1, the reformer 2, and the like are heated by the heat of the combustion in the combustor 3. Therefore, the temperature of the fuel cell 1 gradually increases as shown in FIG. 11.

Next, in Step S94, the controller 8 performs a comparison determination between the fuel cell temperature of the fuel cell 1 and the predetermined temperature (fuel cell temperature $T_{S2}$). To be specific, the controller 8 receives information regarding the fuel cell temperature detected by the fuel cell temperature detecting portion T1 provided at the fuel cell stack and determines a magnitude relation between the fuel cell temperature and the preset fuel cell temperature $T_{S2}$. It should be noted that the fuel cell temperature $T_{S2}$ is a temperature at which the operation stop process is terminated, and may be set to, for example, about 150° C. This is because when the temperature of the stack of the fuel cell 1 is 150° C. or more in the operation stop process, and the hydrogen-containing gas is not supplied to the anode, the oxidizing gas may flow backward through the downstream portion of the anode, and the anode may oxidize.

Therefore, the controller 8 determines whether or not the fuel cell temperature is the preset fuel cell temperature $T_{S2}$ (=150° C.) or more (Step S94). When the fuel cell temperature is less than 150° C. (NO in Step S94), the controller 8 stops the supply of the hydrogen-containing gas and the supply of the oxidizing gas (Steps S95 and S96).

In contrast, if YES in Step S94, the controller 8 records in a memory (not shown) the fuel cell temperature detected in the determination of Step S94. Then, the controller 8 determines whether or not a temperature by which the fuel cell temperature is increased from the fuel cell temperature recorded in the memory is the predetermined increased temperature $T_{S-up}$ or more (Step S97). The predetermined increased temperature $T_{S-up}$ may be set to, for example, 1° C. as shown in FIG. 11. Further, the fuel cell temperature recorded in the memory may be regarded as the fuel cell temperature when the exhaust gas is ignited by the ignitor 4.

When the controller 8 determines in Step S97 that the fuel cell increased temperature is the increased temperature $T_{S-up}$ or more (YES in Step S97), the controller 8 stops the supply of the hydrogen-containing gas to the combustible gas channel 11 (Step S98). When the supply of the hydrogen-containing gas is stopped, the flame combustion of the exhaust gas in the combustor 3 is also stopped, and the temperatures of the fuel cell 1, the reformer 2, and the like in the fuel cell system 100 decrease. Further, the controller 8 records in the memory (not shown) the fuel cell temperature when the supply of the hydrogen-containing gas is stopped. Then, the controller 8 monitors the change in the fuel cell temperature.

Next, the controller 8 refers to the fuel cell temperature recorded in the memory to determine whether or not a temperature by which the temperature of the fuel cell 1 is decreased from the temperature of the fuel cell 1 when the supply of the hydrogen-containing gas is stopped is the predetermined decreased temperature $T_{S-down}$ or more (Step S99). When the controller 8 determines that the fuel cell decreased temperature is the decreased temperature $T_{S-down}$ or more (YES in Step S99), the controller 8 restarts the supply of the hydrogen-containing gas to the combustible gas channel 11. Further, the controller 8 records in the memory (not shown) the fuel cell temperature when the supply of the hydrogen-containing gas is restarted and the exhaust gas is ignited.

Decrease rates of the temperatures of the fuel cell 1, the reformer 2, and the like in the fuel cell system 100 are determined in accordance with a setting of the predetermined decreased temperature $T_{S-down}$. To be specific, when the temperature width of the decreased temperature $T_{S-down}$ is set to a largest possible value, a time it takes to decrease the temperatures of the fuel cell 1, the reformer 2, and the like becomes short, but a period in which the supply of the hydrogen-containing gas is stopped becomes long. Thus, the oxidizing gas may flow backward through the downstream portion of the anode of the fuel cell 1, and the anode may oxidize. Therefore, the decreased temperature $T_{S-down}$ is set to a highest possible temperature at which the anode of the fuel cell 1 does not oxidize. For example, in the fuel cell system 100 according to Modified Example 4, the decreased temperature $T_{S-down}$ may be set to 10° C. as shown in FIG. 11.

As above, each time the fuel cell temperature decreases by the decreased temperature $T_{S-down}$ or more, the purge using the hydrogen-containing gas is performed until the fuel cell temperature increases by the increased temperature $T_{S-up}$ or more. With this, the oxidation of the anode can be prevented by the purge of the combustible gas channel 11 by the hydrogen-containing gas while efficiently cooling the fuel cell system 100. Especially, by appropriately setting a relation between the temperature width of the decreased temperature $T_{S-down}$ and the temperature width of the increased temperature $T_{S-up}$, a cooling rate of the fuel cell system 100 can be adjusted to a desired rate.

In the operation stop process shown in FIG. 10, the fuel cell system 100 determines the supply stop and restart of the hydrogen-containing gas based on the change in the fuel cell temperature. However, the present embodiment is not limited to this. For example, the fuel cell system 100 may determine the supply stop and restart of the hydrogen-containing gas based on the change in the reformer temperature that changes in conjunction with the fuel cell temperature. In a case where the fuel cell system 100 according to Modified Example 4 is configured to determine the supply stop and restart of the hydrogen-containing gas based on the change in the reformer temperature, the controller 8 performs Steps S94, S97, and S99 shown in FIG. 10 as below.

To be specific, when the exhaust gas is ignited by the ignitor 4 in Step S93, the flue gas generated by the combustor 3 flows through the flue gas channel 13, and the fuel cell 1, the reformer 2, and the like are heated by the heat of the combustion in the combustor 3. Therefore, the temperature of the reformer 2 gradually increases in conjunction with the temperature of the fuel cell 1.

Next, in Step S94, the controller 8 performs a comparison determination between the reformer temperature and a predetermined temperature (reformer temperature $T_{R2}$). To be specific, the controller 8 receives information regarding the reformer temperature detected by the reformer temperature detecting portion T2 provided at the reformer 2 and determines a magnitude relation between the reformer temperature and the preset reformer temperature $T_{R2}$.

It should be noted that the fuel cell system 100 is configured such that as with the fuel cell 1, the reformer 2 is heated by the heat of the flame combustion in the combustor 3. Therefore, the reformer temperature and the fuel cell temperature are equal to each other, so that as with the fuel cell temperature $T_{S2}$, the reformer temperature $T_{R2}$ may be set to, for example, about 150° C.

Then, the controller 8 determines whether or not the reformer temperature is the preset reformer temperature $T_{R2}$ (=150° C.) or more. When the reformer temperature is less than 150° C., the controller 8 stops the supply of the hydrogen-containing gas and the supply of the oxidizing gas (Steps S95 and S96).

In contrast, when the controller 8 determines that the reformer temperature is the reformer temperature $T_{R2}$ (about 150° C.) or more, the controller 8 records in the memory (not shown) the reformer temperature detected in this determination. Then, the controller 8 determines whether or not a temperature by which the reformer temperature is increased from the reformer temperature recorded in the memory is the predetermined increased temperature $T_{R\text{-}up}$ or more. As with the increased temperature $T_{S\text{-}up}$, the predetermined increased temperature $T_{R\text{-}up}$ may be set to, for example, 1° C. Or, since the responsiveness of the reformer 2 with respect to the temperature change is higher than the responsiveness of the fuel cell 1 with respect to the temperature change, the increased temperature $T_{R\text{-}up}$ may be set to a temperature higher than 1° C.

Then, when the controller 8 determines that the reformer increased temperature is the increased temperature $T_{R\text{-}up}$ or more, the controller 8 stops the supply of the hydrogen-containing gas to the combustible gas channel 11. When the supply of the hydrogen-containing gas is stopped as above, the flame combustion of the exhaust gas in the combustor 3 is also stopped, and the temperatures of the fuel cell 1, the reformer 2, and the like in the fuel cell system 100 decrease. Then, the controller 8 records in the memory (not shown) the reformer temperature when the supply of the hydrogen-containing gas is stopped, and monitors the change in the reformer temperature.

Next, the controller 8 refers to the fuel cell temperature recorded in the memory to determine whether or not a temperature by which the temperature of the reformer 2 is decreased from the temperature of the reformer 2 when the supply of the hydrogen-containing gas is stopped is the predetermined decreased temperature $T_{R\text{-}down}$ or more. When the controller 8 determines that the reformer decreased temperature is the decreased temperature $T_{R\text{-}down}$ or more, the controller 8 restarts the supply of the hydrogen-containing gas to the combustible gas channel 11. Further, the controller 8 records in the memory (not shown) the reformer temperature when the supply of the hydrogen-containing gas is restarted and the exhaust gas is ignited. It should be noted that the decreased temperature $T_{R\text{-}down}$ of the reformer 2 is set to a highest possible temperature at which the oxidation of the anode of the fuel cell 1 does not occur. For example, as with the decreased temperature $T_{S\text{-}down}$ of the fuel cell 1, the decreased temperature $T_{R\text{-}down}$ of the reformer 2 may be set to about 10° C. Or, since the responsiveness of the reformer 2 with respect to the temperature change is higher than the responsiveness of the fuel cell 1 with respect to the temperature change, the decreased temperature $T_{R\text{-}down}$ may be set to a temperature higher than 10° C.

As above, each time the reformer temperature decreases by the decreased temperature $T_{R\text{-}down}$ or more, the purge using the hydrogen-containing gas is performed until the reformer temperature increases by the increased temperature $T_{R\text{-}up}$ or more. With this, the oxidation of the anode can be prevented by the purge of the combustible gas channel 11 by the hydrogen-containing gas while efficiently cooling the fuel cell system 100.

The fuel cell system 100 according to Modified Example 4 is configured such that the timing of the purge intermittently performed by the hydrogen-containing gas is determined in consideration of the decrease in the temperature of the fuel cell 1 or the reformer 2. However, the timing of the purge intermittently performed by the hydrogen-containing gas may be determined in consideration of a different factor. The following will explain Modified Example 5 in which the purge using the hydrogen-containing gas is intermittently performed in consideration of the pressure in the combustible gas channel 11 and Modified Example 6 in which the purge using the hydrogen-containing gas is intermittently performed in consideration of the change in the voltage of the fuel cell 1.

Modified Example 5 of Embodiment 1

Figure 12:
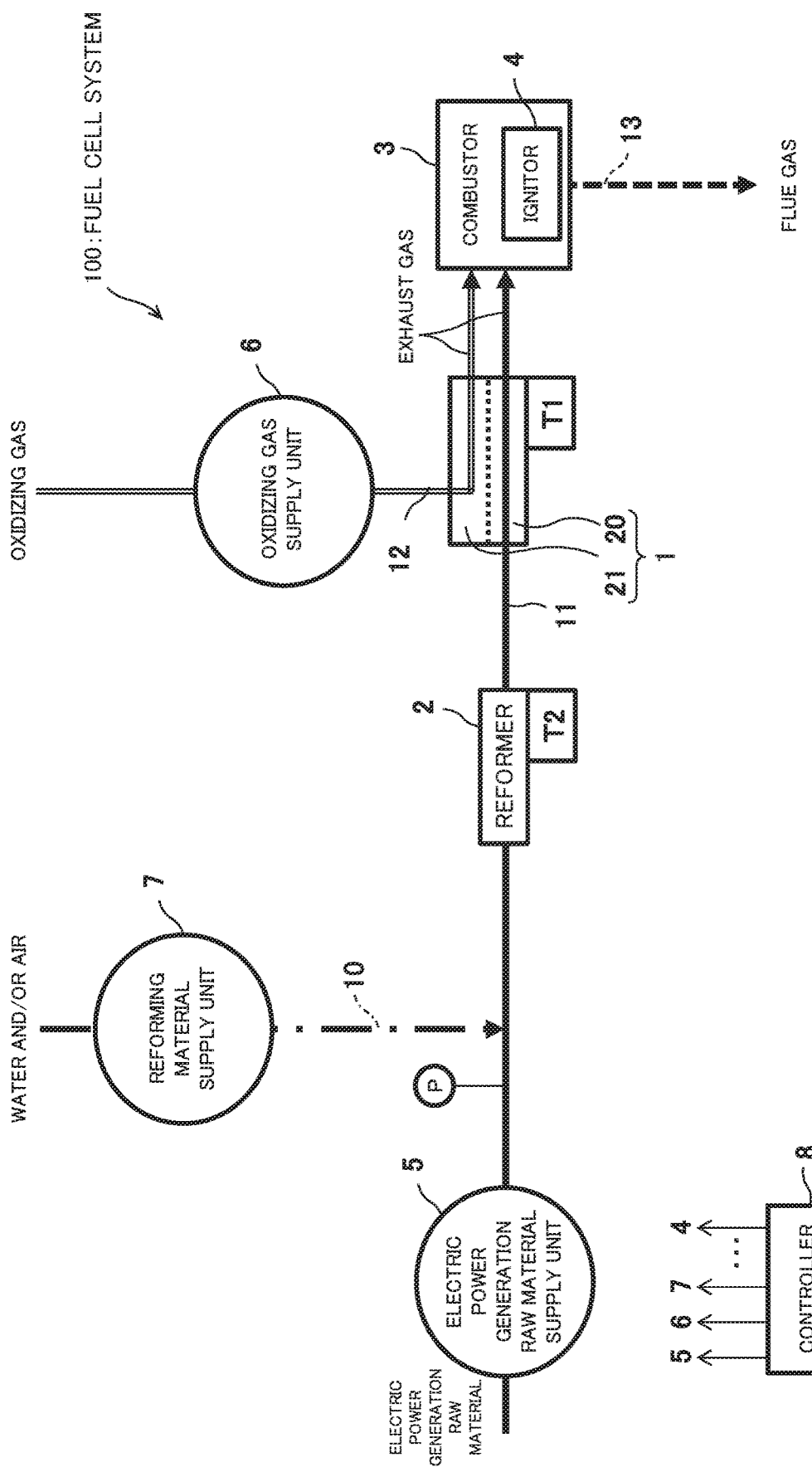
FIG. 12 is a block diagram showing one example of a schematic configuration of the fuel cell system according to Modified Example 5 of Embodiment 1 of the present invention.
Figure 13:
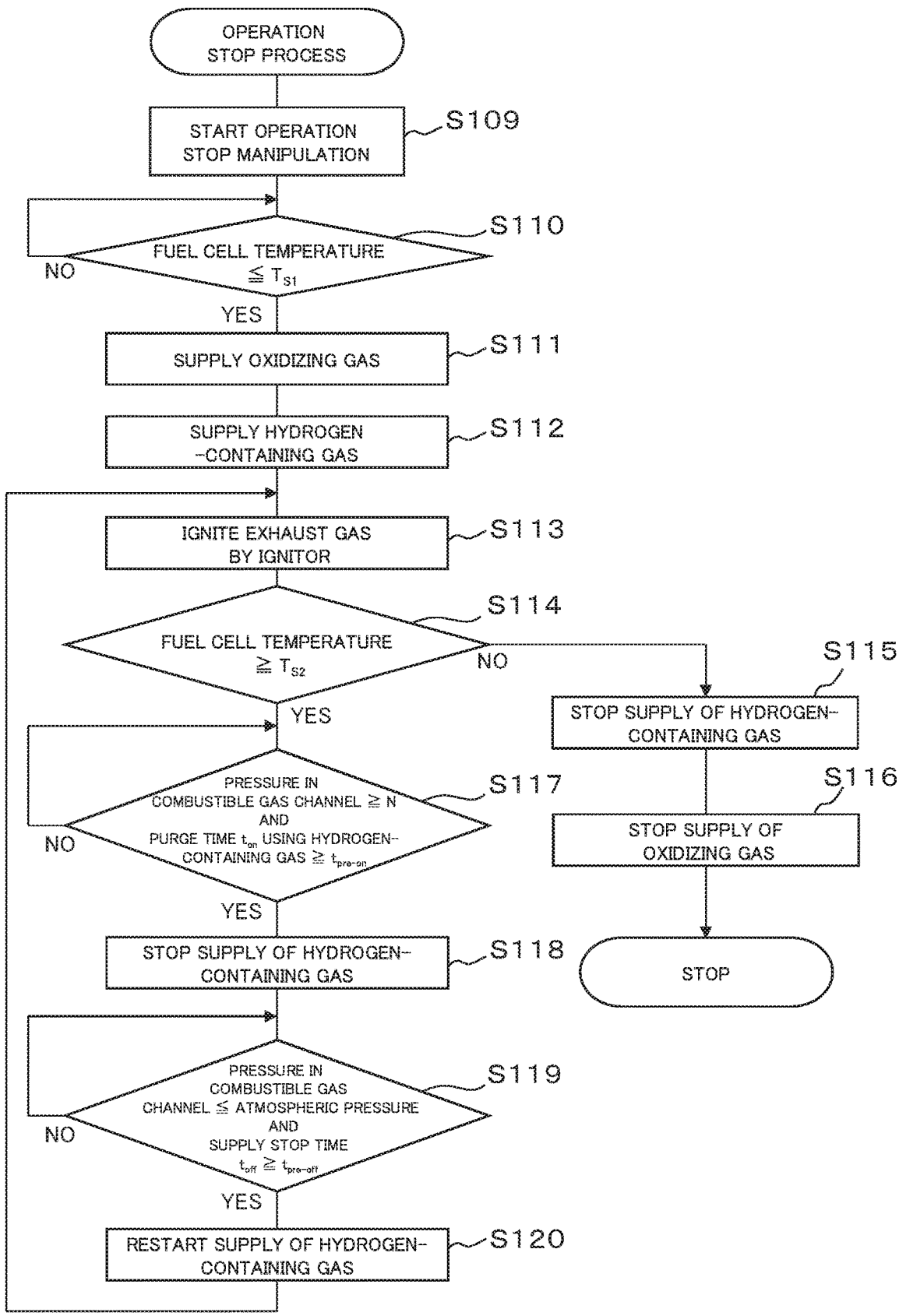
FIG. 13 is a flow chart showing one example of the operation stop process of the fuel cell system according to Modified Example 5 of Embodiment 1 of the present invention.
Figure 14:
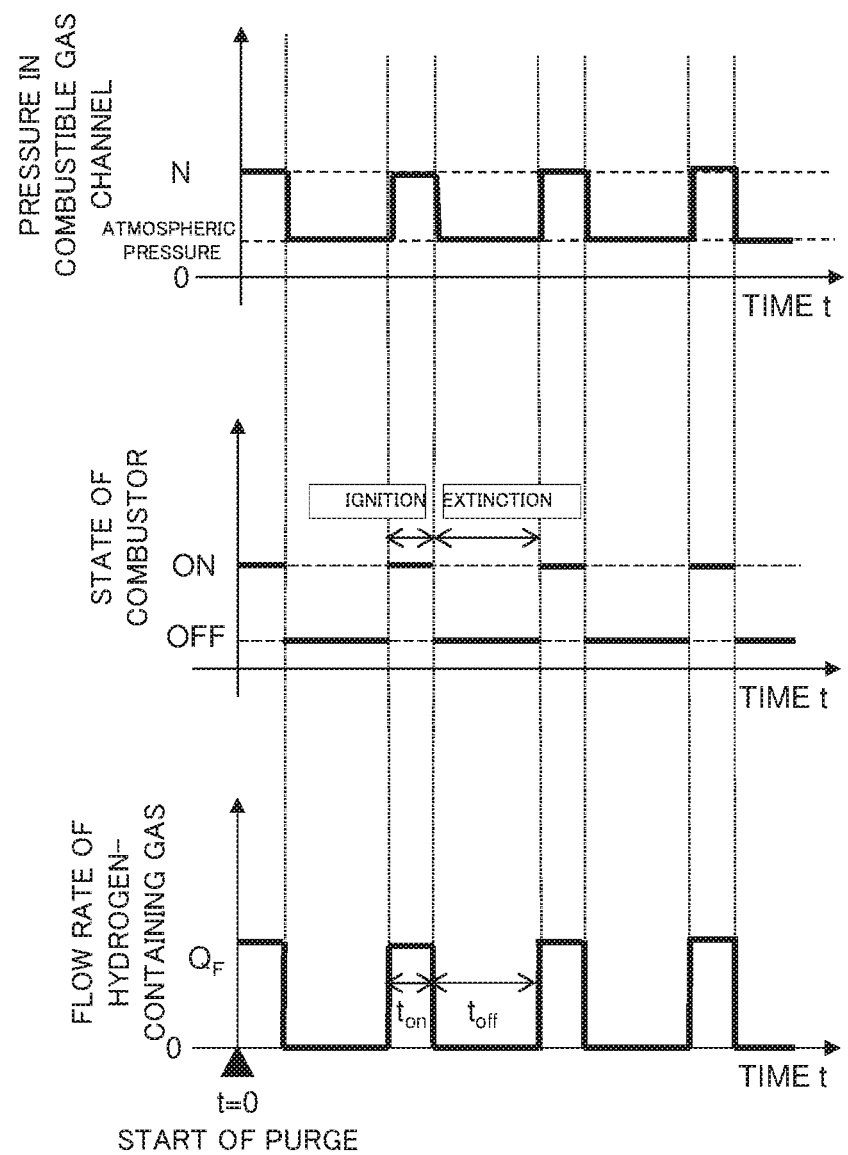
FIG. 14 is a diagram showing one example of time-series changes of the respective portions of the fuel cell system in a case where the fuel cell system operates in accordance with the flow chart shown in FIG. 13.

The fuel cell system 100 according to Modified Example 5 of Embodiment 1 of the present invention will be explained in reference to FIGS. 12 to 14. FIG. 12 is a block diagram showing one example of a schematic configuration of the fuel cell system 100 according to Modified Example 5 of Embodiment 1 of the present invention. FIG. 13 is a flow chart showing one example of the operation stop process of the fuel cell system 100 according to Modified Example 5 of Embodiment 1 of the present invention. FIG. 14 is a diagram showing one example of time-series changes of the respective portions of the fuel cell system 100 in a case where the fuel cell system 100 operates in accordance with the flow chart shown in FIG. 13. In FIG. 14, the change in the pressure in the combustible gas channel 11, the change in the state (ignition or extinction) of the combustor 3, and the flow rate of the hydrogen-containing gas supplied are shown in time series. Further, the graph showing the change in the flow rate of the hydrogen-containing gas shows that at t=0, the purge of the combustible gas channel 11 by utilizing the hydrogen-containing gas is started. Furthermore, for convenience of explanation, the flow rate of the hydrogen-containing gas per unit time is a constant flow rate ($Q_F$). In addition, for convenience of explanation, the pressure in the combustible gas channel 11 which pressure changes in accordance with the supply of the hydrogen-containing gas is constant pressure (N).

Configuration of Fuel Cell System According to Modified Example 5

As shown in FIG. 12, the fuel cell system 100 according to Modified Example 5 is configured such that the fuel cell system 100 shown in FIG. 1 further includes a pressure sensor P configured to detect the pressure in the combustible gas channel 11. Other than the above, the fuel cell system 100 according to Modified Example 5 is the same in configuration as the fuel cell system 100 shown in FIG. 1. Therefore, the same reference signs are used for the same components, and explanations thereof are omitted.

The pressure sensor P is provided at the combustible gas channel 11 so as to be located upstream of the reformer 2 and detects the pressure in the combustible gas channel 11. The pressure sensor P detects the change in the pressure in the combustible gas channel 11 which change is caused by the supply of the electric power generation raw material, and this change is regarded as the change in the pressure in the combustible gas channel 11. As shown in FIG. 14, the change in the pressure in the combustible gas channel 11 is proportional to the supply amount of the hydrogen-containing gas, in other words, the supply amount of the electric power generation raw material.

Operation Stop Process of Fuel Cell System According to Modified Example 5

The operation stop process of the fuel cell system according to Modified Example 5 configured as above will be explained in reference to FIG. 13.

The flow chart of the operation stop process shown in FIG. 13 is the same as the flow chart of the operation stop process shown in FIG. 10 except for Steps S117 and S119. Steps S110 to S116, S118, and S120 are the same as Steps S90 to S96, S98, and S100 shown in FIG. 10, respectively. Therefore, the following will mainly explain Steps S117 and S119.

When the exhaust gas is ignited by the ignitor 4 in Step S113, the flue gas generated by the combustor 3 flows through the flue gas channel 13, and the fuel cell 1, the reformer 2, and the like are heated by the heat of the combustion in the combustor 3. Next, in Step S114, the controller 8 receives information regarding the fuel cell temperature detected by the fuel cell temperature detecting portion T1 provided at the fuel cell stack and determines a magnitude relation between the fuel cell temperature and the preset fuel cell temperature $T_{S2}$. It should be noted that the fuel cell temperature $T_{S2}$ is a temperature at which the operation stop process is terminated, and may be set to, for example, about 150° C. The controller 8 determines whether or not the fuel cell temperature is the preset fuel cell temperature $T_{S2}$ (=150° C.) or more. When the fuel cell temperature is less than 150° C. (NO in Step S114), the controller 8 stops the supply of the hydrogen-containing gas and the supply of the oxidizing gas (Steps S115 and S116).

In contrast, if YES in Step S114, the controller 8 receives information regarding the pressure in the combustible gas channel 11 from the pressure sensor P and determines a magnitude relation between the pressure in the combustible gas channel 11 and predetermined pressure N. It should be noted that the predetermined pressure N is the pressure in the combustible gas channel 11 through which the hydrogen-containing gas flows at the flow rate Q(F) per unit time, or pressure in the vicinity thereof. Further, the controller 8 determines a magnitude relation between the purge time $t_{on}$ using the hydrogen-containing gas and the preset purge time $t_{pre-on}$ based on a time measured by the timer unit (not shown).

When the controller 8 determines that the pressure in the combustible gas channel 11 is the predetermined pressure N or more, and the purge time $t_{on}$ using the hydrogen-containing gas is the preset purge time $t_{pre-on}$ or more (YES in Step S117), the controller 8 stops the supply of the electric power generation raw material and the supply of the reforming material (at least one of the water and the air) to stop the supply of the hydrogen-containing gas (Step S118).

After the supply of the hydrogen-containing gas is stopped in Step S118, the controller 8 receives information regarding the pressure in the combustible gas channel 11 from the pressure sensor P and determines a magnitude relation between the pressure in the combustible gas channel 11 and atmospheric pressure. Further, the controller 8 performs a comparison determination between the supply stop time $t_{off}$ of the hydrogen-containing gas and the predetermined time (preset supply stop time $t_{pre-off}$) (Step S119). When the controller 8 determines that the pressure in the combustible gas channel 11 is the atmospheric pressure or less, and the supply stop time $t_{off}$ of the hydrogen-containing gas is the preset supply stop time $t_{pre-off}$ or more (YES in Step S119), the controller 8 restarts the supply of the hydrogen-containing gas (Step S120). It should be noted that the magnitude relation between the pressure in the combustible gas channel 11 and the atmospheric pressure is determined in Step S119. However, the pressure in the combustible gas channel 11 may be compared with predetermined pressure slightly higher than the atmospheric pressure. To be specific, the controller 8 is only required to monitor the pressure in the combustible gas channel 11 such that the pressure in the combustible gas channel 11 does not become negative pressure.

In addition to the determination of the magnitude relation between the purge time $t_{on}$ using the hydrogen-containing gas and the purge time $t_{pre-on}$ and the determination of the magnitude relation between the supply stop time $t_{off}$ of the hydrogen-containing gas and the preset supply stop time $t_{pre-off}$, the determination of the magnitude relation between the pressure in the combustible gas channel 11 and the predetermined pressure N and the determination of the magnitude relation between the pressure in the combustible gas channel 11 and the atmospheric pressure are performed because of the following reasons.

In the operation stop process of the fuel cell system 100, first, the operation stop manipulation in Step S109 is started. With this, the electric power generation of the fuel cell 1 is stopped, and the temperatures of the fuel cell 1, the reformer 2, and the like decrease. In accordance with this temperature decrease, the residual gas in the combustible gas channel 11 contracts, and this decreases the pressure in the combustible gas channel 11. Further, the temperature of the steam contained in the residual gas in the combustible gas channel 11 reaches the dew point, and therefore, the steam condenses. With this, the pressure in the combustible gas channel 11 decreases. If the pressure in the combustible gas channel 11 becomes the negative pressure, air flows into the combustible gas channel 11 from outside, and this oxidizes the anode. Therefore, in the fuel cell system 100 according to Modified Example 5, to prevent the oxidation of the anode, when the pressure in the combustible gas channel 11 becomes the atmospheric pressure or less, the hydrogen-containing gas is supplied for compensating reduced pressure. Thus, the pressure in the combustible gas channel 11 is prevented from becoming the negative pressure. In contrast, when the purge time $t_{on}$ is the purge time $t_{pre-on}$ or more, and the pressure in the combustible gas channel 11 is the predetermined pressure N or more, that is, the pressure in the combustible gas channel 11 is not the negative pressure, the supply of the hydrogen-containing gas can be stopped.

Modified Example 6 of Embodiment 1

Figure 15:
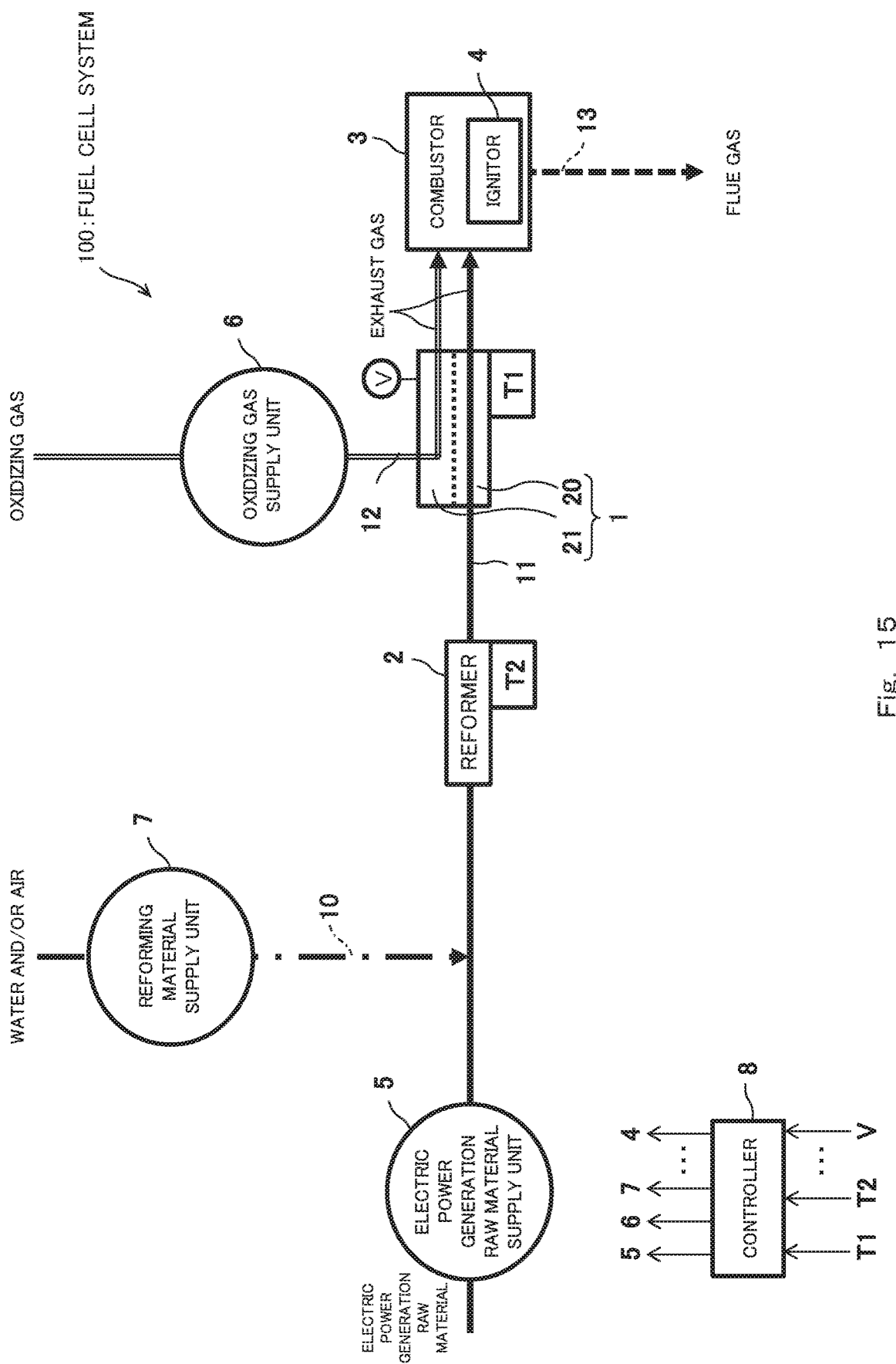
FIG. 15 is a block diagram showing one example of a schematic configuration of the fuel cell system according to Modified Example 6 of Embodiment 1 of the present invention.
Figure 16:
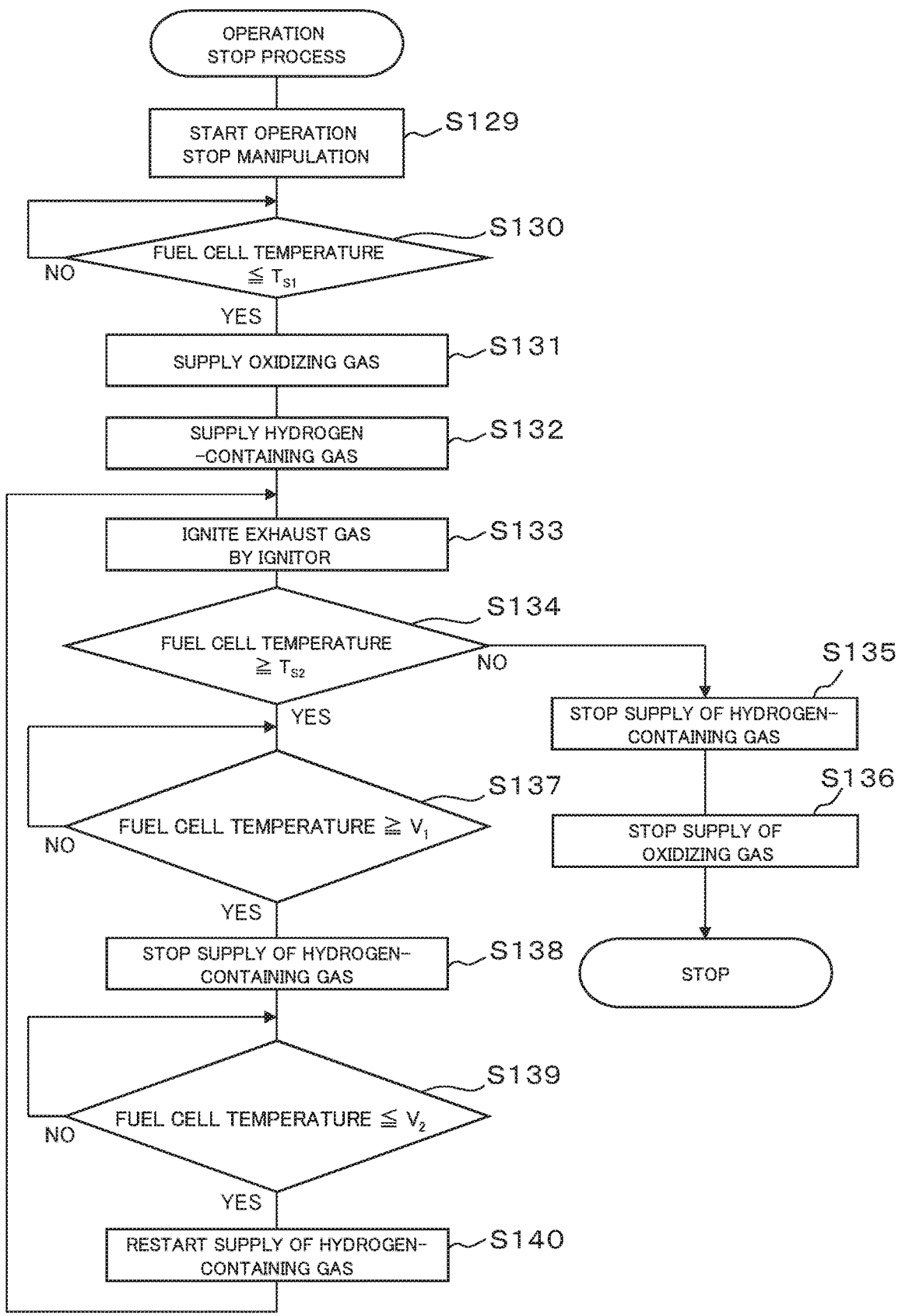
FIG. 16 is a flow chart showing one example of the operation stop process of the fuel cell system according to Modified Example 6 of Embodiment 1 of the present invention.
Figure 17:
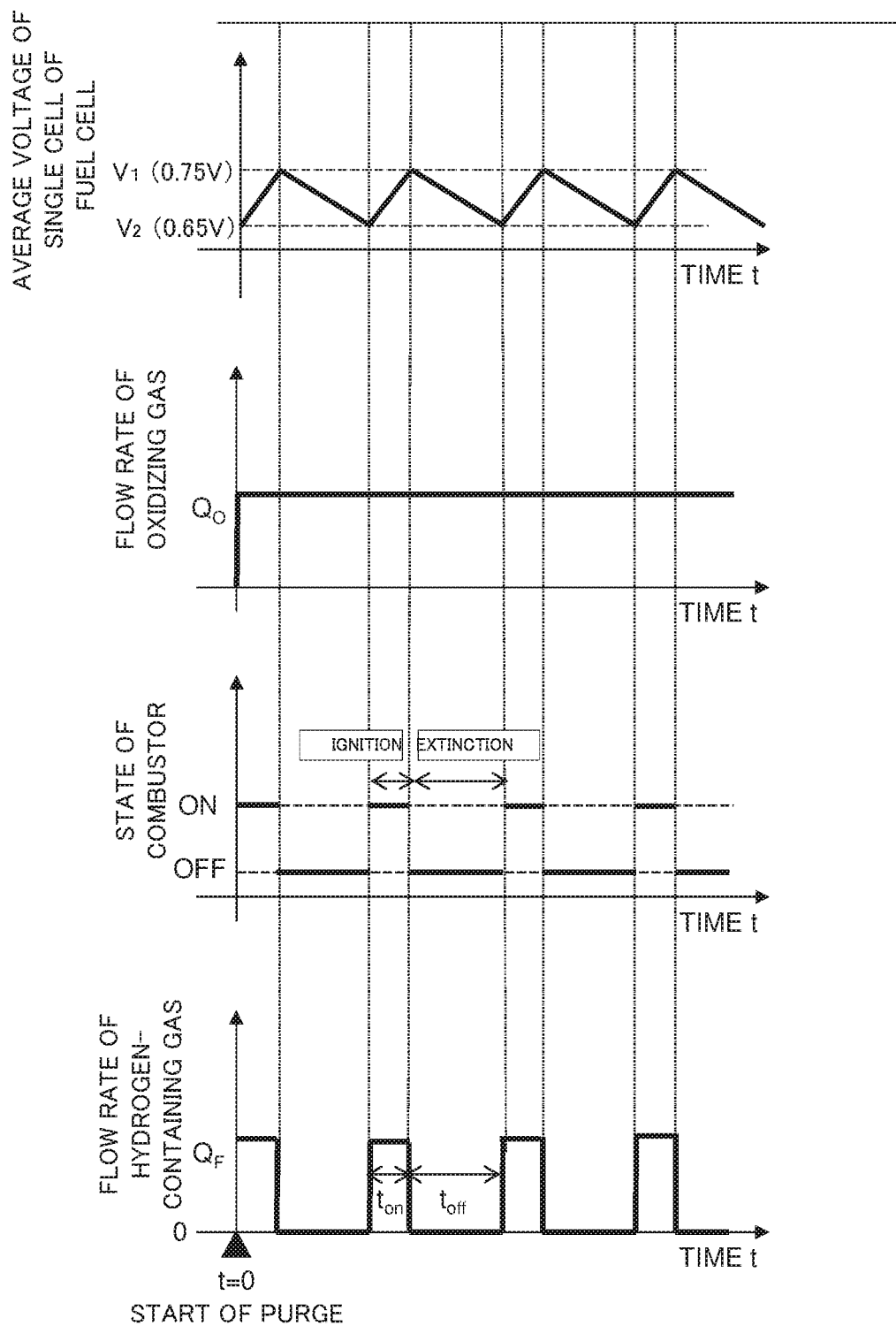
FIG. 17 is a diagram showing one example of time-series changes of the respective portions of the fuel cell system in a case where the fuel cell system operates in accordance with the flow chart shown in FIG. 16.

The fuel cell system 100 according to Modified Example 6 of Embodiment 1 of the present invention will be explained in reference to FIGS. 15 to 17. FIG. 15 is a block diagram showing one example of a schematic configuration of the fuel cell system 100 according to Modified Example 6 of Embodiment 1 of the present invention. FIG. 16 is a flow chart showing one example of the operation stop process of the fuel cell system 100 according to Modified Example 6 of Embodiment 1 of the present invention. FIG. 17 is a diagram showing one example of time-series changes of the respective portions of the fuel cell system 100 in a case where the fuel cell system 100 operates in accordance with the flow chart shown in FIG. 16. In FIG. 17, the change in the average voltage of the single cell of the fuel cell 1, the change in the state (ignition or extinction) of the combustor 3, the flow rate of the oxidizing gas supplied, and the flow rate of the hydrogen-containing gas supplied are shown in time series. Further, the graph showing the change in the flow rate of the hydrogen-containing gas shows that at t=0, the purge of the combustible gas channel 11 by utilizing the hydrogen-containing gas is started. Furthermore, for convenience of explanation, the flow rate of the hydrogen-containing gas per unit time is a constant flow rate ($Q_F$).

Configuration of Fuel Cell System According to Modified Example 6

As shown in FIG. 15, the fuel cell system 100 according to Modified Example 6 is configured such that the fuel cell system 100 shown in FIG. 1 further includes a voltage detector V configured to detect the voltage of the fuel cell 1. Other than the above, the fuel cell system 100 according to Modified Example 6 is the same in configuration as the fuel cell system 100 shown in FIG. 1. Therefore, the same reference signs are used for the same components, and explanations thereof are omitted.

The voltage detector V detects the voltage of the fuel cell 1. Specifically, the voltage detector V detects, as the voltage of the fuel cell 1, an average value of the voltage of a predetermined single cell in the cell stack of the fuel cell 1.

When the operation stop manipulation in Step S129 shown in FIG. 16 is started in the operation stop process, the electric power generation of the fuel cell 1 is stopped. Therefore, after the operation stop manipulation is started, the voltage detector V does not detect the voltage change caused by the electric power generation. However, when the temperatures of the fuel cell 1, the reformer 2, and the like decrease after the operation stop, the pressure in the combustible gas channel 11 decreases as described above, and the air may flow into the anode. In such a case, a voltage reduction occurs in the single cell of the fuel cell 1. To be specific, the change in the voltage of the single cell of the fuel cell 1 can be used as an index for determining whether or not the air flows into the anode.

In the fuel cell system 100 according to Modified Example 6, when the voltage of the fuel cell 1 decreases, the hydrogen-containing gas is supplied, so that the air can be prevented from flowing into the anode.

Operation Stop Process of Fuel Cell System According to Modified Example 6

The operation stop process of the fuel cell system 100 according to Modified Example 6 configured as above will be explained in reference to FIG. 16.

The flow chart of the operation stop process shown in FIG. 16 is the same as the flow chart of the operation stop process shown in FIG. 10 except for Steps S137 and S139. Steps S130 to S136, S138, and S140 are the same as Steps S90 to S96, S98, and S100 shown in FIG. 10, respectively. Therefore, the following will mainly explain Steps S137 and S139.

When the exhaust gas is ignited by the ignitor 4 in Step S133, the flue gas generated by the combustor 3 flows through the flue gas channel 13, and the fuel cell 1, the reformer 2, and the like are heated by the heat of the flame combustion in the combustor 3. Next, in Step S134, the controller 8 receives information regarding the fuel cell temperature from the fuel cell temperature detecting portion T1 and determines a magnitude relation between the fuel cell temperature and the preset fuel cell temperature $T_{S2}$. It should be noted that the fuel cell temperature $T_{S2}$ is a temperature at which the operation stop process is terminated, and may be set to, for example, about 150° C. The controller 8 determines whether or not the fuel cell temperature is the preset fuel cell temperature $T_{S2}$ (=150° C.) or more. When the fuel cell temperature is less than 150° C. (NO in Step S134), the controller 8 stops the supply of the hydrogen-containing gas and the supply of the oxidizing gas (Steps S135 and S136).

In contrast, if YES in Step S134, the controller 8 receives information regarding the voltage of the fuel cell 1 from the voltage detector V and determines a magnitude relation between the voltage of the fuel cell 1 and a predetermined voltage $V_1$. It should be noted that the predetermined voltage $V_1$ is the voltage of the fuel cell 1 when the air does not flow into the combustible gas channel 11 through the flue gas channel 13 from outside, and may be set to, for example, 0.75 V.

When the controller 8 determines that the voltage of the fuel cell 1 is the predetermined voltage $V_1$ or more (YES in Step S134), the controller 8 stops the supply of the electric power generation raw material and the supply of the reforming material (at least one of the water and the air) to stop the supply of the hydrogen-containing gas (Step S138).

After the supply of the hydrogen-containing gas is stopped in Step S138, the controller 8 receives information regarding the voltage of the fuel cell 1 from the voltage detector V and determines a magnitude relation between the voltage of the fuel cell 1 and a predetermined voltage $V_2$ (Step S139). When the controller 8 determines that the voltage of the fuel cell 1 is the predetermined voltage $V_2$ or less (YES in Step S139), the controller 8 restarts the supply of the hydrogen-containing gas (Step S140). It should be noted that the predetermined voltage $V_2$ is the voltage of the fuel cell 1 when the air has flowed into the combustible gas channel 11 through the flue gas channel 13 from outside, that is, the voltage of the fuel cell 1 when the pressure in the combustible gas channel 11 has become the negative pressure, and may be set to, for example, 0.65 V.

It should be noted that each of Modified Examples 4 to 6 is configured such that the supply stop and supply restart of the hydrogen-containing gas are determined in consideration of the change in the fuel cell temperature, the change in the pressure in the combustible gas channel 11, or the change in the voltage of the fuel cell 1. However, the present embodiment is not limited to these. Each of Modified Examples 4 to 6 may be configured such that the supply stop and supply restart of the hydrogen-containing gas are determined in consideration of the change in the fuel cell temperature, the change in the pressure in the combustible gas channel 11, or the change in the voltage of the fuel cell 1, and in addition, the magnitude relation between the fuel cell temperature and the predetermined temperature, between the reformer temperature and the predetermined temperature, or between the desulfurizer temperature and the predetermined temperature.

Embodiment 2

Configuration of Fuel Cell System

Figure 18:
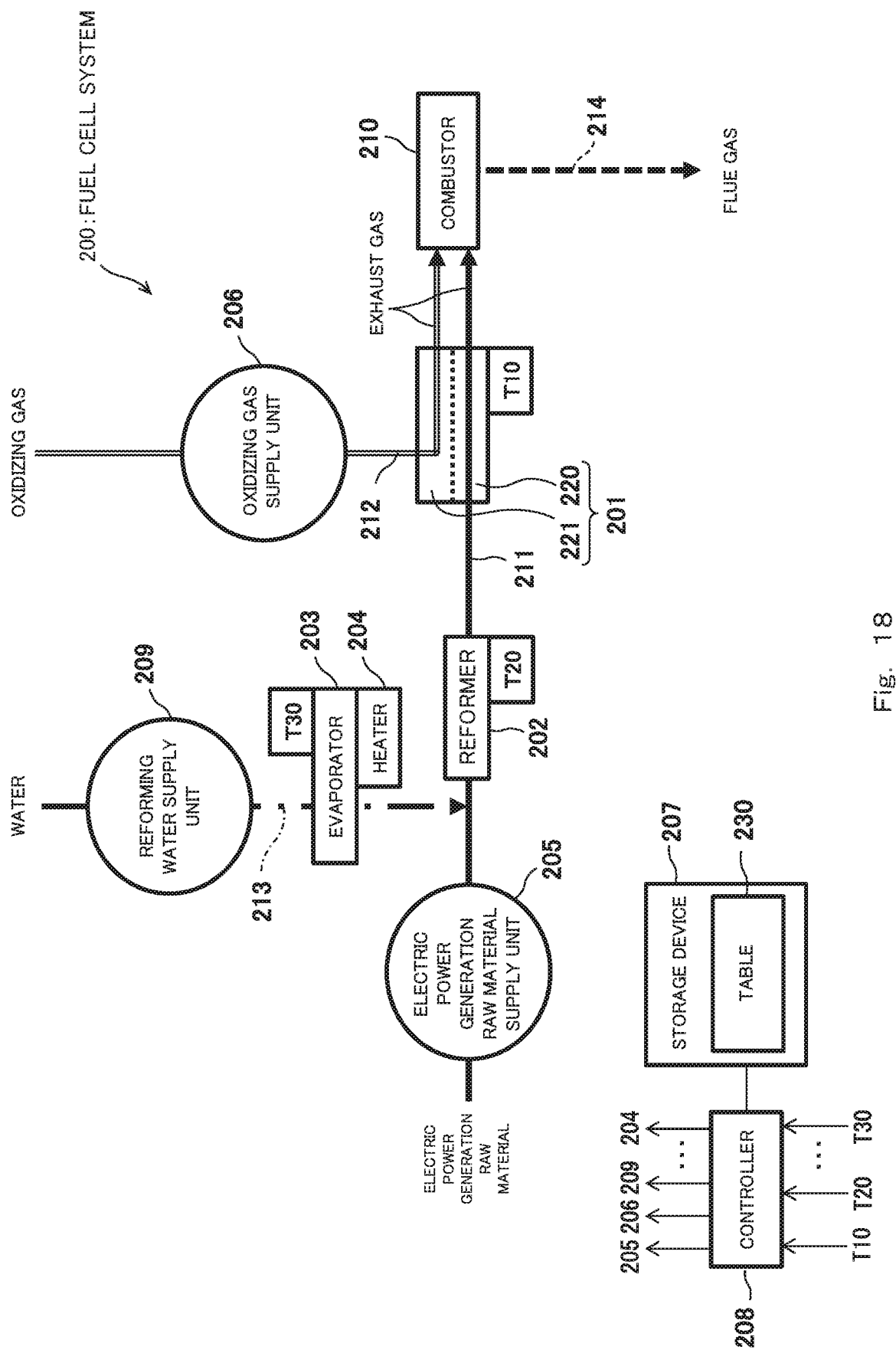
FIG. 18 is a block diagram showing one example of a schematic configuration of the fuel cell system according to Embodiment 2 of the present invention.

First, a fuel cell system 200 according to Embodiment 2 of the present invention will be explained in reference to FIG. 18. FIG. 18 is a block diagram showing one example of a schematic configuration of the fuel cell system 200 according to Embodiment 2 of the present invention. The present embodiment will explain an example in which the fuel cell system 200 includes a solid-oxide fuel cell as a fuel cell 201. However, the present embodiment is not limited to this.

As shown in FIG. 18, the fuel cell system 200 includes: the fuel cell 201; a reformer 202; an evaporator 203; a heater 204; an electric power generation raw material supply unit 205; an oxidizing gas supply unit 206; a storage device 207; a controller 208; a reforming water supply unit 209 as a reforming material supply unit; and a combustor 210. As channels coupling the respective portions to one another, the fuel cell system 200 includes a combustible gas channel 211, an oxidizing gas channel 212, and a reforming water channel 213.

The electric power generation raw material supply unit 205 supplies the electric power generation raw material to the reformer 202 and may be configured to be able to adjust the flow rate of the electric power generation raw material supplied to the reformer 202. The electric power generation raw material supply unit 205 is the same in configuration as the electric power generation raw material supply unit 5 of the fuel cell system 100 according to Embodiment 1, so that a detailed explanation thereof is omitted.

The oxidizing gas supply unit 206 supplies the oxidizing gas to a cathode 221 of the fuel cell 201 and may be configured to be able to adjust the flow rate of the oxidizing gas supplied to the cathode 221 of the fuel cell 201. The oxidizing gas supply unit 206 is the same in configuration as the oxidizing gas supply unit 6 of the fuel cell system 100 according to Embodiment 1, so that a detailed explanation thereof is omitted.

The reforming water supply unit 209 supplies to the reformer 202 the water (steam) used in the reforming reaction and may be configured to be able to adjust the flow rate of the water (steam) supplied to the reformer 202. It should be noted that the reforming water supply unit 209 may be configured to include a booster and a flow rate control valve or may be configured to include only one of a booster and a flow rate control valve. For example, a motor-driven fixed displacement pump is used as the booster, but the booster is not limited to this. The reforming water supplied by the reforming water supply unit 209 is evaporated by the evaporator 203 to be supplied to the reformer 202 through the reforming water channel 213 and the combustible gas channel 211.

The combustible gas channel 211 is a channel extending from the electric power generation raw material supply unit 205 through the reformer 202 to an anode 220 of the fuel cell 201. The electric power generation raw material or the hydrogen-containing gas, which is the combustible gas, flows through the combustible gas channel 211. As shown in FIG. 18, the combustible gas channel 211 corresponds to a section from the electric power generation raw material supply unit 205 to a downstream end of the anode 220 of the fuel cell 201. To be specific, the combustible gas channel 211 is a channel constituted by: a channel through which the electric power generation raw material is introduced from the electric power generation raw material supply unit 205 to the reformer 202; and a channel through which the hydrogen-containing gas generated by reforming the electric power generation raw material in the reformer 202 is introduced to the fuel cell 201.

The oxidizing gas channel 212 is a channel extending from the oxidizing gas supply unit 206 to the cathode 221 of the fuel cell 201. The oxidizing gas flows through the oxidizing gas channel 212. As shown in FIG. 18, the oxidizing gas channel 212 corresponds to a section from the oxidizing gas supply unit 206 to a downstream end of the cathode 221 of the fuel cell 201.

The reforming water channel 213 is a channel extending from the reforming water supply unit 209 to a merging portion (not shown) of the combustible gas channel 211, the merging portion being located upstream of the reformer 202. The reforming water channel 213 is connected to the combustible gas channel 211 at this merging portion. The water (steam) utilized in the reforming reaction performed in the reformer 202 flows through the reforming water channel 213.

The fuel cell 201 is, for example, a solid-oxide fuel cell which generates electric power by the electric power generating reaction utilizing the hydrogen-containing gas (reformed gas) supplied from the reformer 202 through the combustible gas channel 211 and the oxidizing gas supplied through the oxidizing gas channel 212. The fuel cell 201 includes a cell stack formed by connecting a plurality of single cells in series, and each of the single cells includes the anode 220 to which the hydrogen-containing gas is supplied and the cathode 221 to which the oxidizing gas is supplied, and is configured to perform the electric power generating reaction between the anode 220 and the cathode 221 to generate electric power. The fuel cell 201 is the same in configuration as the fuel cell 1 of the fuel cell system 100 according to Embodiment 1, so that a detailed explanation thereof is omitted.

As shown in FIG. 18, the combustor 210 is provided at a rear stage of the fuel cell 201, and the flame combustion of the hydrogen-containing gas and the oxidizing gas which are unconsumed in the electric power generation of the fuel cell 201 is performed in the combustor 210. The heat necessary for the fuel cell 201, the reformer 202, and the like is generated by this flame combustion, and the generated flue gas is discharged to the outside of the system through a flue gas channel (not shown). For example, a heat exchanger may be provided at a portion of a flue gas channel 214, and the oxidizing gas supplied to the cathode 221 may be increased in temperature by the heat exchange with the flue gas before the flue gas is discharged to the outside of the system. With this configuration, the fuel cell system 200 can operate with a higher energy utilization efficiency.

Although details will be described later, the fuel cell system 200 is configured such that in the operation stop process, the combustible gas channel 211 is purged by the hydrogen-containing gas generated by reforming the electric power generation raw material, and the oxidizing gas channel 212 is purged by the oxidizing gas. Therefore, during the purge in the operation stop process, the hydrogen-containing gas from the anode 220 of the fuel cell 201 and the oxidizing gas from the cathode 221 of the fuel cell 201 are introduced to the combustor 210. Then, the hydrogen-containing gas may be ignited in the combustor 210 to be subjected to the flame combustion together with the oxidizing gas.

The reformer 202 generates the hydrogen-containing gas by the reforming reaction using the electric power generation raw material and the water (steam) for reforming. One example of the reforming reaction performed in the reformer 202 is the steam-reforming reaction.

To execute the steam-reforming reaction as the reforming reaction, the fuel cell system 200 includes the evaporator 203 configured to generate the steam and the heater 204 configured to heat the evaporator 203 to a predetermined temperature.

When the fuel cell system 200 is started up, the heater 204 heats the evaporator 203 to a predetermined temperature range. Further, when the temperature of the evaporator 203 is a predetermined temperature or less in the operation stop process, the heater 204 heats the evaporator 203. One example of the heater 204 is an electric heater.

It should be noted that the evaporator 203 may be heated by the heater 204 to be maintained in the predetermined temperature range not only at the time of the start-up and during the operation stop process but also during the steady operation of the fuel cell system 200. Or, during the steady operation of the fuel cell system 20, the evaporator 203 may be maintained in the predetermined temperature range by the heat of the flue gas generated by the combustor 210 without starting up the heater 204.

The electric power generation raw material supplied to the fuel cell system 200 may be the same as the electric power generation raw material supplied to the fuel cell system 100.

The controller 208 controls various operations of the respective portions of the fuel cell system 200. For example, after the electric power generation of the fuel cell 201 is stopped in the operation stop process of the fuel cell system 200, the controller 208 causes the electric power generation raw material supply unit 205 to supply the electric power generation raw material to the combustible gas channel 211 and causes the reforming water supply unit 209 and the evaporator 203 to supply the steam to the combustible gas channel 211 in accordance with the supply of the electric power generation raw material to generate the hydrogen-containing gas in the reformer 202. Further, the controller 208 causes the oxidizing gas supply unit 206 to supply the oxidizing gas to the oxidizing gas channel 212. It should be noted that the combustible gas channel 211 and the oxidizing gas channel 212 merge at the combustor 210 provided at a rear stage of the fuel cell 201. Therefore, the controller 208 is only required to supply the oxidizing gas so as to prevent a case where the hydrogen-containing gas flowing though the combustible gas channel 211 flows into the oxidizing gas channel 212 to reduce and deteriorate the cathode 221. A period in which the electric power generation raw material is supplied and a period in which the oxidizing gas is supplied do not necessarily have to coincide with each other.

Furthermore, the controller 208 controls the start-up of the heater 204 in accordance with an elapsed time from the stop of the electric power generation of the fuel cell 201 in the operation stop process, an elapsed time from the reception of a signal indicating the operation instruction of the operation stop, the temperature of the fuel cell 201, the temperature of the reformer 202, the temperature of the evaporator 203, or the like. Then, the controller 208 starts up the heater 204 to increase the temperature of the evaporator 203 to a temperature range in which water can be evaporated.

To be specific, the controller 208 includes a timer portion (not shown) and receives time information measured by the timer portion. Therefore, the controller 208 can recognize the elapsed time from the stop of the electric power generation of the fuel cell 201 or the elapsed time from the reception of the signal indicating the operation instruction of the operation stop. Further, a fuel cell temperature detector T10 as a temperature detecting portion is provided at the fuel cell 201, a reformer temperature detector T20 as a temperature detecting portion is provided at the reformer 202, and an evaporator temperature detector T30 as a temperature detecting portion is provided at the evaporator 203. The controller 208 receives temperature information from these temperature detectors to recognize the temperatures of the fuel cell 201, the reformer 202, and the evaporator 203. It should be noted that each of the fuel cell temperature detector T10, the reformer temperature detector T20, and the evaporator temperature detector T30 is constituted by a thermocouple, a thermistor, or the like. In Embodiment 2 of the present invention, the controller 208 includes the fuel cell temperature detector T10, the reformer temperature detector T20, and the evaporator temperature detector T30 as the temperature detecting portions. However, the controller 208 may include at least one of these temperature detectors and receive the temperature information.

The controller 208 is only required to have a control function and may be the same in configuration as the controller 8 according to Embodiment 1.

The storage device 207 stores; control programs (not shown) executed by the calculation processing portion; and a table 230 in which the changes in the temperatures of the fuel cell 201, the reformer 202, and the evaporator 203 are associated with one another, the changes being acquired in advance by experiments or the like. The table 230 also records below-described predetermined temperatures set in respective temperature change ranges of the fuel cell 201, the reformer 202, and the evaporator 203.

Operation Stop Process of Fuel Cell System

Figure 19:
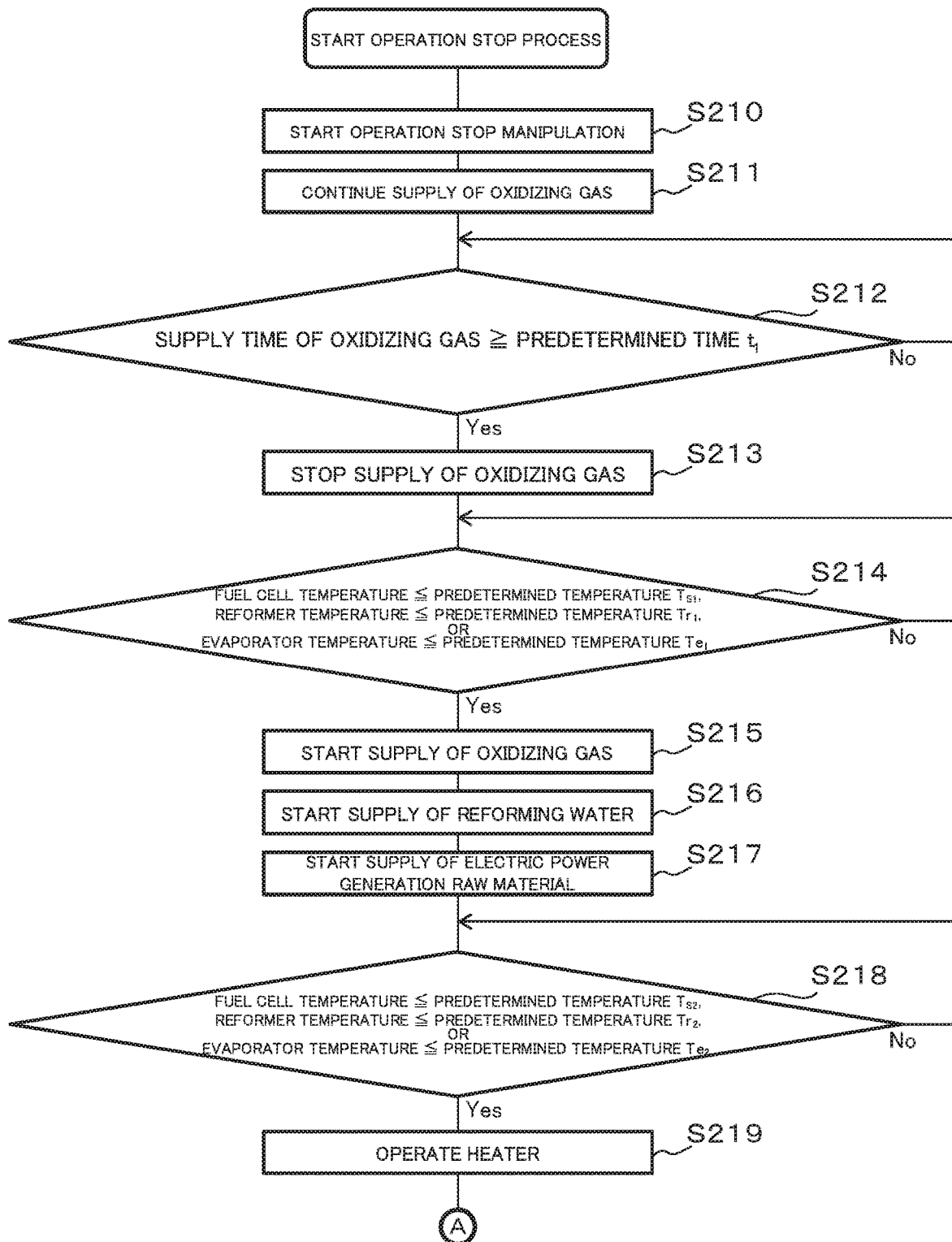
FIG. 19 is a flow chart showing one example of the operation stop process of the fuel cell system according to Embodiment 2 of the present invention.
Figure 20:
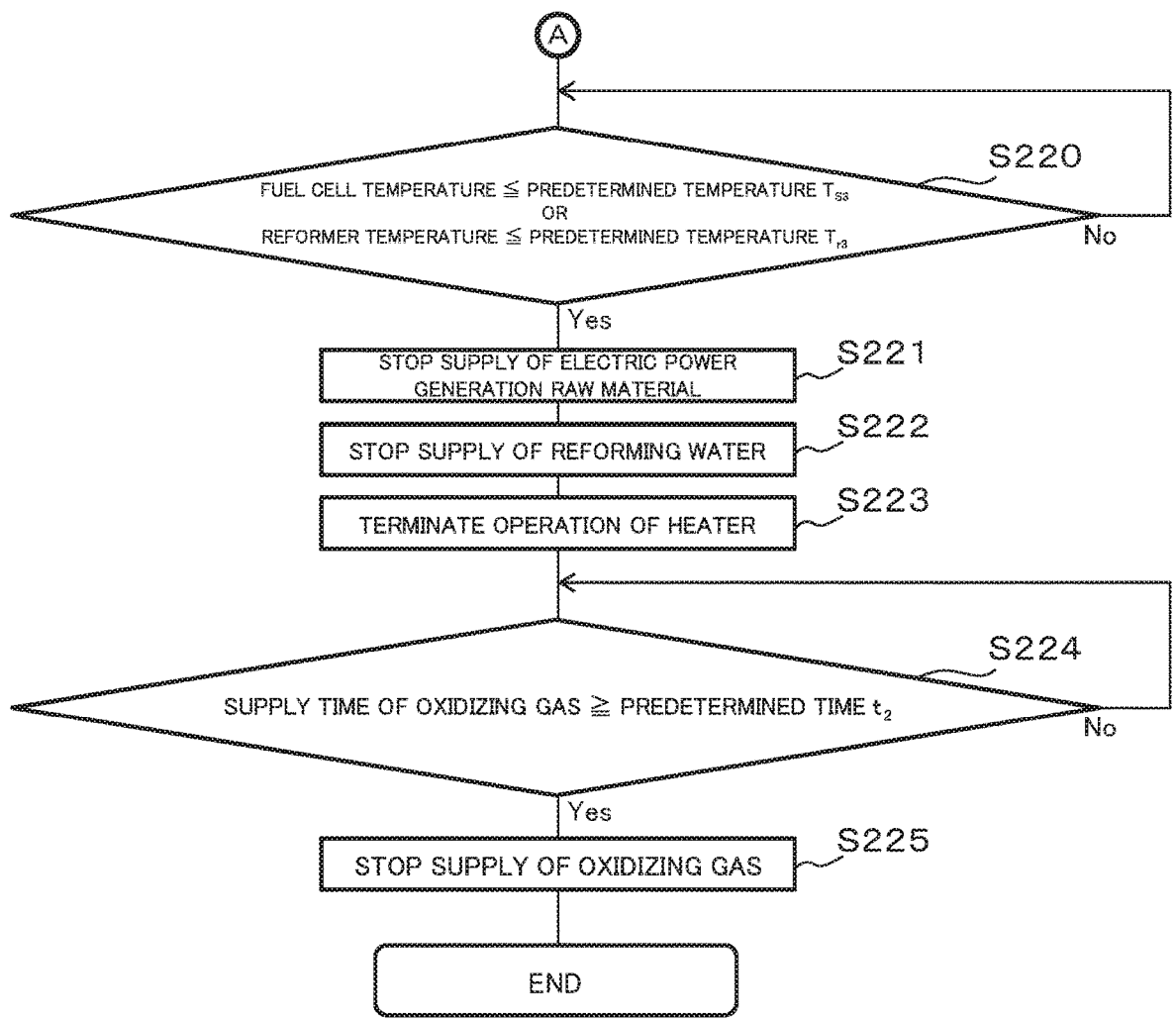
FIG. 20 is a flow chart showing one example of the operation stop process of the fuel cell system according to Embodiment 2 of the present invention.

Next, a specific example of the operation stop process of the fuel cell system 200 according to Embodiment 2 of the present invention will be explained in reference to FIGS. 19 and 20. Each of FIGS. 19 and 20 is a flow chart showing one example of the operation stop process of the fuel cell system 200 according to Embodiment 2 of the present invention. The operations shown in each flow chart may be realized in such a manner that, for example, the controller 208 reads out and executes the control programs (not shown) stored in the storage device 207.

First, an operation stop manipulation is started in the operation stop process (Step S210). In the fuel cell system 200, by starting the operation stop manipulation, the controller 208 causes the electric power generation raw material supply unit 205, the reforming water supply unit 209, and the fuel cell 201 to stop the supply of the electric power generation raw material, the supply of the reforming water, and the electric power generation of the fuel cell 201. To be specific, when the controller 208 receives an instruction of the operation stop manipulation from an operator or the like through an input device or the like or determines the operation stop based on a predetermined condition, the controller 208 causes the electric power generation raw material supply unit 205 to stop the supply of the electric power generation raw material to the combustible gas channel 211 and also causes the reforming water supply unit 209 to stop the supply of the reforming water to the evaporator 203. However, the controller 208 continues the supply of the oxidizing gas to the oxidizing gas channel 212 for a while (five minutes, for example) (Step S211). Then, the controller 208 determines whether or not a supply time of the oxidizing gas elapsed from the start of the operation stop manipulation is a predetermined time $t_1$ or more (Step S212). When the controller 208 determines that the supply time of the oxidizing gas is the predetermined time $t_1$ or more (YES in Step S212), the controller 208 causes the oxidizing gas supply unit 206 to stop the supply of the oxidizing gas (Step S213).

As above, in the fuel cell system 200, the supply of the oxidizing gas continues for the predetermined time $t_1$ from the start of the operation stop manipulation in Step S210. The reason for this is as below. To be specific, immediately after the start of the operation stop manipulation in Step S210, the reforming water (steam) which has already been supplied remains in the reforming water channel. Therefore, immediately after the start of the operation stop manipulation step, the hydrogen-containing gas is generated in the reformer 202 to be supplied to the fuel cell 201. To be specific, by the supply of the electric power generation raw material and the supply of the reforming water (steam) immediately before the operation stop, the hydrogen-containing gas is generated in the reformer 202 for a while from the instruction of the operation stop. In the operation stop process, the pressure in the combustible gas channel 211 becomes higher than the pressure in the oxidizing gas channel 212. Therefore, the generated hydrogen-containing gas may flow into the cathode 221 of the fuel cell 201 through the combustor 210 provided at a rear stage of the fuel cell 201. To prevent the hydrogen-containing gas from flowing into the cathode 221, the fuel cell system 200 is configured such that the oxidizing gas is supplied to the oxidizing gas channel 212 for the predetermined time $t_1$ from the start of the operation stop manipulation. It should be noted that the predetermined time $t_1$ may be set as a time from when the operation stop manipulation is started until when the flow of the hydrogen-containing gas into the cathode 221 of the fuel cell 201 never occurs, that is, a time from when the operation stop manipulation is started until when the generation of the hydrogen-containing gas in the reformer 202 is terminated.

Next, the controller 208 determines a magnitude relation between the fuel cell temperature detected by the fuel cell temperature detector T10 and the predetermined temperature $T_{s1}$. Or, the controller 208 determines a magnitude relation between the reformer temperature detected by the reformer temperature detector T20 and a predetermined temperature $T_{r1}$. Or, the controller 208 determines a magnitude relation between an evaporator temperature detected by the evaporator temperature detector T30 and a predetermined temperature $T_{e1}$ (Step S214). To be specific, the controller 208 determines a magnitude relation between a predetermined temperature and at least one of the fuel cell temperature, the reformer temperature, and the evaporator temperature.

The fuel cell 201 and the reformer 202 are configured to be heated by the heat generated by the combustion of the combustible gas in the combustor 210 provided at a rear stage of the fuel cell 201. Therefore, the temperatures of the fuel cell 201 and the reformer 202 change in conjunction with each other. Further, during the steady operation, the evaporator 203 is heated by the heat of the flue gas generated by the combustor 210. After the start of the operation stop manipulation, the temperature of the evaporator 203 decreases as with the fuel cell 201 and the reformer 202 as described above. To be specific, after the start of the operation stop manipulation, the temperatures of the fuel cell 201, the reformer 202, and the evaporator 203 change in conjunction with one another.

In the fuel cell system 200 according to Embodiment 2 of the present invention, the storage device 207 stores the table 230 in which the changes in the fuel cell temperature, the reformer temperature, and the evaporator temperature are associated with one another. On this account, when the controller 208 recognizes one of the fuel cell temperature, the reformer temperature, and the evaporator temperature, the controller 208 can recognize the other temperatures in reference to the table 230.

The fuel cell temperature is the temperature of any single cell constituting the fuel cell 201 but is not limited to this. For example, the fuel cell temperature may be a temperature of the combustible gas or oxidizing gas flowing through the fuel cell 201. Further, the predetermined temperature $T_{s1}$ may be the temperature of the fuel cell 201 immediately after the start of the operation stop process of the fuel cell system 200 or the temperature of the fuel cell 201 after a predetermined time from the start of the operation stop process, and may be set to, for example, 480° C.

The reformer temperature is a temperature of the reforming catalyst filled in the reformer 202, and the predetermined temperature $T_{r1}$ may be set to, for example, 480° C. To be specific, during the operation stop process, the temperatures of the fuel cell 201 and the reformer 202 are substantially the same as each other. Further, the evaporator temperature is a temperature of a predetermined position of the evaporator 203, and the predetermined temperature $T_{e1}$ may be set to, for example, 180° C.

As described above, after the start of the operation stop manipulation, the fuel cell temperature, the reformer temperature, and the evaporator temperature change in conjunction with one another. Therefore, in Step S214, the controller 208 determines whether or not the fuel cell temperature is the predetermined temperature $T_{s1}$ or less, whether or not the reformer temperature is the predetermined temperature $T_{r1}$ or less, and whether or not the evaporator temperature is the predetermined temperature $T_{e1}$ or less. When at least one of these determination conditions is satisfied (YES in Step S214), the controller 208 causes the oxidizing gas supply unit 206 to start the supply of the oxidizing gas to the oxidizing gas channel 212 (Step S215). Next, the controller 208 causes the reforming water supply unit 209 to start the supply of the reforming water to the reforming water channel 213 (Step S216) and causes the electric power generation raw material supply unit 205 to start the supply of the electric power generation raw material to the combustible gas channel 211 (Step S217).

As above, in the fuel cell system 200 according to the present embodiment, the oxidizing gas channel 212 is purged by the supply of the oxidizing gas, and the combustible gas channel 211 is purged by the hydrogen-containing gas generated in the reformer 202 by the supply of the electric power generation raw material and the supply of the reforming water (steam).

After that, when the temperatures of the respective portions (such as the fuel cell 201, the reformer 202, and the evaporator 203) of the fuel cell system 200 decrease with time, it becomes difficult to evaporate the reforming water in the evaporator 203. When it becomes difficult to evaporate the reforming water in the evaporator 203, the concentration of the hydrogen in the hydrogen-containing gas generated by the reformer 202 decreases, and this makes it difficult to combust the hydrogen-containing gas in the combustor 210.

Therefore, the controller 208 receives at least one of the fuel cell temperature detected by the fuel cell temperature detector T10, the reformer temperature detected by the reformer temperature detector T20, and the evaporator temperature detected by the evaporator temperature detector T30 and monitors the temperature change. Then, the controller 208 determines a magnitude relation between the fuel cell temperature and the predetermined temperature $T_{s2}$. Or, the controller 208 determines a magnitude relation between the reformer temperature and a predetermined temperature $T_{r2}$. Or, the controller 208 determines a magnitude relation between the evaporator temperature and a predetermined temperature $T_{e2}$ (Step S218). The controller 208 determines whether or not the fuel cell temperature is the predetermined temperature $T_{s2}$ or less, whether or not the reformer temperature is the predetermined temperature $T_{r2}$ or less, and whether or not the evaporator temperature is the predetermined temperature $T_{e2}$ or less. When at least one of these determination conditions is satisfied (YES in Step S218), the controller 208 causes the heater 204 to heat the evaporator 203 (Step S219). In contrast, when the above determination conditions are not satisfied at all in Step S218, the controller 208 continues the supply of the oxidizing gas, the supply of the reforming water, and the supply of the electric power generation raw material. It should be noted that the case where the determination condition is satisfied in Step S218 denotes a case where the temperature of the evaporator 203 becomes a lower limit or less of an operating temperature of the evaporator 203 at which temperature the reforming water can be evaporated.

As above, in the fuel cell system 200 according to the present embodiment, when it is determined that the operating temperature of the evaporator 203 is the lower limit or less, the evaporator 203 is heated. With this, the evaporation of the reforming water can continue, and the steam can be supplied to the combustible gas channel 211. Therefore, it is possible to prevent a case where it becomes difficult to evaporate the reforming water due to the decrease in the temperature of the evaporator 203, and the concentration of the hydrogen in the hydrogen-containing gas generated by the reformer 202 decreases.

It should be noted that the predetermined temperature $T_{s2}$, the predetermined temperature $T_{r2}$, and the predetermined temperature $T_{e2}$ are the fuel cell temperature, the reformer temperature, and the evaporator temperature when the temperature of the evaporator 203 is a temperature at which the reforming water cannot be adequately evaporated. For example, the predetermined temperature $T_{S2}$ of the fuel cell temperature, the predetermined temperature $T_{r2}$ of the reformer temperature, and the predetermined temperature $T_{e2}$ of the evaporator 203 may be set to about 300° C., about 300° C., and about 100° C., respectively.

Further, the controller 208 receives at least one of the fuel cell temperature detected by the fuel cell temperature detector T10 and the reformer temperature detected by the reformer temperature detector T20 and monitors the temperature change. Then, the controller 208 determines a magnitude relation between the detected fuel cell temperature and a predetermined temperature $T_{s3}$. Or, the controller 208 determines a magnitude relation between the detected reformer temperature and a predetermined temperature $T_{r3}$ (Step S220).

The controller 208 determines whether or not the detected fuel cell temperature is the predetermined temperature $T_{s3}$ or less and whether or not the reformer temperature is the predetermined temperature $T_{r3}$ or less. When at least one of these determination conditions is satisfied (YES in Step S220), the controller 208 determines that at least one of the fuel cell temperature and the reformer temperature has reached a temperature at which there is no possibility that the anode 220 of the fuel cell 201 oxidizes. Therefore, if YES in Step S220, the controller 208 causes the electric power generation raw material supply unit 205 to stop the supply of the electric power generation raw material (Step S221) and causes the reforming water supply unit 209 to stop the supply of the reforming water (Step S222). Further, the controller 208 stops the operation of the heater 204 (Step S223). It should be noted that the order of execution of Steps S221 to S223 is not limited to this order, and Steps S221 to S223 may be executed at the same time, or the order may be changed.

It should be noted that the predetermined temperature $T_{s3}$ is the fuel cell temperature when there is no possibility that the anode 220 of the fuel cell 201 oxidizes, and the predetermined temperature $T_{r3}$ is the reformer temperature when there is no possibility that the anode 220 of the fuel cell 201 oxidizes. For example, the predetermined temperature $T_{s3}$ of the fuel cell temperature may be set to 150° C. for suppressing the oxidation caused by local battery generation, and the predetermined temperature of the reformer temperature may also be set to 150° C.

When the supply of the electric power generation raw material and the supply of the reforming water (steam) are stopped as above, the generation of the hydrogen-containing gas in the reformer 202 stops. However, the generation of the hydrogen-containing gas is not stopped immediately after the controller 208 instructs the supply stop of the electric power generation raw material and the supply stop of the reforming water. The electric power generation raw material and the reforming water are flowing toward the reformer 202 immediately before the stop instruction of the controller 208, and the hydrogen-containing gas is generated after the stop instruction. Therefore, to prevent a case where the hydrogen-containing gas generated after the stop instruction flows into the cathode 221 of the fuel cell 201 to reduce the cathode 221, the supply of the oxidizing gas continues for a predetermined time $t_2$ from the stop of the operation of the heater 204. To be specific, the controller 208 determines whether or not the supply of the oxidizing gas is performed for the predetermined time $t_2$ or more from the stop of the operation of the heater 204. When the controller 208 determines that the supply of the oxidizing gas is performed for the predetermined time $t_2$ or more, the controller 208 causes the oxidizing gas supply unit 206 to stop the supply of the oxidizing gas (Step S225).

The fuel cell system 200 according to the present embodiment can perform the operation stop process as above. As described above, until each of the temperatures of the fuel cell 201, the reformer 202, and the like decreases to a temperature at which the anode 220 of the fuel cell 201 does not oxidize, the combustible gas channel can be purged by the hydrogen-containing gas generated by the reformer 202. Thus, it is possible to prevent a case where the air flows into the combustible gas channel from outside due to the pressure decrease in the combustible gas channel by the gas contraction in the combustible gas channel by the temperature decrease of the fuel cell 201 and the pressure decrease in the combustible gas channel by the condensation of the steam by the temperature decrease of the fuel cell 201. Therefore, in addition to the oxidation of the anode 220 by the air at a downstream side of the anode 220 at a low temperature, the oxidation of the anode 200 by the local battery generation at an upstream side of the anode 220 by the intrusion of the air from the downstream side of the anode 220 can also be suppressed.

Further, since the combustible gas channel 211 is purged by not the electric power generation raw material itself but the hydrogen-containing gas, the carbon deposition on the anode 220 of the fuel cell 201, the reformer 202, and the like can be prevented.

It should be noted that the fuel cell system 200 may be configured such that in a period in which the electric power generation raw material and the reforming water are supplied in the operation stop process, the combustible gas discharged from the fuel cell 201 is combusted by an ignitor (not shown) in the combustor 210 to be discharged to the outside of the system. According to this configuration, the combustible gas itself can be prevented from being discharged to the outside of the system.

After the supply of the oxidizing gas, the supply of the reforming water, and the supply of the electric power generation raw material are started in Step S215, S216, and S217, respectively, the oxidizing gas, the reforming water, and the electric power generation raw material may be continuously supplied or intermittently supplied until the supply of the oxidizing gas, the supply of the reforming water, and the supply of the electric power generation raw material are stopped in Steps S221, S222, and S225, respectively. When intermittently supplying the oxidizing gas, the reforming water, and the electric power generation raw material, the controller 208 receives time information from a timer portion (not shown) and controls the reforming water supply unit 209, the electric power generation raw material supply unit 205, and the oxidizing gas supply unit 206 such that an operation in which the supply of the oxidizing gas, the supply of the reforming water, and the supply of the electric power generation raw material are performed for a predetermined period of time and stopped for a predetermined period of time is performed a predetermined number of times. Or, the reforming water and the electric power generation raw material may be intermittently supplied as described above while continuously supplying the oxidizing gas from when the supply of the oxidizing gas is started in Step S215 until when the supply is stopped in Step S225. In a case where the electric power generation raw material and the reforming water are intermittently supplied, the electric power generation raw material consumed by the operation stop process in the fuel cell system 200 can be reduced.

Further, the heater 204 which starts operating in Step S219 may be configured to continuously operate until the termination of the operation in Step S223. Or, the heater 204 may be configured to be subjected to ON-OFF control or PWM (Pulse Width Modulation) control by the controller 208 such that the evaporator temperature falls within a predetermined temperature range.

The fuel cell system 200 according to the present embodiment includes the fuel cell temperature detector T10, the reformer temperature detector T20, and the evaporator temperature detector T30 as the temperature detecting portions, but does not have to include these three temperature detectors, and is only required to include at least one of these temperature detectors.

The fuel cell system 200 according to the present embodiment may be configured to further include a desulfurizer (not shown in FIG. 18) configured to remove the sulfur compound contained in the electric power generation raw material in the combustible gas channel 211. In this case, the desulfurizer is provided at the combustible gas channel 211 so as to be located between the electric power generation raw material supply unit 205 and the reformer 202. It should be noted that this desulfurizer may be the same in configuration as the desulfurizer 9 of the fuel cell system 100 according to Modified Example 2 of Embodiment 1 described above.

The sulfur compound contained in the electric power generation raw material may be a sulfur compound artificially added to the raw material as an odorant component or may be a natural sulfur compound derived from the raw material itself. Specifically, examples of the sulfur compound include tertiary-butylmercaptan (TBM), dimethylsulfide (DMS), tetrahydrothiophene (THT), carbonyl sulfide (COS), and hydrogen sulfide.

Modified Example 1 of Embodiment 2

Configuration of Fuel Cell System According to Modified Example 1 of Embodiment 2

Figure 21:
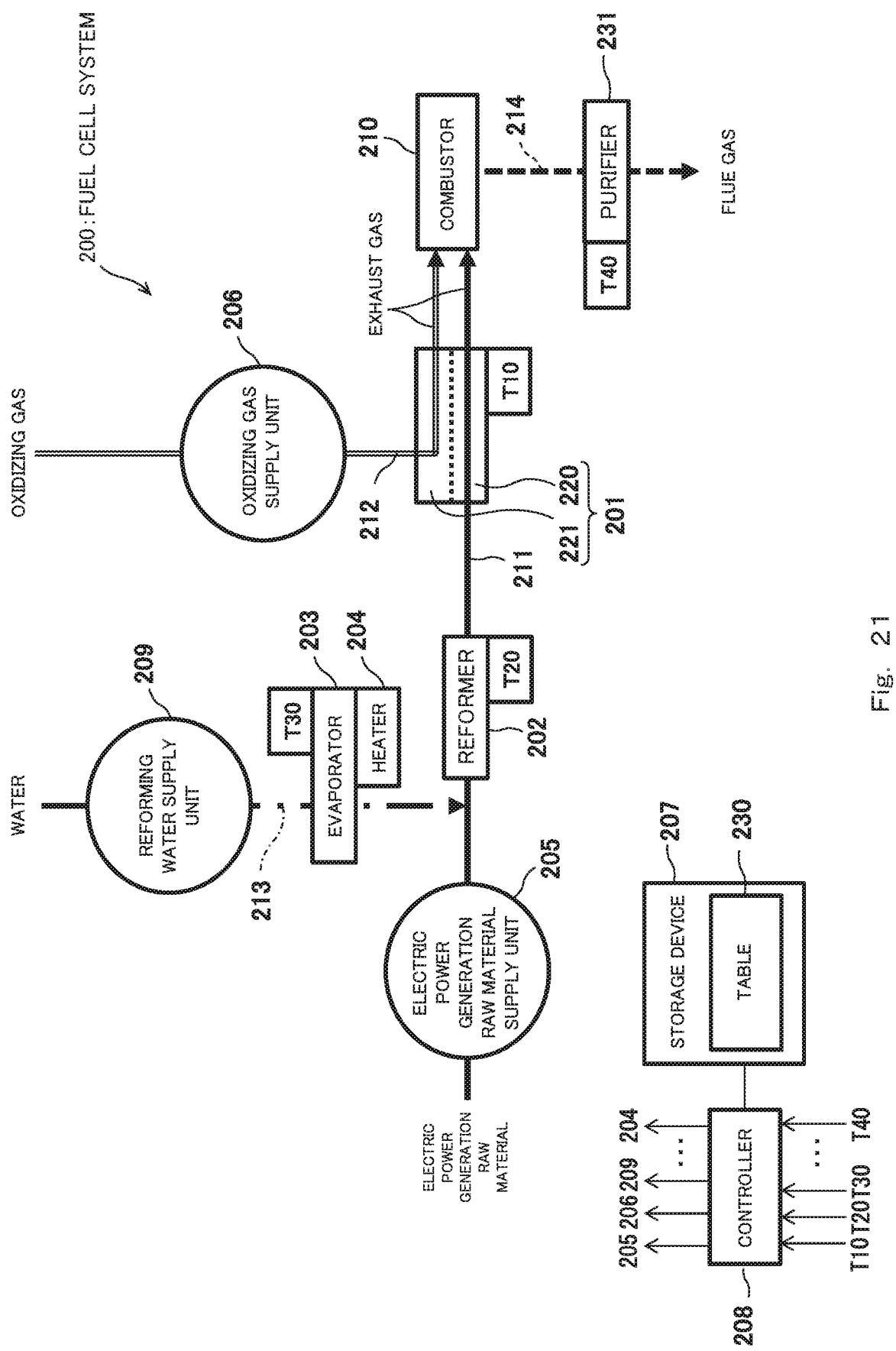
FIG. 21 is a block diagram showing one example of a schematic configuration of the fuel cell system according to Modified Example 1 of Embodiment 2 of the present invention.

Next, the configuration of the fuel cell system 200 according to Modified Example 1 of Embodiment 2 of the present invention will be explained in reference to FIG. 21. FIG. 21 is a block diagram showing one example of a schematic configuration of the fuel cell system 200 according to Modified Example 1 of Embodiment 2 of the present invention.

As shown in FIG. 21, the fuel cell system 200 according to Modified Example 1 of Embodiment 2 is different from the fuel cell system 200 shown in FIG. 18 in that a purifier 231 is further provided in the flue gas channel 214. Another difference is that a purifier temperature detector T40 is provided at the purifier 231. Other than the above, the fuel cell system 200 according to Modified Example 1 of Embodiment 2 is the same in configuration as the fuel cell system 200 shown in FIG. 18. Therefore, the same reference signs are used for the same components, and explanations thereof are omitted.

As shown in FIG. 21, the flue gas channel 214 is provided downstream of the combustor 210, and the flue gas generated by the combustion of the combustible gas in the combustor 210 flows through the flue gas channel 214. When the combustion is not performed in the combustor 210 after the stop of the fuel cell 201, the exhaust gas containing the combustible gas (hydrogen-containing gas) and the oxidizing gas discharged from the fuel cell 201 flows through the flue gas channel 214.

The purifier 231 is provided in the flue gas channel 214 and purifies the exhaust gas flowing in the flue gas channel 214 and discharged from the fuel cell 201. It should be noted that the exhaust gas is a highly combustible gas. The purifier 231 is the same in configuration as the purifier 16 of the fuel cell system 100 according to Modified Example 3 of Embodiment 1, so that a detailed explanation thereof is omitted.

The purifier 231 may be configured to be heated during the steady operation of the fuel cell system 200 by the flue gas flowing through the flue gas channel 214 such that the temperature thereof falls within a predetermined temperature range. To be specific, during the steady operation, the flue gas flowing through the purifier 231 heats the purifier 231 as above to be discharged to the outside of the fuel cell system 200 in a state where the highly combustible gas has been purified.

As described above, the purifier temperature detector T40 is provided at the purifier 231, and information regarding the temperature (purifier temperature) detected by the purifier temperature detector T40 is output to the controller 208. The purifier temperature detector T40 may be constituted by, for example, a thermocouple or a thermistor.

Operation Stop Process of Fuel Cell System According to Modified Example 1 of Embodiment 2

Figure 22:
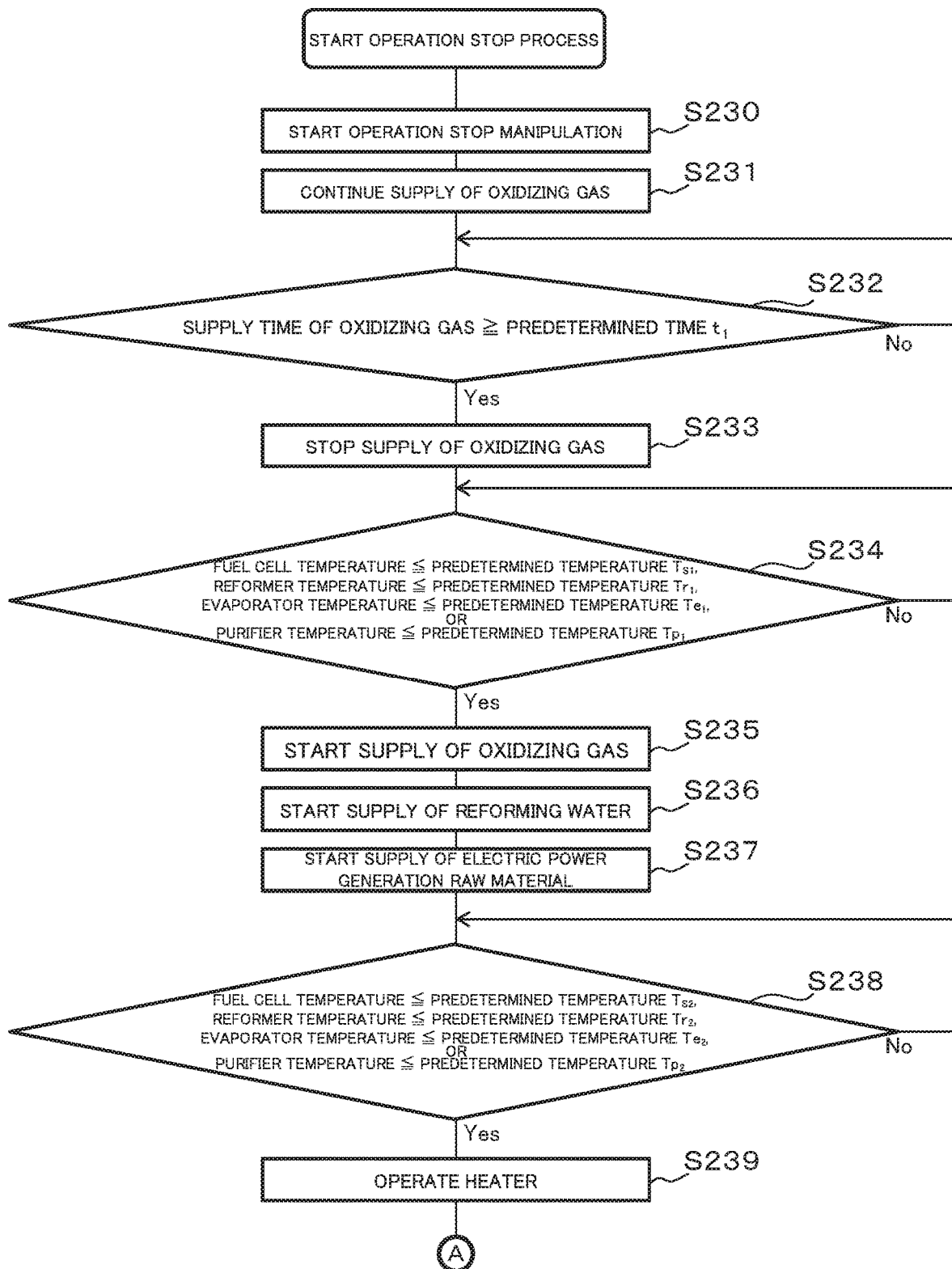
FIG. 22 is a flow chart showing one example of the operation stop process of the fuel cell system according to Modified Example 1 of Embodiment 2 of the present invention.
Figure 23:
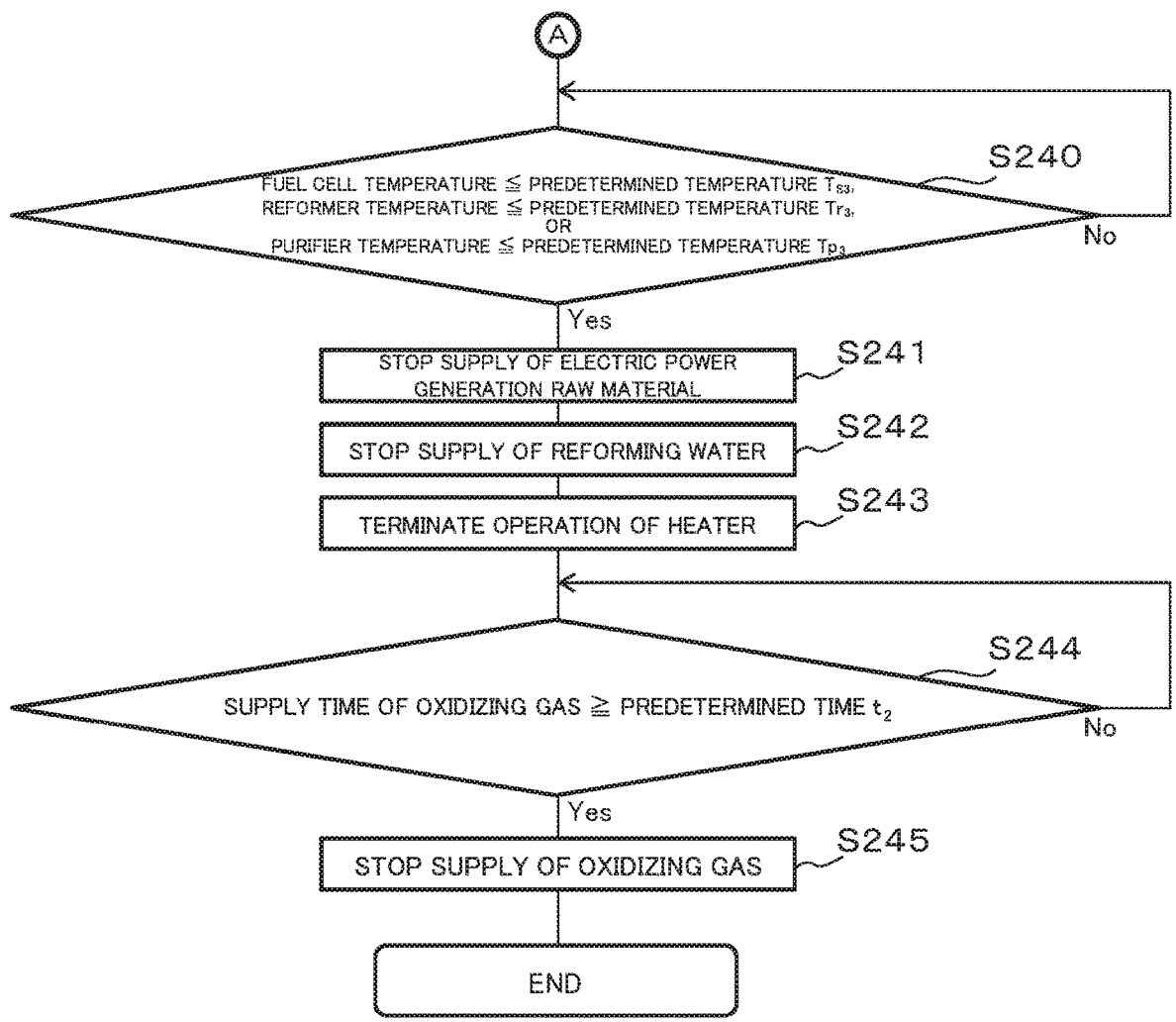
FIG. 23 is a flow chart showing one example of the operation stop process of the fuel cell system according to Modified Example 1 of Embodiment 2 of the present invention.

Next, the operation stop process of the fuel cell system 200 according to Modified Example 1 of Embodiment 2 configured as above will be explained in reference to FIGS. 22 and 23. Each of FIGS. 22 and 23 is a flow chart showing one example of the operation stop process of the fuel cell system 200 according to Modified Example 1 of Embodiment 2 of the present invention. The operations shown in the flow chart may be realized in such a manner that, for example, the controller 208 reads out and executes the control programs (not shown) stored in the storage device 207.

Since Steps S230 to S233, S235 to S237, S239, and S241 to Step S245 in the flow chart of FIG. 22 or 23 are the same as Steps S210 to S213, S215 to S217, S219, and S221 to S225 in FIG. 19 or 20, respectively, explanations thereof are omitted.

After the supply of the oxidizing gas is stopped in Step S233, the controller 208 determines a magnitude relation between the fuel cell temperature detected by the fuel cell temperature detector T10 and the predetermined temperature $T_{s1}$ in Step S234. Or, the controller 208 determines a magnitude relation between the reformer temperature detected by the reformer temperature detector T20 and the predetermined temperature $T_{r1}$. Or, the controller 208 determines a magnitude relation between the evaporator temperature detected by the evaporator temperature detector T30 and the predetermined temperature $T_{e1}$. Or, the controller 208 determines a magnitude relation between the purifier temperature detected by the purifier temperature detector T40 and a predetermined temperature $T_{p1}$. To be specific, the controller 208 determines a magnitude relation between a predetermined temperature and at least one of the fuel cell temperature, the reformer temperature, the evaporator temperature, and the purifier temperature.

The fuel cell 201 and the reformer 202 are configured to be heated by the heat generated by the combustion of the combustible gas in the combustor 210 provided at a rear stage of the fuel cell 201. Therefore, the temperatures of the fuel cell 201 and the reformer 202 change in conjunction with each other. Further, during the steady operation, the evaporator 203 and the purifier 231 are heated by the heat of the flue gas generated by the combustor 210. After the start of the operation stop manipulation, the temperatures of the evaporator 203 and the purifier 231 decrease as with the fuel cell 201 and the reformer 202 as described above. To be specific, after the start of the operation stop manipulation, the temperatures of the fuel cell 201, the reformer 202, the evaporator 203, and the purifier 231 change in conjunction with one another.

It should be noted that the table 230 stored in the storage device 207 of the fuel cell system 200 according to Modified Example 1 of Embodiment 2 of the present invention records a predetermined temperature set within a temperature change range of the purifier 231 in addition to the predetermined temperatures set in the respective temperature ranges of the fuel cell 201, the reformer 202, and the evaporator 203.

It should be noted that the purifier temperature is a temperature of a purification catalyst filled in the purifier 231 but is not limited to this. Further, the predetermined temperature $T_{p1}$ of the purifier 231 may be the temperature of the purifier 231 immediately after the start of the operation stop process of the fuel cell system 200 or the temperature of the purifier 231 after a predetermined time from the start of the operation stop process. In Step S234 of the operation stop process, when the predetermined temperature $T_{s1}$ of the fuel cell 201 is about 480° C., the predetermined temperature $T_{p1}$ of the purifier 231 is, for example, about 270° C.

As described above, after the start of the operation stop manipulation, the fuel cell temperature, the reformer temperature, the evaporator temperature, and the purifier temperature change in conjunction with one another. Therefore, in Step S234, the controller 208 determines whether or not the fuel cell temperature is the predetermined temperature $T_{s1}$ or less, whether or not the reformer temperature is the predetermined temperature $T_{r1}$ or less, whether or not the evaporator temperature is the predetermined temperature $T_{e1}$ or less, and whether or not the purifier temperature is the predetermined temperature $T_{p1}$ or less. When at least one of these determination conditions is satisfied (YES in Step S234), the controller 208 causes the oxidizing gas supply unit 206 to start the supply of the oxidizing gas to the oxidizing gas channel 212 (Step S235). Further, the controller 208 starts the supply of the reforming water in Step S236 and the supply of the electric power generation raw material in Step S237 to perform the purge of the oxidizing gas channel 212 and the purge of the combustible gas channel 211.

After that, when the temperatures of the respective portions (such as the fuel cell 201, the reformer 202, the evaporator 203, and the purifier 231) of the fuel cell system 200 decrease with time, it becomes difficult to evaporate the reforming water in the evaporator 203.

Therefore, the controller 208 receives at least one of the fuel cell temperature detected by the fuel cell temperature detector T10, the reformer temperature detected by the reformer temperature detector T20, the evaporator temperature detected by the evaporator temperature detector T30, and the purifier temperature detected by the purifier temperature detector T40 and monitors the temperature change. Then, the controller 208 determines a magnitude relation between the fuel cell temperature and the predetermined temperature $T_{S2}$. Or, the controller 208 determines a magnitude relation between the reformer temperature and the predetermined temperature $T_{r2}$. Or, the controller 208 determines a magnitude relation between the evaporator temperature and the predetermined temperature $T_{e2}$. Or, the controller 208 determines a magnitude relation between the purifier temperature and a predetermined temperature $T_{p2}$ (Step S238).

The controller 208 determines whether or not the fuel cell temperature is the predetermined temperature $T_{S2}$ or less, whether or not the reformer temperature is the predetermined temperature $T_{r2}$ or less, whether or not the evaporator temperature is the predetermined temperature $T_{e2}$ or less, and whether or not the purifier temperature is the predetermined temperature $T_{p2}$ or less. When at least one of these determination conditions is satisfied (YES in Step S238), the controller 208 causes the heater 204 to heat the evaporator 203 (Step S239). In contrast, when the above determination conditions are not satisfied at all, the controller 208 continues the supply of the oxidizing gas, the supply of the reforming water, and the supply of the electric power generation raw material.

As above, in the fuel cell system 200 according to Embodiment 2 of the present invention, the evaporation of the reforming water can continue by heating the evaporator 203, and the steam can be supplied to the combustible gas channel 211. Therefore, it is possible to prevent a case where it becomes difficult to evaporate the reforming water due to the decrease in the temperature of the evaporator 203, and the concentration of the hydrogen in the hydrogen-containing gas generated by the reformer 202 decreases.

It should be noted that the predetermined temperature $T_{p2}$ is the purifier temperature corresponding to the evaporator temperature when the temperature of the evaporator 203 is a temperature at which the reforming water cannot be adequately evaporated. In Step S238 of the operation stop process, for example, the predetermined temperature $T_{p2}$ of the purifier 231 may be set to about 200° C. At this time, the predetermined temperature $T_{S2}$ of the fuel cell 201 corresponding to the temperature of the purifier 231 is about 300° C.

Further, the controller 208 receives at least one of the fuel cell temperature detected by the fuel cell temperature detector T10, the reformer temperature detected by the reformer temperature detector T20, and the purifier temperature detected by the purifier temperature detector T40 and monitors the temperature change. Then, the controller 208 determines a magnitude relation between the detected fuel cell temperature and the predetermined temperature $T_{s3}$. Or, the controller 208 determines a magnitude relation between the detected reformer temperature and the predetermined temperature $T_{r3}$. Or, the controller 208 determines a magnitude relation between the detected purifier temperature and a predetermined temperature $T_{p3}$ (Step S240).

The controller 208 determines whether or not the fuel cell temperature is the predetermined temperature $T_{s3}$ or less, whether or not the reformer temperature is the predetermined temperature $T_{r3}$ or less, and whether or not the purifier temperature is the predetermined temperature $T_{p3}$ or less. When at least one of these determination conditions is satisfied (YES in Step S240), the controller 208 determines that at least one of the fuel cell temperature, the reformer temperature, and the purifier temperature has reached a temperature at which there is no possibility that the anode 220 of the fuel cell 201 oxidizes. Therefore, if YES in Step S240, the controller 208 causes the electric power generation raw material supply unit 205 to stop the supply of the electric power generation raw material (Step S241) and causes the reforming water supply unit 209 to stop the supply of the reforming water (Step S242). Further, the controller 208 stops the operation of the heater 204 (Step S243). It should be noted that the order of Steps S241 to S243 is not limited to this, and Steps S241 to S243 may be executed at the same time, or the order may be changed.

It should be noted that the predetermined temperature $T_{p3}$ is the purifier temperature corresponding to the fuel cell temperature when there is no possibility that the anode 220 of the fuel cell 201 oxidizes or the reformer temperature when there is no possibility that the anode 220 of the fuel cell 201 oxidizes. In Step S240 of the operation stop process, for example, the predetermined temperature $T_{p3}$ of the purifier 231 may be set to about 120° C. At this time, the predetermined temperature $T_{s3}$ of the fuel cell 201 corresponding to the temperature of the purifier 231 is about 150° C.

As above, in the fuel cell system 200 according to Modified Example 1 of Embodiment 2, the change in the purifier temperature can also be used as a trigger for the supply or stop of the oxidizing gas, the reforming water, or the electric power generation raw material or the operation start or stop of the heater 204.

Modified Example 2 of Embodiment 2

In the foregoing, the temperature of the evaporator 203 can be maintained by the operation of the heater 204 such that the evaporator 203 has an adequate temperature so as to evaporate the reforming water. However, even if the temperature of the evaporator 203 is maintained within a predetermined temperature range, there is a case where by the temperature decrease in the operation stop process of the fuel cell 201, the temperature of the reformer 202 becomes lower than a temperature range in which the reforming reaction satisfactorily proceeds in the reformer 202, and therefore, the reformer 202 cannot generate the hydrogen-containing gas.

Therefore, as Modified Example 2, the following will explain the fuel cell system 200 configured such that the reformer 202 can generate the hydrogen-containing gas even when the temperature of the reformer 202 is lower than a temperature range in which the reformer 202 can function.

Configuration of Fuel Cell System According to Modified Example 2 of Embodiment 2

Figure 24:
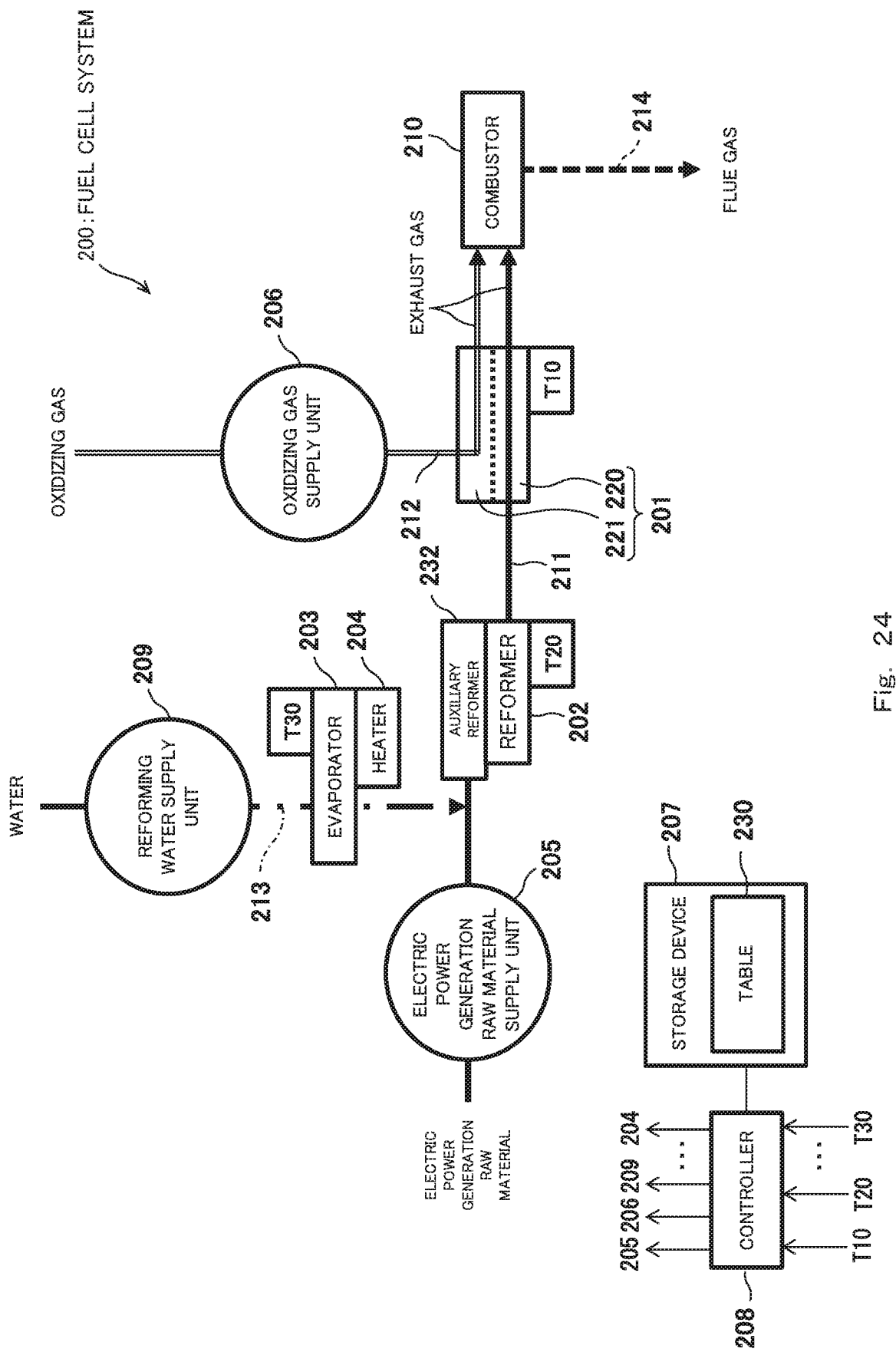
FIG. 24 is a block diagram showing one example of a schematic configuration of the fuel cell system according to Modified Example 2 of Embodiment 2 of the present invention.

The configuration of the fuel cell system 200 according to Modified Example 2 of Embodiment 2 of the present invention will be explained in reference to FIG. 24. FIG. 24 is a block diagram showing one example of a schematic configuration of the fuel cell system 200 according to Modified Example 2 of Embodiment 2 of the present invention.

The fuel cell system 200 according to Modified Example 2 of Embodiment 2 shown in FIG. 24 is different from the fuel cell system 200 shown in FIG. 18 in that the fuel cell system 200 according to Modified Example 2 of Embodiment 2 further includes an auxiliary reformer 232 which is provided at the combustible gas channel 211 separately from the reformer 202 so as to be located upstream of the reformer 202. Other than the above, the fuel cell system 200 according to Modified Example 2 of Embodiment 2 is the same in configuration as the fuel cell system 200 shown in FIG. 18. Therefore, the same reference signs are used for the same components, and explanations thereof are omitted.

As with the reformer 202, the auxiliary reformer 232 reforms the electric power generation raw material to supply the electric power generation raw material to the fuel cell 201 and is configured to be filled with a reforming catalyst. The reforming catalyst may be the same as the catalyst of the reformer 202 and is only required to be a catalyst which can be maintained in an optimal temperature range and promote the reforming reaction. As shown in FIG. 24, the auxiliary reformer 232 is provided in the vicinity of the heater 204 or adjacent to the heater 204 and can be increased in temperature by the start-up of the heater 204. Therefore, even when the reformer temperature detected by the reformer temperature detector T20 is, for example, 300° C. or less, and the reforming reaction does not satisfactorily proceed in the reformer 202, the auxiliary reformer 232 is increased in temperature by the heater 204 to about 500° C. at which the reforming reaction satisfactorily proceeds. With this, the auxiliary reformer 232 can generate the hydrogen-containing gas by the reforming reaction.

To be specific, in the fuel cell system 200 according to Modified Example 2 of Embodiment 2, when the controller 208 determines based on the detection result of the temperature detecting portion that the operating temperature of the evaporator 203 is the lower limit or less, the controller 208 can cause the heater 204 to heat the auxiliary reformer 232 together with the evaporator 203.

Thus, the fuel cell system 200 according to Modified Example 2 of Embodiment 2 includes the auxiliary reformer 232 configured to be increased in temperature by the heater 204 as described above. Therefore, even when the reforming reaction does not adequately proceed in the reformer 202 due to the temperature decrease, the auxiliary reformer 232 heated by the heater 204 can promote the reforming reaction instead of the reformer 202 to generate the hydrogen-containing gas.

Modified Example 3 of Embodiment 2

The fuel cell system 200 according to Modified Example 2 includes the auxiliary reformer 232 located upstream of the reformer 202. However, the position of the auxiliary reformer 232 is not limited to this, and the fuel cell system 200 according to Modified Example 3 may be configured as below.

Configuration of Fuel Cell System According to Modified Example 3 of Embodiment 2

Figure 25:
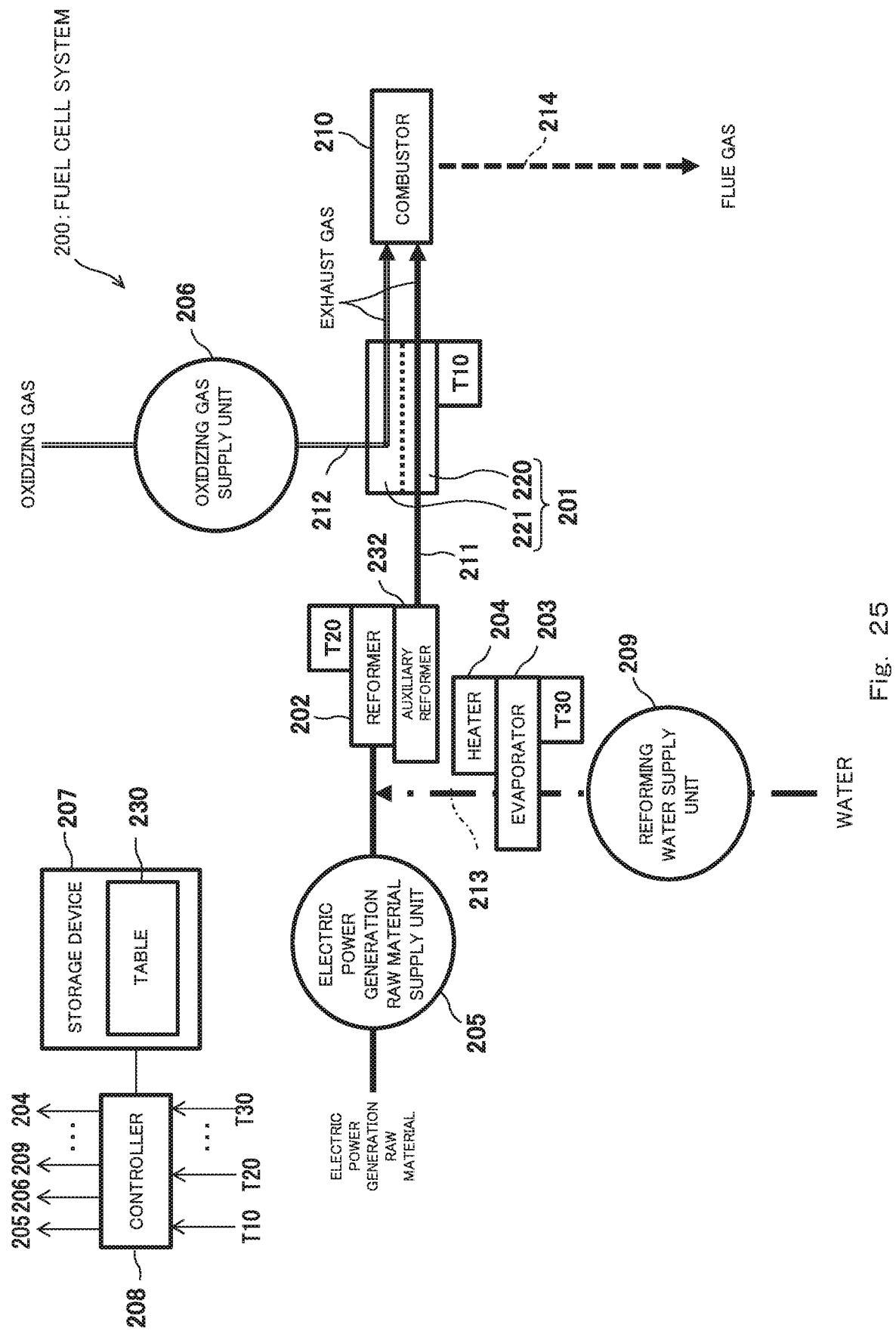
FIG. 25 is a block diagram showing one example of a schematic configuration of the fuel cell system according to Modified Example 3 of Embodiment 2 of the present invention.

As shown in FIG. 25, the fuel cell system 200 according to Modified Example 3 is different from the fuel cell system 200 according to Modified Example 2 in that the auxiliary reformer 232 is provided at the combustible gas channel 211 so as to be located downstream of the reformer 202 instead of upstream of the reformer 202. FIG. 25 is a block diagram showing one example of a schematic configuration of the fuel cell system 200 according to Modified Example 3 of Embodiment 2 of the present invention.

Although not especially shown in FIG. 25, the fuel cell system 200 according to Modified Example 3 may include a desulfurizer which is provided at the combustible gas channel 211 so as to be located upstream of the reformer 202 and removes the sulfur compound contained in the electric power generation raw material. In a case where the fuel cell system 200 according to Modified Example 3 includes the desulfurizer, it is possible to prevent a case where the reforming catalyst of the reformer 202 is poisoned by the sulfur compound contained in the electric power generation raw material.

However, even when the desulfurizer is included, the sulfur compound which has not been removed may flow into the reformer 202. In such a case, there is a possibility that the sulfur compound poisons the reforming catalyst especially located at an upstream side.

Therefore, the fuel cell system 200 according to Modified Example 3 of Embodiment 2 is configured to include the auxiliary reformer 232 which is provided at a position in the vicinity of the heater 204 or adjacent to the heater 204 and is provided at the combustible gas channel 211 so as to be located downstream of the reformer 202. With this, it is possible to prevent a case where the auxiliary reformer 232 is poisoned by the sulfur compound contained in the electric power generation raw material, and this deteriorates reforming performance of the auxiliary reformer 232. Therefore, the durability of the auxiliary reformer 232 in the fuel cell system 200 according to Modified Example 3 can be made higher than the durability of the auxiliary reformer 232 in the fuel cell system 200 according to Modified Example 2.

Since the control flow of the operation stop process of the fuel cell system 200 according to each of Modified Examples 2 and 3 of Embodiment 2 is the same as the control flow of the operation stop process shown in FIGS. 19 and 20, an explanation thereof is omitted. Further, as with the fuel cell system 200 according to Modified Example 1 of Embodiment 2, the fuel cell system 200 according to each of Modified Examples 2 and 3 of Embodiment 2 may further include the purifier 231 and the purifier temperature detector T40. When the purifier 231 and the purifier temperature detector T40 are further included, the control flow of the operation stop process of the fuel cell system 200 according to each of Modified Examples 2 and 3 of Embodiment 2 is the same as the control flow of the operation stop process shown in FIGS. 22 and 23.

As described above, the fuel cell system 200 according to each of Modified Examples 2 and 3 of Embodiment 2 further includes the auxiliary reformer 232 configured to be heated by the heater 204. Therefore, even when the temperature of the reformer 202 becomes, by the temperature decrease after the stop of the fuel cell 201, lower than a temperature at which the reforming reaction can satisfactorily proceed, the auxiliary reformer 232 that is increased in temperature by the heater 204 can perform the reforming reaction to generate the hydrogen-containing gas.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The solid-oxide fuel cell system of the present invention can improve safety and durability and can be widely utilized as a solid-oxide fuel cell system.

REFERENCE SIGNS LIST 1 fuel cell
2 reformer
3 combustor
4 ignitor
5 electric power generation raw material supply unit
6 oxidizing gas supply unit
7 reforming material supply unit
8 controller
9 desulfurizer
10 reforming material channel
11 combustible gas channel
12 oxidizing gas channel
13 flue gas channel
14 recycle channel
15 heater portion
16 purifier
20 anode
21 cathode
100 fuel cell system
200 fuel cell system
201 fuel cell
202 reformer
203 evaporator
204 heater
205 electric power generation raw material supply unit
206 oxidizing gas supply unit
207 storage device
208 controller
209 reforming water supply unit
210 combustor
211 combustible gas channel
212 oxidizing gas channel
213 reforming water channel
214 flue gas channel
220 anode
221 cathode
230 table
231 purifier
232 auxiliary reformer
P pressure sensor
T1 fuel cell temperature detecting portion
T2 reformer temperature detecting portion
T3 desulfuizer temperature detecting portion
T4 purifier temperature detecting portion
T10 fuel cell temperature detector
T20 reformer temperature detector
T30 evaporator temperature detector
T40 purifier temperature detector

The invention claimed is:
1. A fuel cell system comprising:
a fuel cell;
a reformer operative to reform an electric power generation raw material to generate a hydrogen-containing gas and supply the hydrogen-containing gas to the fuel cell;
an electric power generation raw material supply unit operative to supply the electric power generation raw material to the reformer;
a reforming water supply unit operative to supply water to the reformer, the water being utilized in a reforming reaction in the reformer;
an evaporator operative to evaporate the water supplied from the reforming water supply unit to the reformer;
a heater operative to heat the evaporator;
an oxidizing gas supply unit operative to supply an oxidizing gas to the fuel cell;
a combustible gas channel through which the electric power generation raw material or the hydrogen-containing gas flows as a combustible gas and which is a channel extending from the electric power generation raw material supply unit to the fuel cell;
an oxidizing gas channel through which the oxidizing gas flows and which is a channel extending from the oxidizing gas supply unit to the fuel cell; and
a temperature detecting portion operative to detect at least one of temperatures of the evaporator, the reformer, and the fuel cell, the temperatures changing in conjunction with one another; and
a controller, wherein
in an operation stop process of the fuel cell, the controller causes the electric power generation raw material supply unit and the reforming water supply unit to supply the electric power generation raw material and the water to the combustible gas channel and causes the oxidizing gas supply unit to supply the oxidizing gas to the oxidizing gas channel, and when the controller determines based on a detection result of the temperature detecting portion that an operating temperature of the evaporator is a lower limit or less, the controller causes the heater to heat the evaporator.

2. The fuel cell system according to claim 1, further comprising a purifier operative to purify an exhaust gas containing the combustible gas and the oxidizing gas which are discharged from the fuel cell, wherein the temperature detecting portion detects at least one of: the temperatures of the evaporator, the reformer, and the fuel cell; and a temperature of the purifier which temperature changes in conjunction with the temperatures of the evaporator, the reformer, and the fuel cell.

3. The fuel cell system according to claim 1, further comprising an auxiliary reformer provided separately from the reformer and operative to reform the electric power generation raw material to supply the reformed electric power generation raw material to the fuel cell, wherein when the controller determines based on the detection result of the temperature detecting portion that the operating temperature of the evaporator is the lower limit or less, the controller causes the heater to heat the evaporator and the auxiliary reformer.

\* \* \* \* \*